(12) United States Patent (10) Patent No.: US 7,716,217 B2
Marston et al. (45) Date of Patent: May 11, 2010

(54) DETERMINING RELEVANCE OF ELECTRONIC CONTENT

(75) Inventors: Justin Marston, Austin, TX (US); Paul Marston, Lancashire (GB)

(73) Assignee: Bluespace Software Corporation, Austin, TX (US)

( * ) Notice: Subject to any disclaimer, the term of this patent is extended or adjusted under 35 U.S.C. 154(b) by 184 days.

(21) Appl. No.: 11/623,653

(22) Filed: Jan. 16, 2007

(65) Prior Publication Data

US 2007/0179945 A1 Aug. 2, 2007

Related U.S. Application Data

(60) Provisional application No. 60/758,828, filed on Jan. 13, 2006.

(51) Int. Cl.
*G06F 7/00* (2006.01)
(52) U.S. Cl. ...................................................... 707/728
(58) Field of Classification Search .................. 707/1–3, 707/726, 749
See application file for complete search history.

(56) References Cited

U.S. PATENT DOCUMENTS

| | | | |
|---|---|---|---|
| 5,938,732 A | 8/1999 | Lim et al. |
| 5,938,735 A | 8/1999 | Malik |
| 6,003,030 A | 12/1999 | Kenner et al. |
| 6,009,462 A | 12/1999 | Birrell et al. |
| 6,029,175 A | 2/2000 | Chow et al. |
| 6,035,327 A | 3/2000 | Buckley et al. |
| 6,112,239 A | 8/2000 | Kenner et al. |
| 6,122,632 A | 9/2000 | Botts et al. |
| 6,134,582 A | 10/2000 | Kennedy |
| 6,134,598 A | 10/2000 | Raman |
| 6,154,744 A | 11/2000 | Kenner et al. |
| 6,178,160 B1 | 1/2001 | Bolton et al. |
| 6,181,867 B1 | 1/2001 | Kenner et al. |
| 6,182,136 B1 | 1/2001 | Ramanathan et al. |
| 6,185,551 B1 | 2/2001 | Birrell et al. |
| 6,185,598 B1 | 2/2001 | Farber et al. |
| 6,249,807 B1 | 6/2001 | Shaw et al. |
| 6,282,569 B1 | 8/2001 | Wallis et al. |

(Continued)

FOREIGN PATENT DOCUMENTS

EP 0739115 A2 10/1996

(Continued)

OTHER PUBLICATIONS

PCT International Search Report and Written Opinion, PCT/US07/60587, Feb. 14, 2008, 8 pages.

(Continued)

*Primary Examiner*—Mohammas Ali
*Assistant Examiner*—John P Hocker
(74) *Attorney, Agent, or Firm*—Fenwick & West LLP

(57) ABSTRACT

In an electronic mail system, a user's actions with an application for managing electronic content are monitored. Based on the user's actions and/or on the actions of other users in the system, a relevance analysis module determines a relevance to the user of a piece of electronic content based on a likelihood of interest of the electronic content piece to the user and/or a measure of a level of significance the user has to another entity associated with the electronic content piece.

22 Claims, 22 Drawing Sheets

U.S. PATENT DOCUMENTS

| | | |
|---|---|---|
| 6,314,565 B1 | 11/2001 | Kenner et al. |
| 6,370,571 B1 | 4/2002 | Medin, Jr. |
| 6,405,252 B1 | 6/2002 | Gupta et al. |
| 6,415,280 B1 | 7/2002 | Farber et al. |
| 6,421,726 B1 | 7/2002 | Kenner et al. |
| 6,480,893 B2 | 11/2002 | Kriegsman |
| 6,484,143 B1 | 11/2002 | Swildens et al. |
| 6,502,125 B1 | 12/2002 | Kenner et al. |
| 6,553,413 B1 | 4/2003 | Lewin et al. |
| 6,578,076 B1 | 6/2003 | Putzolu |
| 6,581,090 B1 | 6/2003 | Lindbo et al. |
| 6,694,358 B1 | 2/2004 | Swildens et al. |
| 6,704,768 B1 | 3/2004 | Zombek |
| 6,704,772 B1 | 3/2004 | Ahmed et al. |
| 6,789,107 B1 | 9/2004 | Bates et al. |
| 6,850,968 B1 | 2/2005 | Pfeffer et al. |
| 6,959,382 B1 | 10/2005 | Kinnis et al. |
| 6,970,913 B1 | 11/2005 | Albert et al. |
| 7,058,687 B2 | 6/2006 | Kucherawy |
| 7,103,794 B2 | 9/2006 | Malcolm |
| 7,233,954 B2 | 6/2007 | Horvitz |
| 7,412,437 B2 | 8/2008 | Moody et al. |
| 2002/0007453 A1 | 1/2002 | Nemovicher |
| 2002/0122543 A1 | 9/2002 | Rowen |
| 2002/0136279 A1 | 9/2002 | Al-Kazily et al. |
| 2002/0144154 A1 | 10/2002 | Tomkow |
| 2003/0009595 A1 | 1/2003 | Collins |
| 2003/0055907 A1 | 3/2003 | Stiers |
| 2003/0074409 A1* | 4/2003 | Bentley ............... 709/206 |
| 2003/0126120 A1* | 7/2003 | Faybishenko et al. ......... 707/3 |
| 2003/0140223 A1 | 7/2003 | Desideri |
| 2003/0191806 A1 | 10/2003 | Osterberg, Jr. et al. |
| 2004/0054498 A1 | 3/2004 | Shipp |
| 2004/0054744 A1 | 3/2004 | Karamchedu et al. |
| 2004/0064515 A1 | 4/2004 | Hockey |
| 2004/0078447 A1* | 4/2004 | Malik et al. ............... 709/206 |
| 2004/0133645 A1 | 7/2004 | Massanelli et al. |
| 2004/0153515 A1 | 8/2004 | Touboul et al. |
| 2004/0177271 A1 | 9/2004 | Arnold et al. |
| 2004/0260761 A1 | 12/2004 | Leaute et al. |
| 2005/0054334 A1 | 3/2005 | Brown et al. |
| 2005/0086340 A1 | 4/2005 | Kang et al. |
| 2005/0149498 A1 | 7/2005 | Lawrence et al. |
| 2005/0203929 A1 | 9/2005 | Hazarika et al. |
| 2005/0204009 A1 | 9/2005 | Hazarika et al. |
| 2006/0168029 A1 | 7/2006 | Fitzpatrick et al. |
| 2007/0038942 A1 | 2/2007 | Chen et al. |
| 2007/0100650 A1* | 5/2007 | Ramer et al. ............... 705/1 |
| 2007/0100806 A1* | 5/2007 | Ramer et al. ............... 707/3 |
| 2007/0244867 A1* | 10/2007 | Malandain et al. ............. 707/3 |
| 2007/0288575 A1 | 12/2007 | Gillum et al. |
| 2009/0216696 A1* | 8/2009 | Downs et al. ............... 706/20 |

FOREIGN PATENT DOCUMENTS

| | | |
|---|---|---|
| EP | 1 085 444 A2 | 3/2001 |
| EP | 1 085 444 A3 | 4/2003 |
| WO | WO 03/036492 A1 | 5/2001 |
| WO | WO 03/073711 A2 | 9/2003 |
| WO | WO 2004/012415 A1 | 2/2004 |

OTHER PUBLICATIONS

International Search Report and Written Opinion, PCT/US06/24859, Apr. 26, 2007, 7 pages.

Edwards, K., "The Design and Implementation of the Montage Multimedia Mail System," Communications for Distributed Applications and Systems, Chapel Hill, Apr. 18, 1991, pp. 47-57, Proceedings of the Conference on Communications Software, New York, U.S.

Brussee, Rogier et al, "Content Distribution Networks", Telematica Institute, Jun. 1, 2001, pp. V-IX and 1-88.

Davison, Brian, "Brian Davison's Web-Caching Bibliography", Department of Computer Science, Rutgers, the State University, New Jersey, Jun. 28, 2000, pp. 1-16.

Goldszmidt, German et al., "Load Distribution for Scalable Web Servers: Summer Olympics 1996—A Case Study", In Proceedings of the 8th IFIP/IEEE International Workshop on Distributed Systems: Operations and Management, Sydney, Australia, Oct. 1997, pp. 1-10.

Gwertzman, James et al., "The Case for Geographical Push-Caching", In Proceedings of the Fifth Workshop on Hot Topics in Operating Systems, IEEE Computer Society, Orcas Island, WA , May 1995, pp. 51-55.

Gupta, G., et al., "Digital Forensics Analysis of E-Mails: A Trusted E-Mail Protocol." International Journal of Digital Evidence, Spring 2004, vol. 2, Is. 4, 11 pages.

Mambo, M., et al., "Proxy Signatures for Delegating Signing Operation," Conference on Computer and Communications Security, Proceedings of the $3^{rd}$ ACM conference on Computer and Communications Security, 1996, pp. 48-57.

Stanford-Clark, Andy, "Atlanta Olympics WOMplex", Presented at Get Connected Technical Interchange '96, IBM, Hursley, U.K., Oct. 1996, pp. IBM 000026-000037.

Van Steen, Maarten et al, "Locating Objects in Wide-Area Systems", IEEE Communications Magazine Vo 36, No. 1, Jan. 1998, pp. 104-109.

PCT International Preliminary Report on Patentability and Written Opinion, PCT/GB2005/001845, Nov. 29, 2006, 6 pages.

International Search Report and Written Opinion, PCT/GB2005/001845, Aug. 24, 2005, 8 pages.

International Search Report and Written Opinion, PCT/GB2004/004609, Feb. 22, 2005, 9 pages.

International Search Report and Written Opinion, PCT/GB2004/000805, Jun. 4, 2004, 9 pages.

International Search Report and Written Opinion, PCT/GB2005/001868, Aug. 19, 2005, 8 pages.

Faden, G., "Solaris Trusted Extensions," Architectural Overview, Sun Microsystems, Apr. 2006, [online] [Retrieved on Dec. 19, 2008] Retrieved from the internet <URL:http://www.opensolaris.org/os/community/security/projects/tx/TrustedExtensionsArch.pdf>.

Faden, G., "Multilevel Filesystems in Solaris Trusted Extensions," SACMAT'07, Jun. 20-22, 2007, [online] [Retrieved on Dec. 19, 2008] Retrieved from the internet URL:http://www.opensolaris.org/os/community/security/projects/tx/sacmat04s-faden-1.pdf>.

* cited by examiner

Note: If this is the first contact between s and r then the arrows marked * will be absent and the arrival of mail will trigger the calculations of arrows marked * (which are usually done only on periodic review) because no local importance figure will previously exist.

DETERMINING RELEVANCE OF ELECTRONIC CONTENT

CROSS-REFERENCE TO RELATED APPLICATIONS

This application claims the benefit of U.S. Provisional Application No. 60/758,828, filed Jan. 13, 2006, the entirety of which is hereby incorporated by reference.

BACKGROUND

Electronic mail is perhaps the most common form of modern communication among individuals and entities. Virtually anyone with access to a computer network (e.g., the Internet) can send and receive email. To a large degree, the use of email has replaced reliance on more traditional forms of communication, such as telephone and postal mail. In fact, for many corporations and organizations, email is now a mission-critical tool, the failure of which can greatly hinder, or altogether stop, the operations of the corporation or organization. Further, although email is already a primary form of communication as described above, the volume of email continues to considerably grow at a fast rate and merits the close attention of email administrators.

Given the heavy use of electronic mail, many email users receive hundreds of different emails a day. Oftentimes, much of the email received by an individual is irrelevant (or more colloquially, is "junk") and serves as a nuisance that the individual must navigate through. In other situations, while a certain set of received emails may all be at least somewhat relevant to the recipient, the recipient must still take the time to go through those emails to determine which ones are more important than others.

As email is received and sent over time, the recipient's "inbox" and "sent folder" becomes a vast store of information. For many corporations and organizations, email might be the most comprehensive and up-to-date repository of knowledge possessed by the corporation or organization. However, despite the potential richness of information in stored email, typical email applications are resigned to providing unintelligent mechanisms (e.g., keyword, sender, recipient, and/or date range searches) for mining through email.

SUMMARY

According to at least one aspect of one or more embodiments of the present invention, a system and computer program product include: a monitoring module configured to track actions by a plurality of users associated with an application for managing electronic content; a relevance analysis module coupled to the monitoring module and configured to determine a relevance to a user of a piece of electronic content sent from a sender to the user, where the relevance is determined dependent on a measure of a relevance of the piece of electronic content as determined dependent on one or more actions of the user on the piece of electronic content, and a measure of a relevance of the piece of electronic content as determined dependent on one or more actions of at least one other recipient of the piece of electronic content.

According to another aspect of one or more embodiments of the present invention, a method comprises tracking actions by a plurality of users associated with an application for managing electronic content, and determining a relevance to a user of a piece of electronic content sent from a sender to the user. The relevance is determined dependent on: a measure of a relevance of the piece of electronic content as determined dependent on one or more actions of the user on the piece of electronic content, and a measure of a relevance of the piece of electronic content as determined dependent on one or more actions of at least one other of the plurality of users that is a recipient of the piece of electronic content.

The features and advantages described herein are not all inclusive, and, in particular, many additional features and advantages will be apparent to those skilled in the art in view of the following description. Moreover, it should be noted that the language used herein has been principally selected for readability and instructional purposes and may not have been selected to circumscribe the present invention.

Each of the figures referenced above depict an embodiment of the present invention for purposes of illustration only. Those skilled in the art will readily recognize from the following description that one or more other embodiments of the structures, methods, and systems illustrated herein may be used without departing from the principles of the present invention.

DETAILED DESCRIPTION

In the following description of embodiments of the present invention, numerous specific details are set forth in order to provide a more thorough understanding of the present invention. However, it will be apparent to one skilled in the art that the present invention may be practiced without one or more of these specific details. In other instances, well-known features have not been described in detail to avoid unnecessarily complicating the description.

In general, embodiments of the present invention relate to a technique for determining the relative relevances of electronic mail messages. Particularly, one or more embodiments, in addition to possibly having traditional email search capabilities, may determine the relevance and/or importance of an instance of electronic mail based on, for example, user actions (e.g., what did the user do with that piece of electronic mail), other user actions (e.g., what did other users do with that piece of electronic mail), and/or administrative settings.

It is noted that although one or more embodiments are described herein with respect to traditional electronic mail, one or more embodiments may be applicable to other forms of electronic messages and content. For example, one or more embodiments may be used for determining relevance in document management applications. In another example, one or more embodiments may be used in conjunction with instant message (IM) communications and/or short message service (SMS) messages.

Figure 1B:
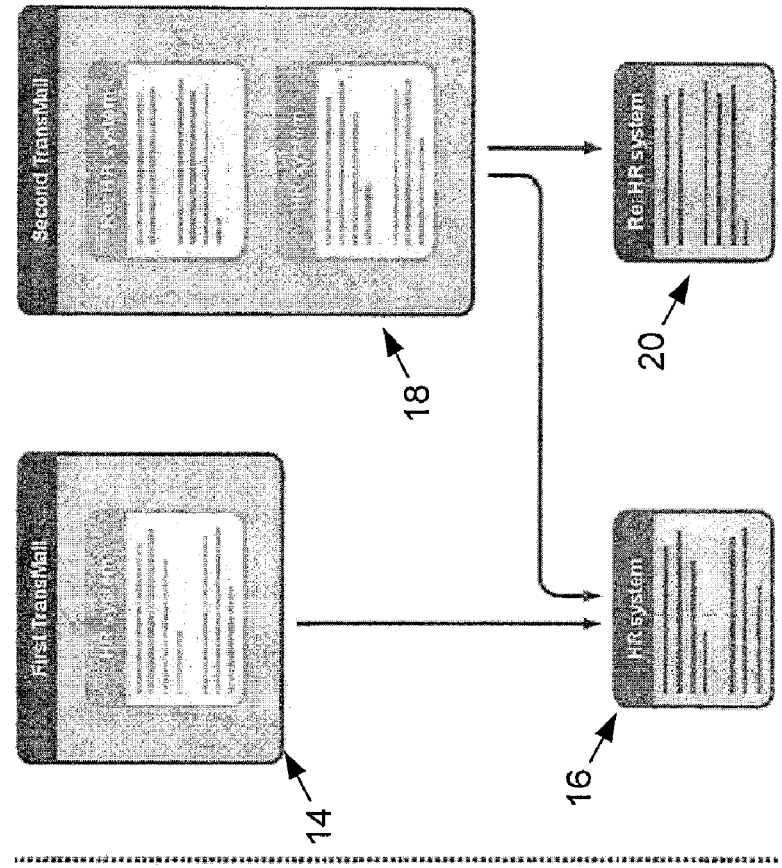
FIG. 1B shows a relational electronic mail system in accordance with one or more embodiments of the present invention.
Figure 1A:
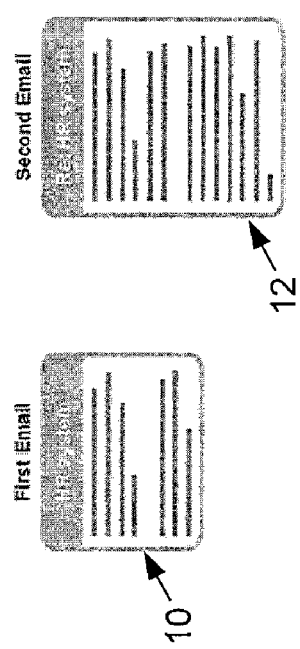
FIG. 1A shows a traditional prior art email system.

Some forms of electronic mail, such as "TransMail" developed by BLUESPACE SOFTWARE CORP., use a relational architecture. In such a relational mail system, a piece of mail written by a user is managed as a single instance object during its life in the mail system. To illustrate the use of a relational mail system, FIGS. 1A and 1B show a comparison between traditional e-mail and email and electronic mail in a relational architecture in accordance with one or more embodiments. With traditional email, a first email 10 is replied to with a second email 12, in which the content of the first email 10 is duplicated—there is no link between the first email 10 and the second email 12. In a relational mail system according to one or more embodiments, a first electronic mail object 14 points to a first message 16, and a second electronic mail object 18, representing the reply to the first electronic mail 14, points to the first message 16 and a second message 20, where the second message 20 represents the reply content. Thus, in a relational mail system, electronic mail is transacted through the use of links, or "pointers," among electronic mail objects as they are created over time.

Figure 3:
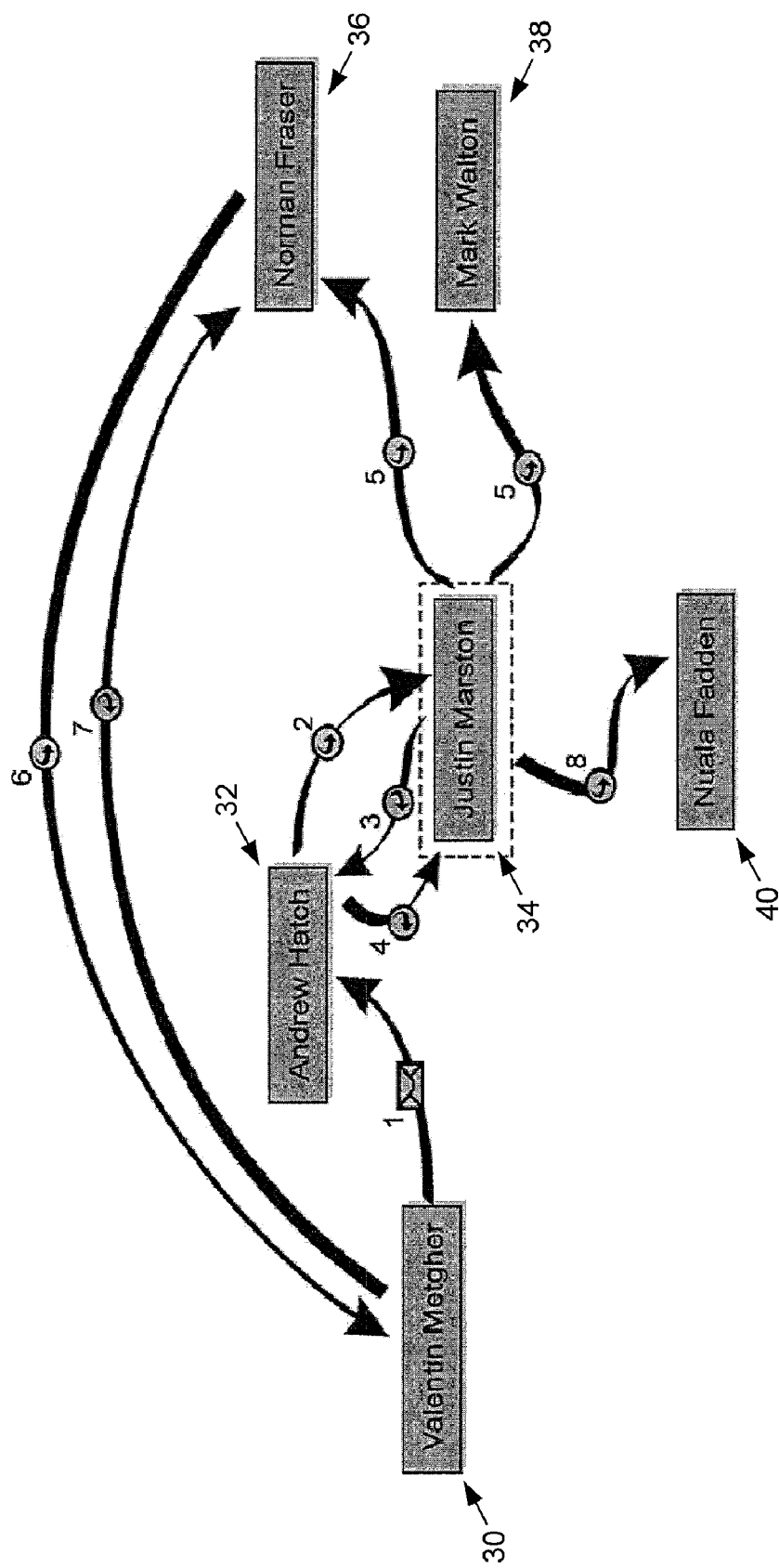
FIG. 3 shows an example of a series of electronic mail transactions in accordance with one or more embodiments of the present invention.

To further illustrate the use of links in a relational mail system, FIG. 3 shows an example of a series of electronic mail transactions (transactions numbered in FIG. 3) in accordance with one or more embodiments. In step 1, user 30 sends an electronic mail object to user 32 containing submessage A. In step 2, user 32 forwards the electronic mail object to user 34, thereby creating a new electronic mail object that contains B|A (a current submessage B, with history portion submessage A). Then, in step 3, user 34 replies to user 32, creating an electronic mail object that contains C|BA (a current submessage C, with history submessages B and A). In step 4, user 32 replies to user 34, creating an electronic mail object that contains D|CBA (a current submessage D, with history submessages C, B, and A). Then, in step 5, user 34 forwards the electronic mail object containing D|CBA to users 36, 38, thereby creating new electronic mail objects containing E|DCBA (a current submessage E, with history submessages D, C, B, and A). In step 6, user 36, seeking clarification from user 30, sends an electronic mail object to user 30, thereby creating an electronic mail object containing F|EDCBA (a current submessage F, with history submessages E, D, C, B, and A). User 30, in step 7, replies to user 36, thereby creating an electronic mail object that contains G|FEDCBA (a current submessage G, with history submessages F, E, D, C, B, and A). At some later time, in step 8, user 34 forwards the electronic mail object received from user 32 to user 40, thereby creating an electronic mail object containing H|DCBA (a current submessage H, with history submessages D, C, B, and A).

As apparent from the above description with reference to FIG. 3, a "current" submessage is a submessage at the top of the chain for a given electronic mail object. The current submessage will have been written by the user who created the electronic mail object. For example, in FIG. 1B, submessage 16 is the current submessage of electronic mail object 14 and submessage 20 is the current submessage of electronic mail object 18. In step 5 of FIG. 3, for example, submessage E is the current submessage.

The previous submessage in the chain of a given electronic mail object are referred to herein as "history" submessages. History submessages are content created before the current submessage and its respective electronic mail object. For example, in FIG. 1B, submessage 16 is a history submessage of electronic mail object 18. In step 5 of FIG. 3, for example, submessages D, C, B, and A are the history submessages. Moreover, it is noted that in one or more embodiments, a submessage may only have one history path.

Further, for a given submessage, submessages that appear in later electronic mail objects that reference the original submessage are referred to herein as "future" submessages. For example, in FIG. 1B, submessage 20 is a future submessage with respect to submessage 16. In step 5 of FIG. 3, for example, submessages F and G are future submessages, but submessage H is not because the electronic mail object created in step 8 does not include submessage E. Rather, submessage H is a future submessage in step 4 of FIG. 3. Moreover, it is noted that in one or more embodiments, a submessage may have a plurality of future paths, as it may be included in several branching forward and reply structures.

An electronic mail object in accordance with one or more embodiments may be sent to a destination external to a relational mail system in which the electronic mail object is created. For example, now with reference to FIG. 4, it shows different techniques as to how an electronic mail object may be sent to external recipients in accordance with one or more embodiments. In a first technique, a user in company 50 sends an electronic mail object 52 in accordance with one or more embodiments to recipients in company 54. This occurs by a relational mail server 56 in company 50 sending an electronic mail notification (with, for example, a uniform resource locator (URL) to the electronic mail object 52) 58 to the recipients in company 54. The recipients in company 54 may then select the URL to read the electronic mail object 52 using a web browser.

Figure 4:
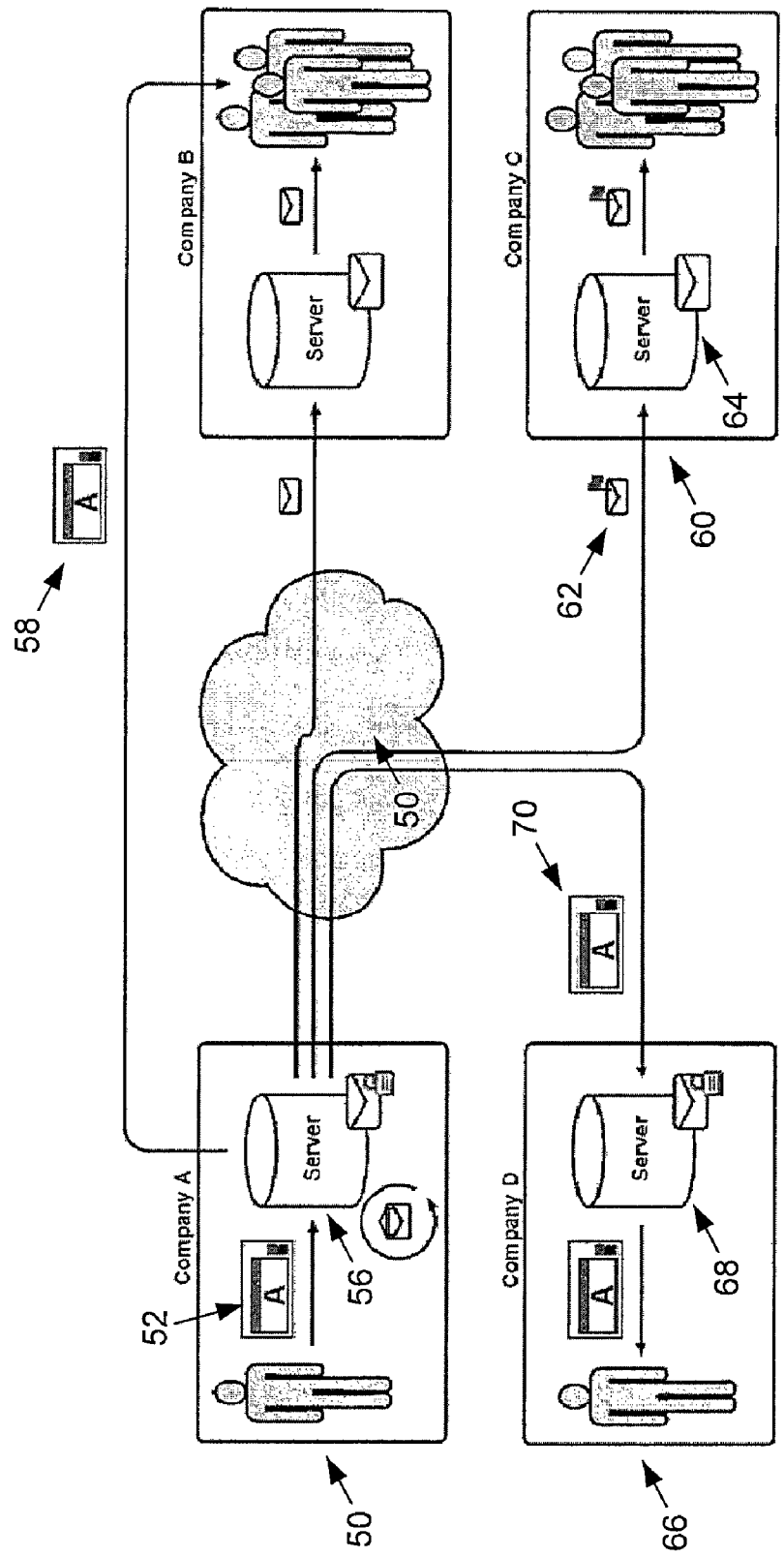
FIG. 4 shows different techniques as to how an electronic mail object may be sent to external recipients in accordance with one or more embodiments of the present invention.

Still referring to FIG. 4, in another technique, a user in company 50 sends an electronic mail object 52 in accordance with one or more embodiments to recipients in company 60. In this case, the relational mail server 56 wraps the electronic mail object 52 in a simple mail transfer protocol (SMTP) envelope 62 and sends it like a regular email to an email server 64 in company 60. The recipients in company 60 may then view the email as they normally would, without having to select a web link.

In another technique, a user in company 50 sends an electronic mail object 52 in accordance with one or more embodiments to recipients in company 66. In this case, the relational mail server 56 may determine that a mail server 68 in company 66 is a relational-type mail server, and thus, may send an electronic mail object 70 using a protocol based on web services.

Figure 5:
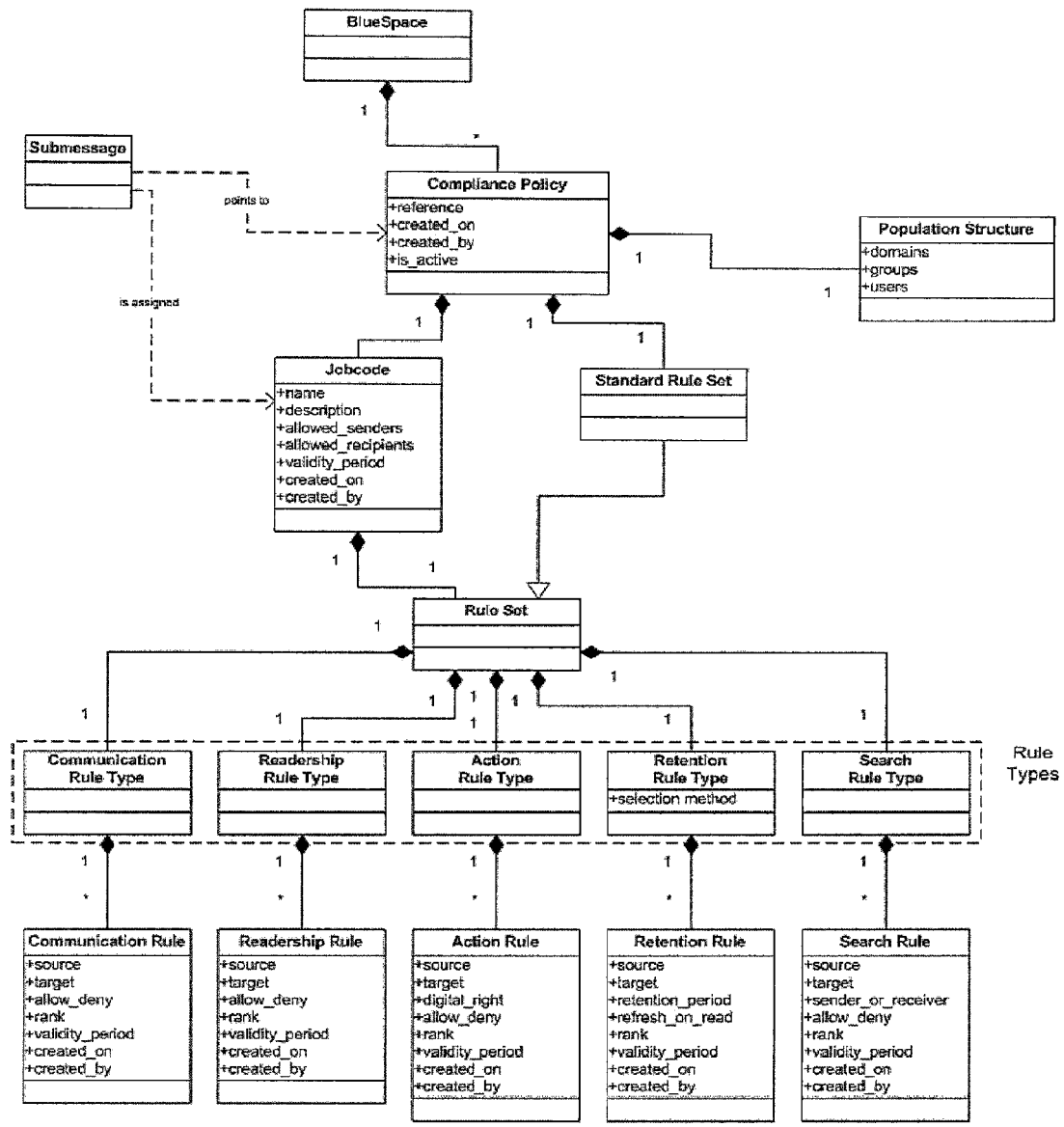
FIG. 5 shows a compliance model in accordance with one or more embodiments of the present invention.

In one or more embodiments, electronic mail content may be managed according to rules specified in a compliance model. Such a model may be used to determine, for example, how long content is kept for, who can access content, where content should reside, and other allowable actions to be carried out by users. FIG. 5 shows an example, in unified modeling language (UML) representation, of a compliance model in accordance with one or more embodiments. Using such a compliance model, search rules may be layered over a content system, determining, for example, who has the right to search different pieces of content in the system. For example, in the case of an investment bank, an analyst might have the right to search all content related to analyst processes written by other analysts; however, the same analyst may not have the ability to search content that does not pertain to his/her role in the bank.

Turning now to a more detailed description of one or more embodiments, an electronic mail relevance application helps users make sense of vast quantities of electronic mail by inferring a user's interest in content and other users based on monitoring that user's actions with in the application. Such relevance may be thought of as having at least two components: relevance, which applies to content (e.g., submessages); and importance, which applies to entities (e.g., users and job codes).

A "relevance" component may be used to rate electronic mail content in an order reflecting a user's likely interest in the content. For example, a high relevance value may indicate that the content is likely to be of significant interest to the user, while a low relevance value may indicate that the content is likely to be of little interest to the user.

An "importance" component may used to rate an entity in order to reflect a user's likely interest in content involving that entity. For example, a high importance value may indicates that a given job code is likely to be of significant interest to the user in question, while a low importance value may indicates that a job code is likely to be of little interest to the user. As used herein, a "job code" may be thought of as metadata used to track the process to which a particular electronic mail object relates.

In one or more embodiments, relevance and importance values may be determined based on monitoring users' actions. Such monitoring may occur as part of an automatic, background process. As will be apparent from the description herein, users' actions may indicate valuable information about both content and entities in the system. For example, if a user receives an electronic mail object, saves the electronic mail in a custom folder and subsequently forwards it to three other users, then the electronic mail is likely to be much more relevant to those users than if the sending user had just deleted the electronic mail as soon as he or she had finished reading it. In another example of associating relevance and importance in an electronic mail system, it is likely that a user's direct manager will be important to the user because the user will typically read messages from their manager in a timely manner, will often reply to those messages, and will send their manager a significant number of electronic mail objects. As will be described in detail further below, by monitoring a collection of user actions and then performing an analysis of those actions, valuable information may be learned for subsequent use in an electronic mail application in accordance with one or more embodiments.

As described above, a relational electronic mail system in accordance with one or more embodiments separates electronic mail objects into its constituent message objects, likely written by different authors (see, for example, FIG. 1B). The use of such constituent parts promotes a level of granularity that may used to support a relevance analysis engine that can be applied to the electronic mail system. In such a manner, behavioral information may be efficiently gleaned from the mail environment and used to help improve content relevance as presented to one or more users.

Figure 2:
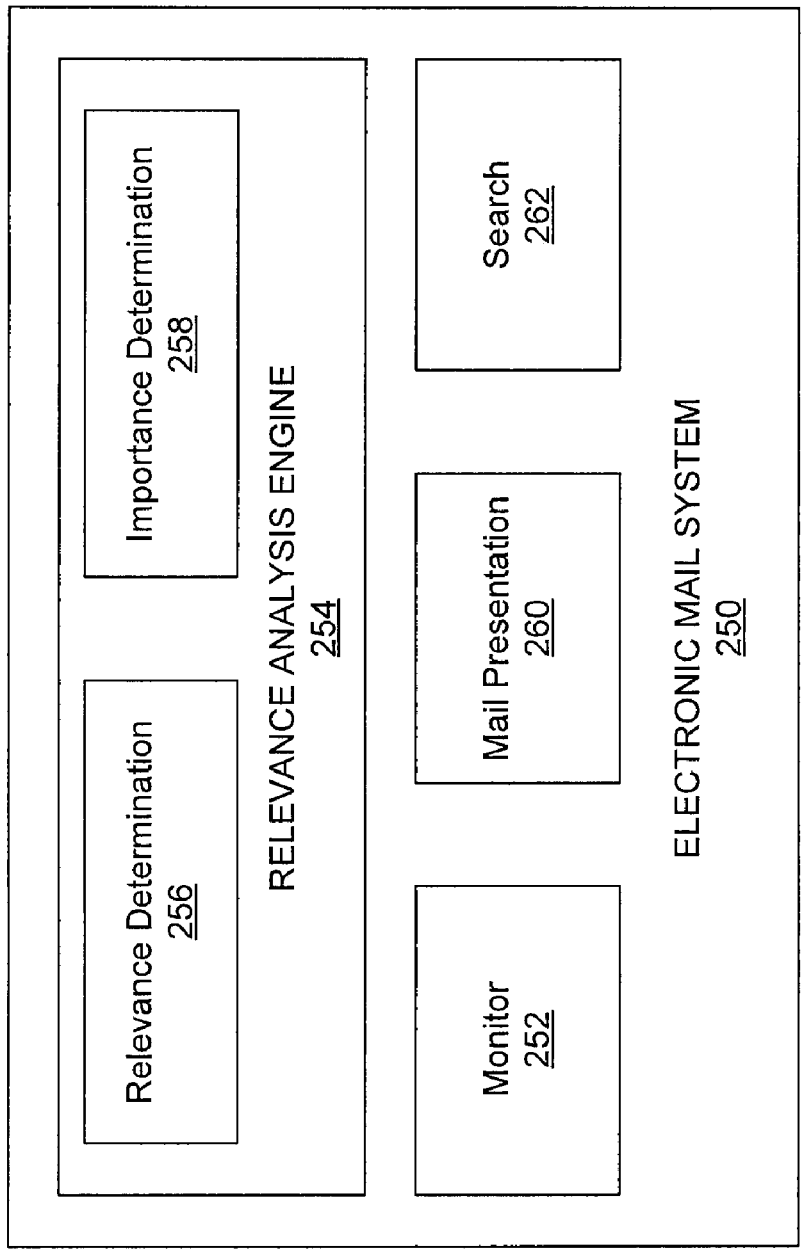
FIG. 2 shows an electronic mail system in accordance with an embodiment of the present invention.

Now referring to FIG. 2, it shows an example representation of an electronic mail system 250 in accordance with one or more embodiments. As shown in FIG. 2, the electronic mail system 250 has a plurality of modules, where a "module" may be any program, circuitry, logic, and/or functionality implemented in either software and/or hardware.

The electronic mail system 250 has a monitoring module 252, which generally monitors and registers user actions and those of users associated or corresponding with a particular user. Such behavioral information may then serve as inputs to a relevance analysis engine 254, which is formed of a relevance determination module 256 and an importance determination module 258. The relevance determination module 256 assesses user action data provided by the monitoring module 252 and calculates relevance scores for objects accessible to the user. The importance determination module 258 assesses user action data provided by the monitoring module 252 and calculates importance scores for objects accessible to the user. It is noted that operations of the relevance analysis engine 254 may not be limited to applying to any one user, but may instead, for example, be used to determine relevance and importance scores for all users in a particular organization of which the electronic mail system 250 is part. Further, the electronic mail system 250 has a mail presentation module 260, which is generally used to provide a user his/her electronic mail (along with features therewith) in accordance with the relevance and importance scores determined by the relevance analysis engine 252. Moreover, the electronic mail system 250 has a search module 262, which is generally used to provide a user with search capabilities in accordance with the relevance and importance scores determined by the relevance analysis engine 252.

Still referring to FIG. 2, the electronic mail system 250, or any combination of the modules shown therein, may run on any type of computer system (e.g., a client-side device, a server-side device, a single processor computer, a multiprocessor computer). Further, the electronic mail system 250, or any combination of the modules shown therein, may be contained on a computer-readable medium (e.g., memory, a hard drive, a compact disc (CD), a digital video disc (DVD), a magnetic tape drive, an optical drive, a universal serial bus (USB) drive, a flash drive). As contained on such a computer-readable medium, the functionality of the electronic mail system 250, or of any combination of the modules shown therein, may be partly or wholly carried out in response to one or more processors executing software instructions stored on the computer-readable medium.

Further, based on the description provided below, it will be apparent which of the modules shown in FIG. 2 may be applicable to the various techniques, uses, and functions described herein. For example, the monitoring module 252 may be used for performing any of the techniques described herein relating to tracking the actions of users in a particular environment or associated with a particular system. The relevance analysis engine 254 may be used for determining or calculating any of the relevance related values described herein. More particularly, for example, the relevance determination module 256 may be used for determining or calculating any one or more of the various types of relevance scores described herein, and the importance determination module 258 may be used for determining or calculating any one or more of the various types of importance scores described herein. Further, the mail presentation module 260 may be used for generating any one or more of the various types of web pages described herein (it is noted that in one or more embodiments, non-web user interfaces may also or instead be presented by the mail presentation module 260). Moreover, for example, the search module 262 may be used for performing any of the search techniques described herein.

An electronic mail application in accordance with one or more embodiments may help users in performing one or more of various different types of actions. For example, in a browsing mode, a user may browse through a folder of content, such as looking through newly received electronic mail objects in their inbox. In this case, the electronic mail objects may be sorted or ranked according to the relevance and importance of each. In, for example, a searching mode, a user may actively look for a specific piece of information or for information of a given type based on given search criteria (e.g., keywords, dates, specific senders). In this case, for example, a piece of content may be deemed to be more relevant to a search if two of the words in the subject are keyword search terms as opposed to if there was only one matched word. Moreover, relevance scores may be displayed to the user in response to performing a particular electronic mail action.

In regard to what types of information may be extracted from an electronic mail system in accordance with one or more embodiments, mail data, or data in an electronic mail itself (e.g., keywords, creation dates, recipient information, job codes) may be recovered. Further, mail action data, or information regarding users' actions on electronic mail content (e.g., the number of times an electronic mail has been read, the number of times an electronic mail has been forwarded), may be recovered. Further, users may themselves rate various aspects and entities in the system to improve an accuracy of the relevance analysis engine. For example, a user may provide feedback regarding the relevance of any given piece of content, and/or the user may provide feedback regarding the importance of any given entity. Moreover, a user may also change various weighting factors used to determine settings of the relevance analysis engine, where such settings may otherwise be self-adjusting.

A user may interact with an electronic mail system in accordance with one or more embodiments in one or more of various ways. For example, in the case of reading new electronic mail, when a user receives a new electronic mail object, the electronic mail system may indicate how useful to the user that content is likely to be. In another example, in the case of reading existing mail, the electronic mail system may indicate how important to the user each electronic mail object and submessage is likely to be. In yet another example, in the case of searching through electronic mail, the electronic mail system may help rank search results and indicate to the user how likely each piece of content is to be of interest.

Figure 6:
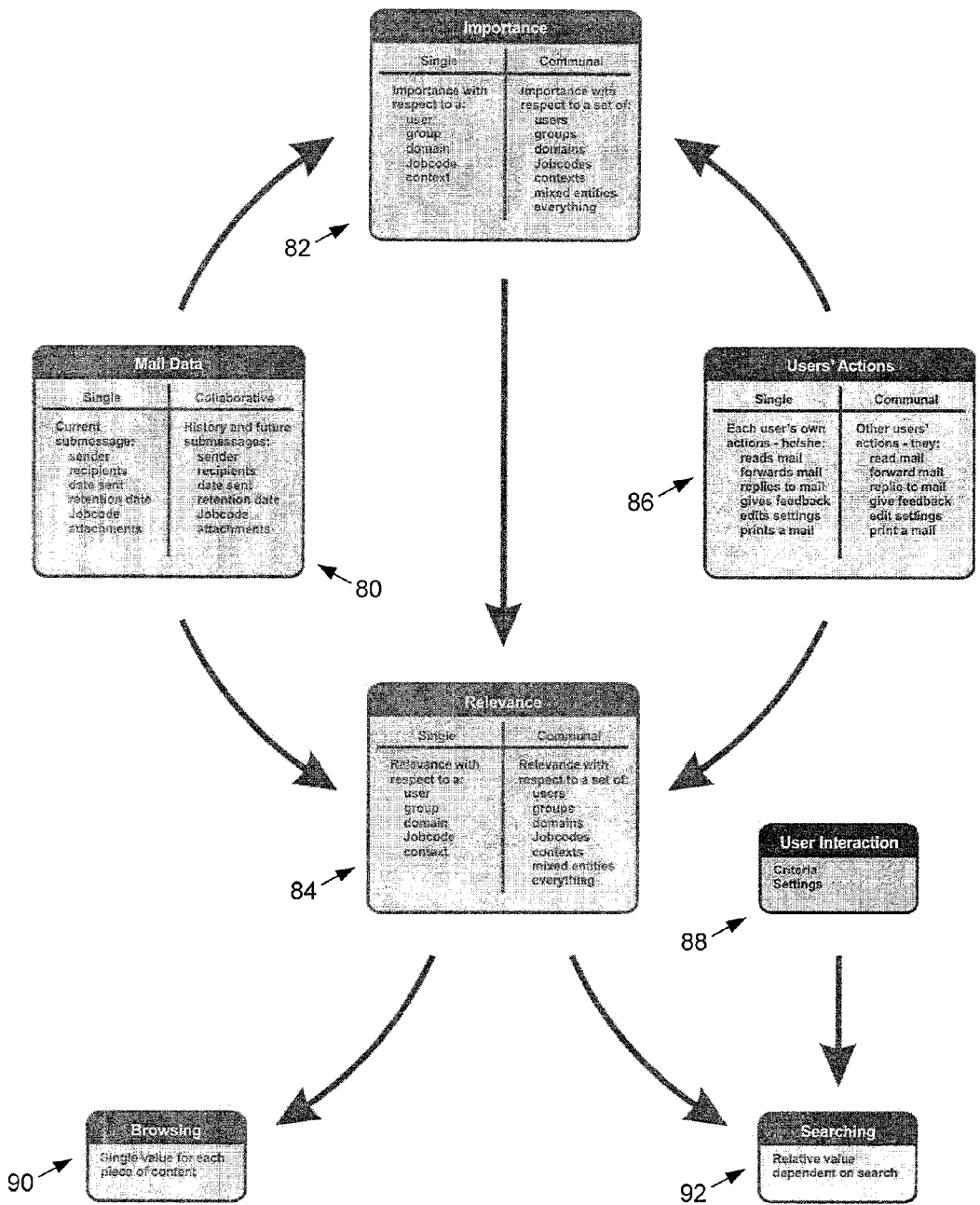
FIG. 6 shows an overview of information flow in an electronic mail system in accordance with one or more embodiments of the present invention.

An overview of information flow, including various elements and relationships described above, in an electronic mail system according to one or more embodiments is shown in FIG. 6. In one aspect, what is shown in FIG. 6 may be thought of as representing the information flow in a relevance analysis engine according to one or more embodiments. As used in FIG. 6, "single" aspects refer to individual units (e.g., content, users), and "collaborative"/"communal" aspects refer to collections of units (e.g., content, users).

Turning now more specifically to FIG. 6, mail data 80 represents properties of each electronic mail, including the current submessage (single), as well as both history and future submessages (collaborative). Mail data 80 serves as an input to importance 82 in that it determines the entities listed in the mail environment and where they appear. Further, mail data 80 acts as an input to relevance 84 as the entities involved in the mail help to determine its initial and ongoing relevance values.

Users' actions 86 represent the ways users interact with the electronic mail system, e.g. reading mails, replying to mails, changing settings. Users' actions 86 encompass an individual user's own actions and other users' actions (the communal elements of the system). These actions may help to determine relevance, as relevance is calculated based on the way users interact with content. Users' actions 86 may also help determine importance, as the importance of entities reflects the significance with which users treat them.

Importance 82 of a given entity may be stated with respect to a local importance to a single entity (e.g., "how important is John to Doug?") or a set of entities (e.g., "how important is John to the Medix drug development team?"). Importance 82 may draw input from mail data 80, which determines the "fields of engagement" for entities, and from users' actions 86, which reflect how significant a given entity is to a given user or set of users. Importance 82 may also act as an input to relevance 84, as it helps to determine the relative weightings given to different actors in the electronic mail system. It is noted that importance values for different entities may be shown in a user's graphical interface.

Still referring to FIG. 6, relevance 84 of a given piece of content may be stated with respect to a single entity (e.g., "how relevant is the electronic mail object to John?") or with respect to a set of entities (e.g., "how relevant is the electronic mail object to the Medix drug development team?"). Relevance 84 may have as inputs the mail data 80 (properties of the content in question), users' actions 86 (what users have done with the content), and importance 82 (the significance users attribute to the entities involved in the content). Various sub-aspects of relevance 84 may be identified: "local relevance"—the relevance value presented to the user as they browse through their mail folders; "incoming relevance"—estimated relevance to a recipient before an electronic mail object is opened; "post-reading relevance"—relevance assigned after an electronic mail object is opened and dealt with by a recipient; and "search relevance"—the relevance assigned by the system to items identified in a specific search by a user.

User interaction 88 is present so that when users are searching for something, they have some idea of what they are looking for and can guide the system to that content by stating criteria and changing their search settings.

Browsing 90 is an activity a user spends most of their time doing in an electronic mail system—navigating through mail folders and reading content. Local relevance acts as an input to browsing 90, helping to guide the user to the content they might wish to do deal with first. In one or more embodiments, there may be only one local relevance value for each piece of content with respect to a given user. Further, it is noted that local relevance may initially be the incoming relevance value (described above), and once the user in question has read the electronic mail object, the local relevance value may be the post-reading relevance value (described above).

Continuing with reference to FIG. 6, searching 92 is an activity that a user may use to search electronic mail amongst potentially thousands of electronic mails the user has sent and received. It is noted that the search relevance value (described above) for content relating to a given search may vary depending on the search criteria settings and/or the user's settings.

In addition to the components of the information flow shown in FIG. 6, an electronic mail system in accordance with one or more embodiments may have access to relatively independent data points by, for example, indirect "watching" of users' actions and mail data and direct "questioning" (e.g., asking users whether the results are accurate). However, such data points may vary according to users' opinions of the significance of entities and content presented to them by the electronic mail system.

As described above, mail data represents the properties of a particular electronic mail object. Such properties may include, but are not limited to, the following: keywords in subject; keywords in message body; keywords in other fields; keywords in attachments (both names and content); a signature assigned to the message; a date the content was created; the recipients of the content; whether the electronic mail object was sent to:/cc:/bcc:; the sender of the content; the body size; the attachment size; the attachment type; and flags for follow up (e.g., the sender indicates the electronic mail requires action by the recipient). Thus, for example, in one or more embodiments, a user may build a search query looking for different submessages that make up a particular electronic mail object and may specify different creation dates, senders, recipients, and/or other details for each submessage they are looking for that make up the electronic mail object.

Other criteria may also be used to leverage the relational architecture of an electronic mail system according to one or more embodiments: job codes—a mechanism for linking an entire submessage to a specific business process; context—a mechanism for linking text in a submessage to a specific process, either on a user or enterprise-wide basis; groups—sets of users across the system; domains—a naming directory across the system; priority—an urgency tag linked to notification processes; sensitivity—a confidentiality tag linked to readership and search rights; validity date—the period of time for which the content is viewable by the user; retention date—the period of time for which the content is retained by the corporation; allowed readers—the users who are allowed to read the mail; allowed geographies—the geographies to which the mail content is allowed to be sent; rule contravention—content sent that had weak conflicts (e.g., a history submessage could not be included for one of twenty recipients) or strong conflicts (e.g., a user tries to send an electronic mail object to another user with whom they are not allowed to communicate) with compliance rules, and was altered or managed appropriately by the application; other compliance interactions—various other interactions with the governance engine; other meta-style information stored relationally with respect to the mail; and other business processes that are triggered by the mail event.

Examples of scenarios in which mail data can affect relevance are now provided. In other words, the following description lists examples of ways in which mail data parameters, such as those described above, might affect relevance to a given user, either while browsing or as part of a search. In one case, if a user received an electronic mail object as one of fifty other recipients, the electronic mail object is less likely to be of relevance to the user than if the user received the electronic mail object as the sole recipient. In another situation, if an electronic mail object is flagged for follow up by the sender, it is more likely to be of significant relevance to the user. In another case, if the keyword a user is looking for is in the body, then the electronic mail object is likely to be relevant to the user. In yet another example, if a user is looking for a particular file, then electronic mails with attachments of the requested file type are relevant to the search. In another scenario, if a user is looking for a piece of content they received some time ago from a particular, important department, then criteria such as date period, priority, and department domain may be relevant to the search. In another case, if a user is looking for all content relating to a particular business transaction, and that content has been tagged with one or more job codes, then content with the appropriate job codes may be relevant to the search. In still another example, if a user is looking for content that may have caused compliance violations, then all content that caused weak or strong interactions with a given set of compliance rules may be relevant to the search. In another situation, for example, if a user is looking for all electronic mail objects that will trigger a financial purchase over the next 30 days, then the user can search for electronic mails that will cause a purchase over the defined date range.

Other scenarios may be used to leverage a relational structure of an electronic mail system in accordance with one or more embodiments to determine the "communication context" of electronic mail. Such scenarios may rely on history submessages (older submessages in the chain of the electronic mail object) and future submessages (submessages written later as part of other electronic mail objects that contain a present submessage). For example, if an electronic mail object is received by a user as a reply to an electronic mail object they themselves sent, then a submessage in the history will map to the "current submessage"—the one at the top of the chain—in an electronic mail object the user's "sent folder." In this case, the incoming electronic mail object is likely to be of significant relevance. In another example, if a particular submessage appears several times in a user's "inbox," then a new electronic mail object containing this submessage is likely to be of relevance to the user. In yet another example, if a new electronic mail object received by a user contains one or more history submessages written by the user, then it is likely that the new electronic mail object is of relevance to the user. In still another example, if historical submessages in a new electronic mail object were found to have high relevance ratings, then it is likely that the new submessage will have significant relevance to the user. In a further example, if a submessage, A does not contain a given keyword, but many submessages that were sent in replying to and forwarding submessage A do contain the keyword, then submessage A is likely to still be relevant in a search for the given keyword.

Now turning to users' actions, as described above, users' actions represent the ways users interact with an electronic mail system in accordance with one or more embodiments. The electronic mail system monitors user actions inside the electronic mail system. It is noted that such actions may be deemed important as they reflect the users' opinions of the content and the value they place on it. Examples of users' actions include, but are not limited to, the following: a user composes an electronic mail object; a user reads an electronic mail object; a user forwards an electronic mail object; a user replies to an electronic mail object; a user deletes an electronic mail object; a user files an electronic mail object in a custom folder; a user prints an electronic mail object; a user saves a local copy of an electronic mail object; a user copies an electronic mail object to their clipboard; a user links an electronic mail object (or part of a submessage) to a context; a user finds an electronic mail object as part of a search; a user includes an electronic mail object in a visualization; a user opens or saves an attachment; and a user forwards an attachment.

The relevance of users' actions relies on the user's actions to help determine content relevance for content in the user's mail folders, both sent and received. The following examples illustrate how a user's own actions may be used as an input to a relevance analysis engine in accordance with one or more embodiments. In one scenario, if a user receives an electronic mail object from another user and immediately forwards it to three other users with comments, then the electronic mail object is likely to have had relevant content. In another case, if a user receives an electronic mail object and replies to it, then the content of the original electronic mail object is likely to be of significant relevance. In another situation, if a user receives an electronic mail object from another user and immediately deletes it, it is unlikely that they perceived the content to be of significant relevance. In a further example, if a user reads an electronic mail object and then moves it to a custom folder out of the "inbox," then it is likely that the content had relevance to the user. In still another case, if a user has read a given electronic mail object many times, then it is likely to be of significant relevance to the user. In another scenario, the longer the user has an electronic mail object displayed on a screen, the more likely it is to be relevant to the user. In still another situation, if a user copies text from a given electronic mail object to their clipboard, then the electronic mail object will likely be more relevant than an electronic mail object from which the user did not copy text. In another example, if a user links a piece of content to a context, it is more likely to be of relevance to them. In yet another situation, if a user always deletes content from a specific user quickly, then it is unlikely that any content from this user is of significant relevance to them. Further, in another case, if a user always reads content from another specific user before reading content from other users in any given new set of new mail received in their inbox, then it is likely that content from this specific user is of significant relevance. In still another scenario, if a user typically only reads short electronic mail objects rather than long ones, then the chances are that short ones are more relevant to that user than longer ones. In a different case, if a user never reads messages sent to a particular group or domain, then content sent to that group or domain is likely to be of less relevance to the user. In yet another situation, if a user never reads electronic mail objects tagged with a particular job code, then this content is likely to be of little relevance to the user. In yet another example, if a user rarely reads electronic mail objects designated as lowest priority (or reads them last when browsing their "inbox"), then that lowest priority content is likely to be of little relevance to the user. In another case, if a user sends an electronic mail object to a many users, it may potentially be more relevant than an electronic mail object sent to a single user. In still another situation, if a user sends an electronic mail object and then later forwards it to other users, it is likely to be of more relevance than an electronic mail object that was sent once but never resent. In a further example, if a user reads an electronic mail object from their "sent folder," then the content is likely to be of significant relevance. Continuing with another scenario, if a user saves an attachment to their local hard disk or network system, both the attachment and the accompanying electronic mail object are likely to be of significant relevance. Moreover, in another case, if a user prints an attachment or electronic mail object, it is likely to be of high relevance to the user. In yet another case, if a user sends an electronic mail object to their supervisor, the electronic mail is likely to be more relevant than an electronic mail object sent to a junior secretary. In still another situation, if a user sends an electronic mail object with extensive formatting, it is more likely to be relevant to the user than if they only wrote a few lines of plain text. In another example, if a user has not accessed the folder in which the content is stored for over a year, then it is likely that the content is not particularly relevant.

As described above, the actions of other users may also be used to determine the relevance of content in a given user's folders, both sent and received. Examples of such actions are now described. In one case, if a user sends an electronic mail object to someone, and that someone reads the electronic mail object, then that electronic mail object is more likely to be relevant (to both the receiver and sender) than if the recipient did not read it. In another situation, if a user sends an electronic mail object to a group of users, and most of the recipients reply to the electronic mail object, forward the electronic mail object, and/or copy the electronic mail object to custom folders, the electronic mail object is more likely to be generally or globally relevant than if the recipients immediately deleted the electronic mail object. In another scenario, if most other recipients of an electronic mail object delete it as soon as it arrives in their "inbox," then the recipient in question will probably not find the content particularly relevant. In still another example, if most other recipients copy a given electronic mail object to a custom folder (or reply or forward it) once they have read it, then the recipient in question will probably find the content to be of significant relevance. In yet another case, if a given user is always copying another user on their mail content (e.g., an employee copying their supervisor), then the content is less likely to be of relevance to that other individual. In a further example, if a user sends a submessage to another user, but the recipient does not read the submessage, then this may have an affect on the relevance of the content. In another situation, if the vast majority of the users in a given department read a piece of content sent globally, then the content is likely to be relevant to another user in that department. In still another scenario, if the majority of other users tend to read content linked to a particular job code, then content attached to that job code is more likely to be relevant to the user in question. Further, for example, if the majority of other users tend to read content linked to a particular context, then content attached to that context is more likely to be relevant to the user in question. In another situation, if most users read content from a particular author (e.g., a supervisor), then content from this author is typically of greater relevance than content from a different author that is not widely read. In yet another case, if most users reply to content from a particular author (e.g., a supervisor), then content from this author is typically of greater relevance than content from a different author not widely replied to.

In one or more embodiments, in addition to considering content and users' action with content, an electronic mail system may analyze the importance of particular authors and entities when determining relevance. Such entities include, but are not limited to, the following: users; groups; domains; folders; job codes; contexts (categories to which pieces of content can be assigned); signatures; other business process information; and back-end/automated actors (e.g., external computer systems). As an example of a use of relying on the importance of authors and entities when determining relevance, in an organization, every member or employee may have an importance rating for other members/employees. In such an environment, it is likely that a member/employee would find other individuals who report to them and those to whom they themselves report to be of greater importance than individuals working in a different department.

Importance, as determined by a relevance analysis engine in accordance with one or more embodiments, may be a relative value, respective to each user (or other entity) in the system. For example, users, groups, domains, and other entities may all have different relative importance values describing a particular job code. As such, it is possible to calculate an overall importance value for any given entity in the system, which describes that entity's importance to the entire organization, where "organization" may be defined as all the users of all the entities. This calculated importance value may be referred to as the "global importance value" for that entity.

Further, in one or more embodiments, the importance for a given contact may be represented as a pair of different values. A first value may reflect the user's interest in content they received from the contact, and a second value may reflect the user's interest in content they sent to the contact. While in some cases, these two values may be similar, in other cases, they may not be similar. For example, if a particular supervisor is extremely talkative or verbose, he/she may have low importance when sending content to other users, but those other users may view the supervisor as being very important when they themselves are initiating the communication.

Moreover, it is noted that different users' actions have different effects on relevance, due to varying importance factors. Thus, for example, if a user, such as a supervisor, deletes a particular electronic mail object, then this will have a greater effect than if a junior secretary deletes the electronic mail object. Also, importance may have multiple feedback effects. For example, if user B receives an electronic mail object from user A, and then user B forwards the electronic mail object to user C who is of high importance, then this affects the importance of all three users.

Now turning to another example illustrating the use of importance values, in an organization with, for example, 100,000 employees, it is likely that any given user will communicate with new contacts each week. As described above, importance is a relative factor for each pair of users' (or entities') interactions and is stored with respect to each user. However, when a new contact communicates with a user for the first time, the system may still make a "best guess" about that new contact's importance based on communal importance (described above with reference to FIG. 6). This importance value may then change as the user interacts with this new contact. The first "best guess" value may be important nonetheless because in a system with a large population, the usability may be hampered if the importance value of every new contact started at a particular default value.

In one or more embodiments, an organization may decide to tie importance to roles instead of or in addition to specific users. This approach may be particularly likely in highly-regimented environments, such as the military, where roles are of greater significance than the actual human personality involved.

Now turning to some examples illustrating the use of roles for determining importance, if a user moves position within a company, their role will likely change, and, in turn, they will have greater relevance to some users and less relevance to others. Thus, an organization may choose to integrate their personnel system with a mail relevance analysis engine in accordance with one or more embodiments. When a person moves positions, the learning sensitivity of the engine with respect to that user may be increased, so that the relevance and importance values may reach their new equilibrium more quickly. Further, the increased sensitivity may be decreased according to an appropriate statistical function over time, until the sensitivity is at regular levels.

In another situation, if a user moves into a role that was previously filled, the relevance identity for the previous occupant of the role may also act as an input to the individual taking on the new role. This may be referred to as "role importance," which is a factor of a role holder's local and global importance values. This further reflects the blend of role and the user's own identity in determining importance values and relevance of associated electronic mail content. Thus, for example, a person moving into a new role may still attach the same importance to content received from their spouse, but would likely move to a different importance value for their new supervisor.

Further, it is noted that may exist scenarios in which a single person has multiple roles, in which case, they may be able to send and receive electronic mail using different user accounts. Another possible scenario is when a single role is shared by a number of different individuals, all of whom write and receive content using a single account. In this case, an organization may choose to treat the role as a single entity in isolation (so there is no correlation with the users using the account). Alternatively, in one or more embodiments, an organization may specify a blend of the person's identity and the role being used, in which case performing an action while signed into one account affects the values in other accounts.

As described above, in a large system, a user may often be interacting with a new entity for the first time. One approach to setting an initial importance value in these cases is to recognize correlated or cognate entities. This may be done, for example, through the use of tree structures. For example, one human resources employee is generally likely to have similar importance as another one, especially if they are of similar position in a tree structure (e.g., they both work in employee appraisal form processing). Further, it is noted that in one or more embodiments, branched structures, such as knowledge taxonomies for contexts and directories for users and job code hierarchies, may be used as a correlative basis for importance on an ongoing basis. Thus, for example, an importance change for one user may have a cascading "ripple effect" for similar users.

In regard to recognizing "cognate" entities are referred to above, an electronic mail system in accordance with one or more embodiments may identify a "cognate group" for a user, based on historical actions. More particularly, for each user, over time, the system may identify a cognate group of the n other users regarded as most similar. Such a group may be defined by similar past user actions and assessments, and/or a direct input by a user. Further, it is noted that it may not be inherent that the population of recipients falls into separate and mutually exclusive cognate groups. Rather, each recipient may have their own cognate group of those the system regards as most similar to that recipient. Thus, for example, in a certain case, user A may be in user B's cognate group because user A is part of a group of n users most similar to B, but at the same time user B may not be in A's cognate group because there are n other users more similar to user A than is user B. Accordingly, it may be assumed in certain instances that the actions of this particular group on an electronic mail object will give more indication of its relevance to the user than would a global reaction to the electronic mail.

In addition to the actions that users perform in an electronic mail system in accordance with one or more embodiments, the electronic mail system may take direct user input to help determine relevance as described above with reference to FIG. 6. In this regard, users may be thought of as having an "importance slider" for other users in the electronic mail system. For example, a user might make their boss "very important" and mark their junior, sales clerk "rarely important." Such weightings may be considered by the mail relevance analysis engine described above.

As to the "importance slider" referred to immediately above, a piece of mail content, or a submessage, may be presented to the user along with a slider that indicates its current local relevance score. The user may move this slider and apply the change in relevance to that specific piece of content, or the user may add that change back in to how relevance is calculated across the whole user's mailbox.

Further, to assist in providing tangible data points for the relevance analysis engine, one or more embodiments may also directly query the user on the relevance of content sampled from the system. It is noted that such a sampling mechanism may also be used as a way to corroborate data. For example, in one case, researchers may be asked to rate the usefulness of a piece of content to the project they are currently working on. In another case, rather than asking the user to rate the relevance of a piece of content, the electronic mail system may query the user to rate their estimation of whether the content is true. Moreover, sampling may be conducted in a random or structured manner.

In addition to an end user being able to affect relevance directly for their own "inbox," certain "super-user" roles may have the ability to affect relevance across the entire system, or at least a considerable portion thereof. In other words, for example, a "relevance administrator" may provide a boost to communications from a particular department. At least one reason for such manipulation is that relevance may not be a purely user-centric phenomenon—a separate question may relate to relevance for the entire organization.

As described above, an electronic mail system in accordance with one or more embodiments may have a relational mail architecture, in which each piece of content written by a user is managed as a single instance object during its life in the mail system. The granularity of such an architecture may allow the electronic mail system to record all actions by users in the system, ensuring that the system has audited the entire lifecycle of the content. Further, relevance determination techniques in accordance with one or more embodiments may be applied to electronic mail at different levels. For example, relevance analysis may be applied to an electronic mail unit, where such a unit is considered as a whole regardless of what other electronic mails the unit contains. Such electronic mail unit analysis may be considered as a basic approach to determining relevance in electronic mail content. It allows relevance to be based on simple criteria such as, for example, the number of recipients, whether the user in question received the electronic mail object as a to:, cc: or bcc: recipient, the importance flag of the electronic mail object, and the time it was sent.

At another level, relevance analysis may be applied to relationally restructured electronic mail, where electronic mail is broken into its component messages, and the relational structure of the electronic mail system is mapped to the electronic mail store. In one or more embodiments, an electronic mail system may have the ability to analyze regular electronic mail content and convert it into a relational system. When the electronic mail system structures information once it has already been sent, the criteria for search may be, for example, keywords and other standard inputs, user mail flow actions (e.g., compose, reply, and forward), and communal user mail flow actions (e.g., compose, reply, and forward).

When an electronic mail system in accordance with one or more embodiments is integrated with an electronic mail environment at the application level (as opposed to being a purely "downstream" process), then one or more of the following criteria may be used: user mail management actions (e.g., read, forward, reply, delete and file to custom folder); user attachment management actions (e.g., view, forward, save to disk); and mail content path (e.g., tying together multiple instances of the same electronic mail). By using a relational architecture for regular electronic mail, an electronic mail system in accordance with one or more embodiments allows for the searching of regular electronic mail, with a similar relevance system to that of a search engine used for an electronic mail system operating on electronic mail objects as described above with reference to FIG. 1B.

Integration with a conventional email system may be achieved in various ways. In client-side integration, for example, a plug-in to the email client may be used to monitor end users' actions on the mail content. In server-side integration, a relational electronic mail server (e.g., one developed by BLUESPACE SOFTWARE) may be connected to the legacy email server and tag content with "flags" so that it can track what happens to the content. Examples of these two mechanisms are shown in FIG. 7.

Figure 7:
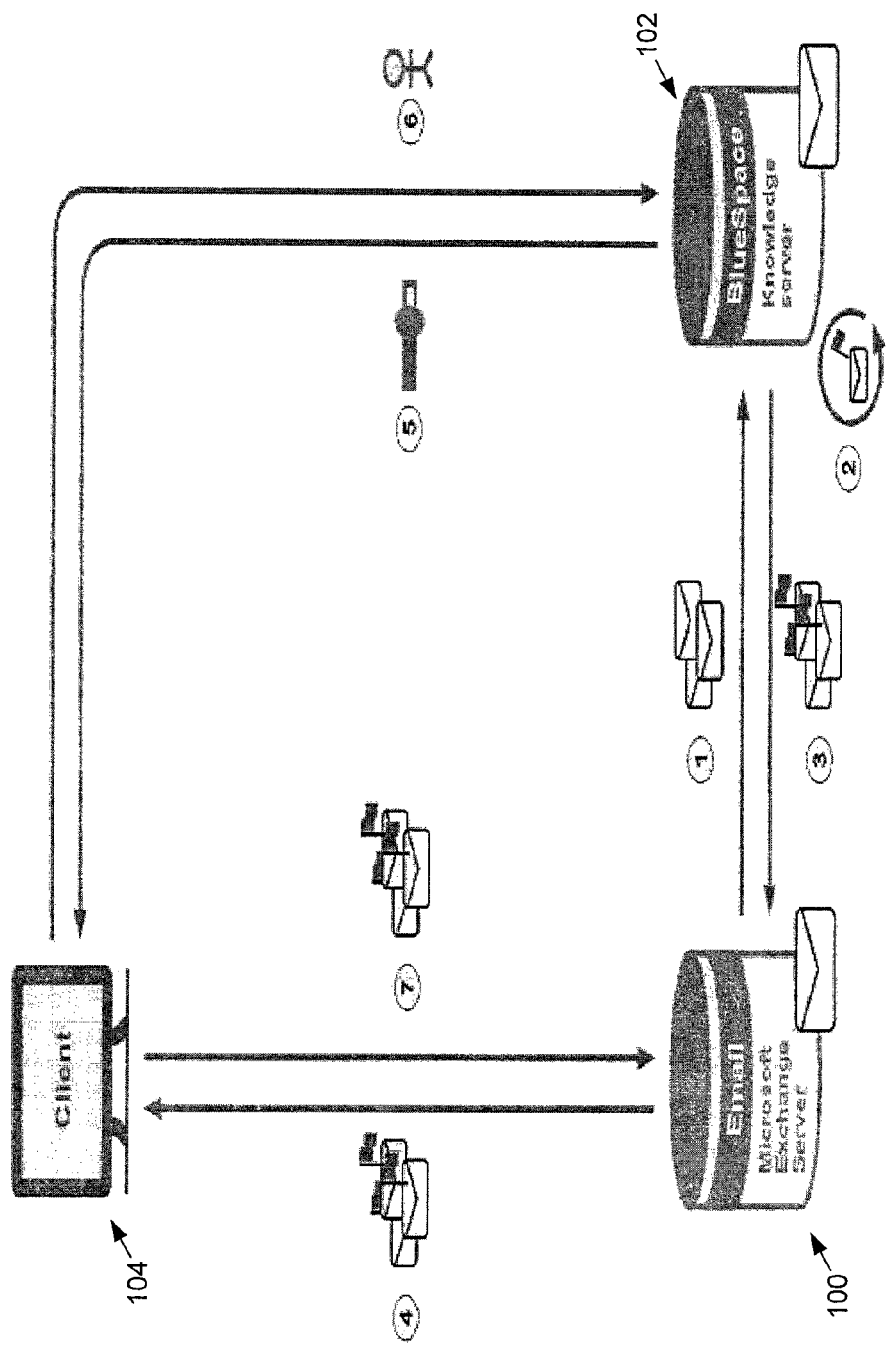
FIG. 7 shows an electronic mail system integration in accordance with one or more embodiments of the present invention.

Turning to the processes shown in FIG. 7, in step 1, new email received by a legacy email server (e.g., MICROSOFT EXCHANGE) 100 is retrieved by a relational knowledge server (e.g., one developed by BLUESPACE SOFTWARE) 102. In step 2, the knowledge server 102 adds meta-tags to each email in an effort to track that content through the lifecycle. In step 3, the tagged emails (represented as having flags) are then replaced on the email server 100. In step 4, an email client (e.g., Microsoft Outlook) 104 downloads the tagged emails. In step 5, a plug-in to the email client 104 immediately retrieves the current relevance values for the content. Then, in step 6, the user carries out actions on the content in the email client 104, and the plug-in records these actions and sends them back to the relational knowledge server 102. In step 7, one of the actions carried out by the end user is to send emails in replies and forwards—these include the meta-tags positioned by the relational knowledge server 102.

Still referring to FIG. 7, it is noted that steps 5 and 6 may form a continuous feedback loop, where each time the user carries out an action, a corresponding relevance value changes. Further, plug-in to the email client 104 may also interact with search results to include and reflect the relevance values in the search listings.

Now turning to the use of one or more embodiments for research or forensics purposes, as the volume of email transacted has increased, so has the challenge for productively searching through vast quantities of email. A relevance analysis engine in accordance with one or more embodiments may be applied to regular electronic mail (as described above with reference to FIG. 7), with one or more important benefits for forensics processes. In one aspect, the relevance analysis engine may combine a granular analysis process with a particular relevance algorithm (detailed examples of which are further described below). Content that meets certain criteria including relevance parameters may be flagged for human inspection, and the most important individuals in a community may be inferred automatically. In another aspect, the relevance analysis engine may allow for the determination of similar or "cognate" entities and users by automatic analysis of users' actions (as opposed to attempting taxonomic structuring based on automated content analysis). This is based on "fingerprinting" different users (and entities) for similar direct and passive behavior. In still another aspect, high-level representations of user communities and sub-communities may be created based on a granular understanding of that community's interactions. This may reflect the importance of different individuals, based on the same flow analysis mechanisms for relevance described herein. In yet another aspect, increased granular capabilities in an electronic mail system in accordance with one or more embodiments allows for advanced visualization of communication communities. In another aspect, the approaches described immediately above may be combined for improved content sampling, through either or both of fully automated sampling and interactive human sampling. Further, it is noted that one or more of these approaches may be essentially language neutral.

Turning now to a description of user interface aspects relating to an electronic mail system in accordance with one or more embodiments, there may be several pages of an electronic mail application that include one or more of the various relevance and importance aspects described above. Such pages may include, for example, a mail view (when a user is viewing a single electronic mail object), a folder view (a folder listing showing many electronic mail objects), an address book (a list of contacts, groups, and domains), and preferences (a list of information). Each of these is described in detail below.

In a mail view, a user is looking at a single electronic mail object and is able to see its entire content. An extension of this view is a reply view, as shown in 8. There are various relevance sliders in FIG. 8, one for each submessage in the mail view and one for the entire electronic mail object, taking into account the current submessage and all history submessages. Relevance sliders 118 for history submessages may only be shown when the submessage is expanded, as in the second history submessage in FIG. 8.

When a user hovers their mouse over a relevance slider, a pop-up window may appear, indicating why a particular relevance value is as it is, thereby potentially helping the user understand how the relevance value was determined. A similar pop-up window may appear for importance sliders, as further described below.

The user may provide feedback to the relevance analysis engine by changing the level of any given slider. When a user clicks and drags the level, the application may display a pop-up window above the slider indicating the value to which the user has moved the slider. The respective values may, for example, be: "irrelevant"—0% to 10%; "slightly relevant"—11% to 30%; "relevant"—31% to 70%; "highly relevant"—71% to 90%; and "critical"—91% to 100%.

Figure 8:
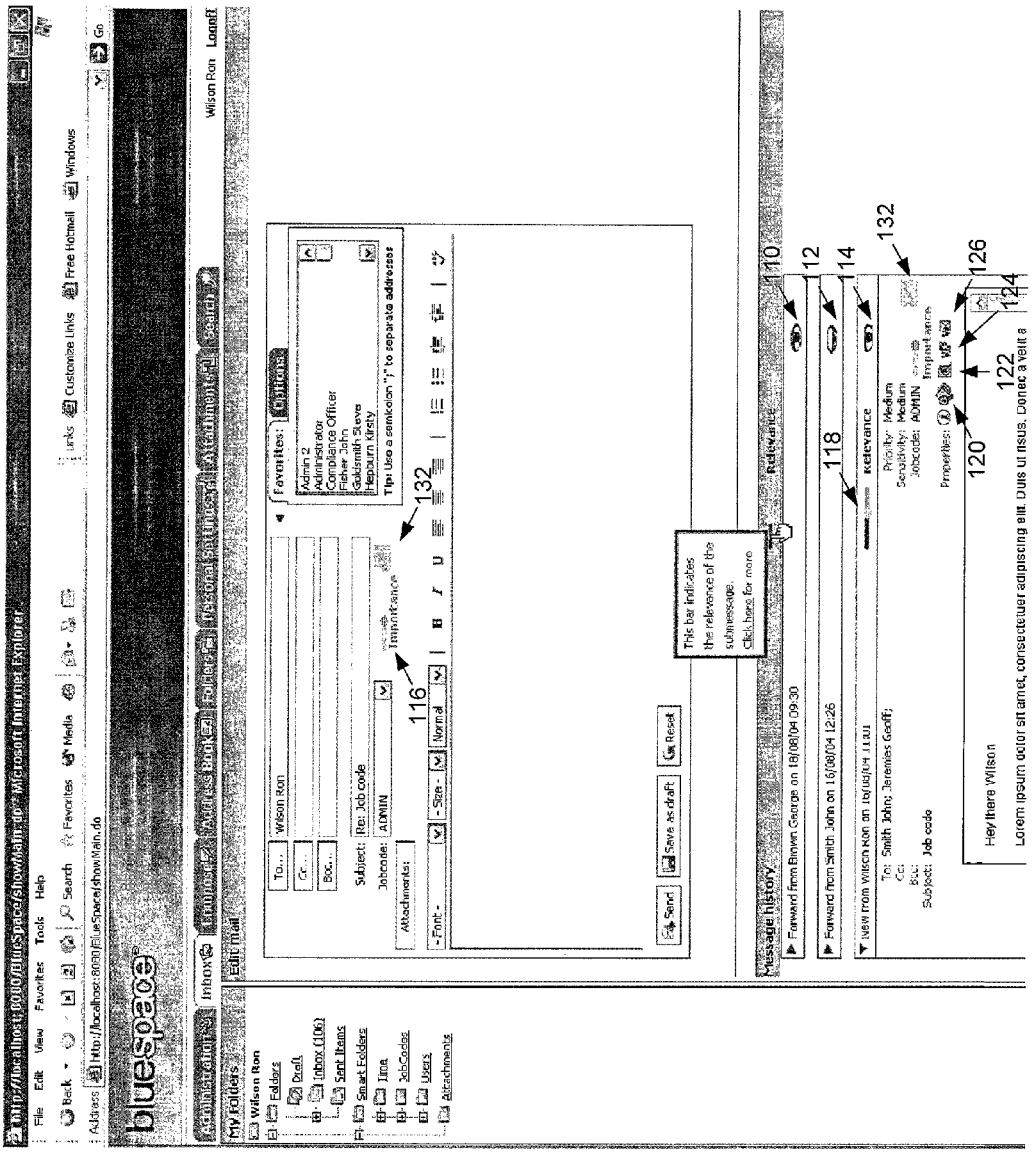
FIG. 8 shows a screenshot of an example of a mail view web page in accordance with one or more embodiments of the present invention.

Further, the user interface may indicate to the user which submessages they have already seen before (e.g., in the case of a reply history) and which are new (e.g., in the case of a forward history). This is shown in FIG. 8 via the state of the illustrated "eyes" 110, 112, 114 in each submessage. If the eye is open (e.g., eyes 110, 114), the user has seen the submessage, and if the eye is closed (e.g., eye 112), the user has not seen the submessage. Thus, as shown in FIG. 8, if the active user (Wilson Ron) opened the submessage from Smith John, the respective eye icon for that submessage would become open.

FIG. 8 shows further icons. Icon 120 allows the user to see a custom search folder, showing every electronic mail object that contains the given submessage. Another searching icon 122 allows the user to search for similar content to the given submessage, as determined by a search algorithm. Two more icons 124, 126 allow the user to view the lifecycle of any given submessage, spawning pop-up windows (not shown in FIG. 8) that visualize its path through the system and all users that have carried out actions on it.

In addition to relevance feedback, the mail view may present information on importance. Job code importance and other custom created variables may be given importance sliders 116, as shown in FIG. 8. A user may alter an importance slider, and either lock it at the new value or allow it to recalculate over time.

Further, in one or more embodiments, in addition to or instead of being able to provide feedback to a relevance analysis engine by moving relevance sliders, a user may also be requested to provide direct feedback on a sampled basis. In this case, for example, the user may be asked to directly rate the relevance of a given electronic mail objects, thus presenting the relevance analysis engine with a direct relevance data point, as opposed to correlating relevance with the user's actions. Such direct user questioning is illustrated in box 129 shown in FIG. 9.

Figure 9:
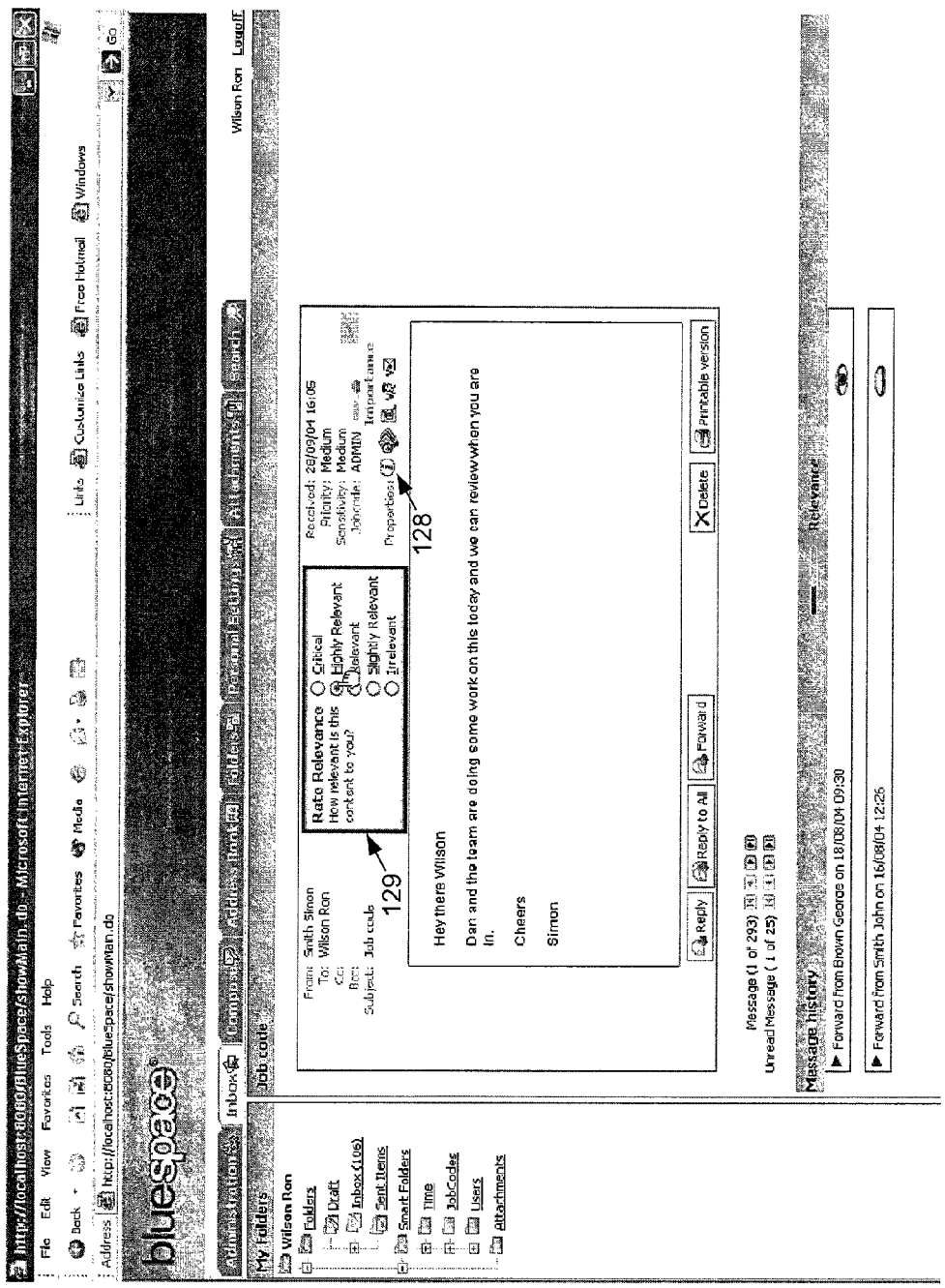
FIG. 9 shows a screenshot of an example of a mail view web page in accordance with one or more embodiments of the present invention.

As depicted in FIG. 9, a user may not be forced to set the relevance value before being able to leave the mail view; however, in one or more embodiments, the interface may indicate that it is important for the user to do so. In one or more embodiments, it may be important that a high response rate be achieved for such relevance rating questions, as the effectiveness of the relevance analysis engine may correlate to the lack of bias in the survey sampling.

The number of times a user is asked to rank content may be determined based on their usage frequency (e.g., every 100 mail views) or absolute time (e.g., 5 times per week). A system administrator may determine this value, with the option to allow users to customize it through their preferences. Further, in one or more embodiments, a system administrator may also make direct user interaction mandatory for scenarios in which user feedback is required.

In one or more embodiments, direct feedback values submitted when users assign relevance to content through the survey function may be particularly helpful in the early stages of a given system. Such values help provide reliable relevance values to stabilize the weightings given to each type of user action. A system administrator may thus be able select a time-based factor to decrease the frequency of surveying users. Alternatively, a system administrator may base decreases in sampling frequency on statistical results derived from, for example, the stability of the global weighting factors.

Figure 10:
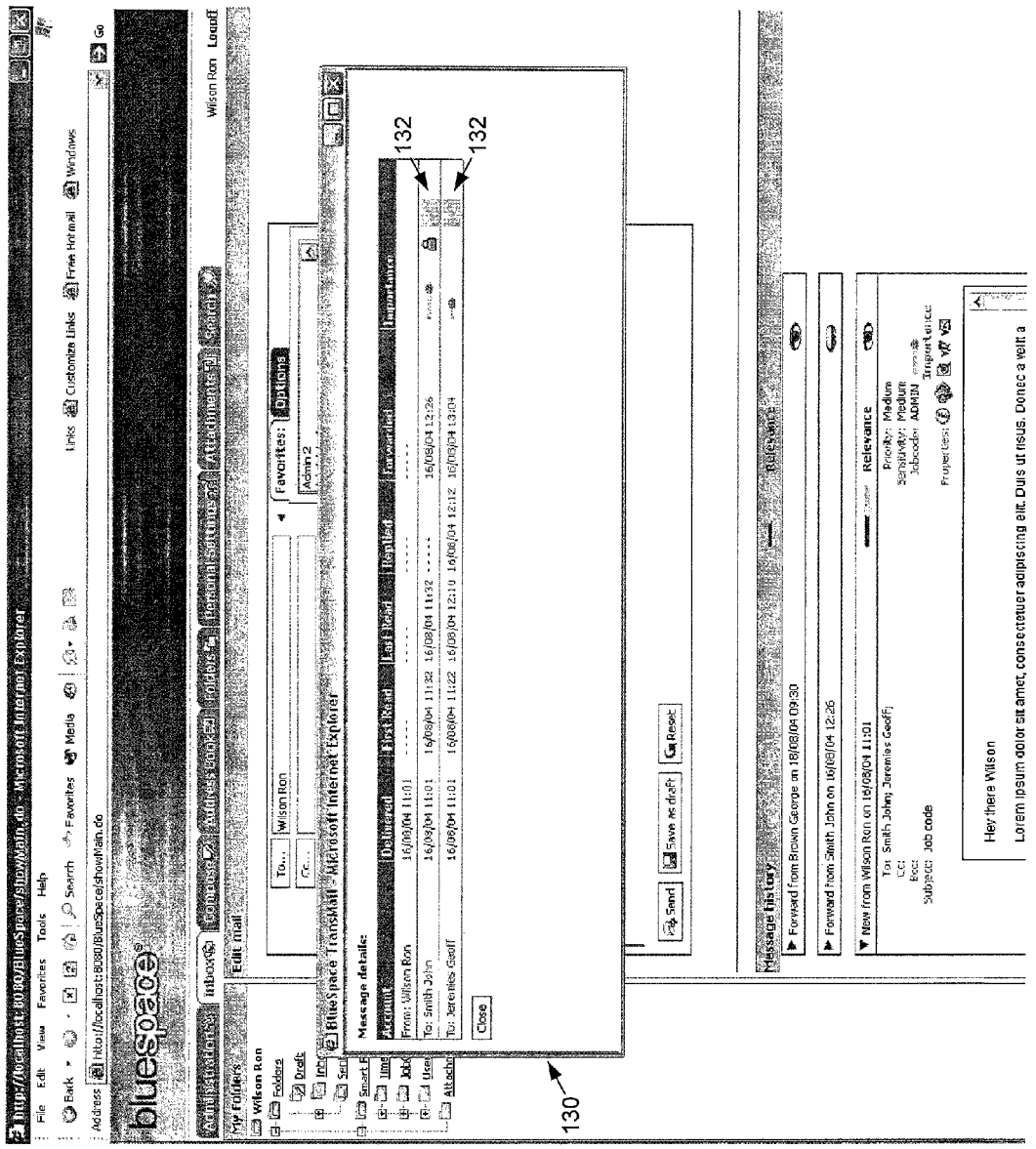
FIG. 10 shows a screenshot of an example of a mail view web page in accordance with one or more embodiments of the present invention.

Still referring to FIG. 9, in regard to users' actions and users' importance (as well as that of groups and domains), rather than clutter the interface with all this information by default, the application may allows the user to click details icon 128, which, when selected, displays a new box (not shown in FIG. 9) that presents this information, as shown in FIG. 10. The box 130 shows, for example, the sender and each recipient of the electronic mail object, their actions on the content (forwarding, replying), and the importance of each recipient.

Figure 11:
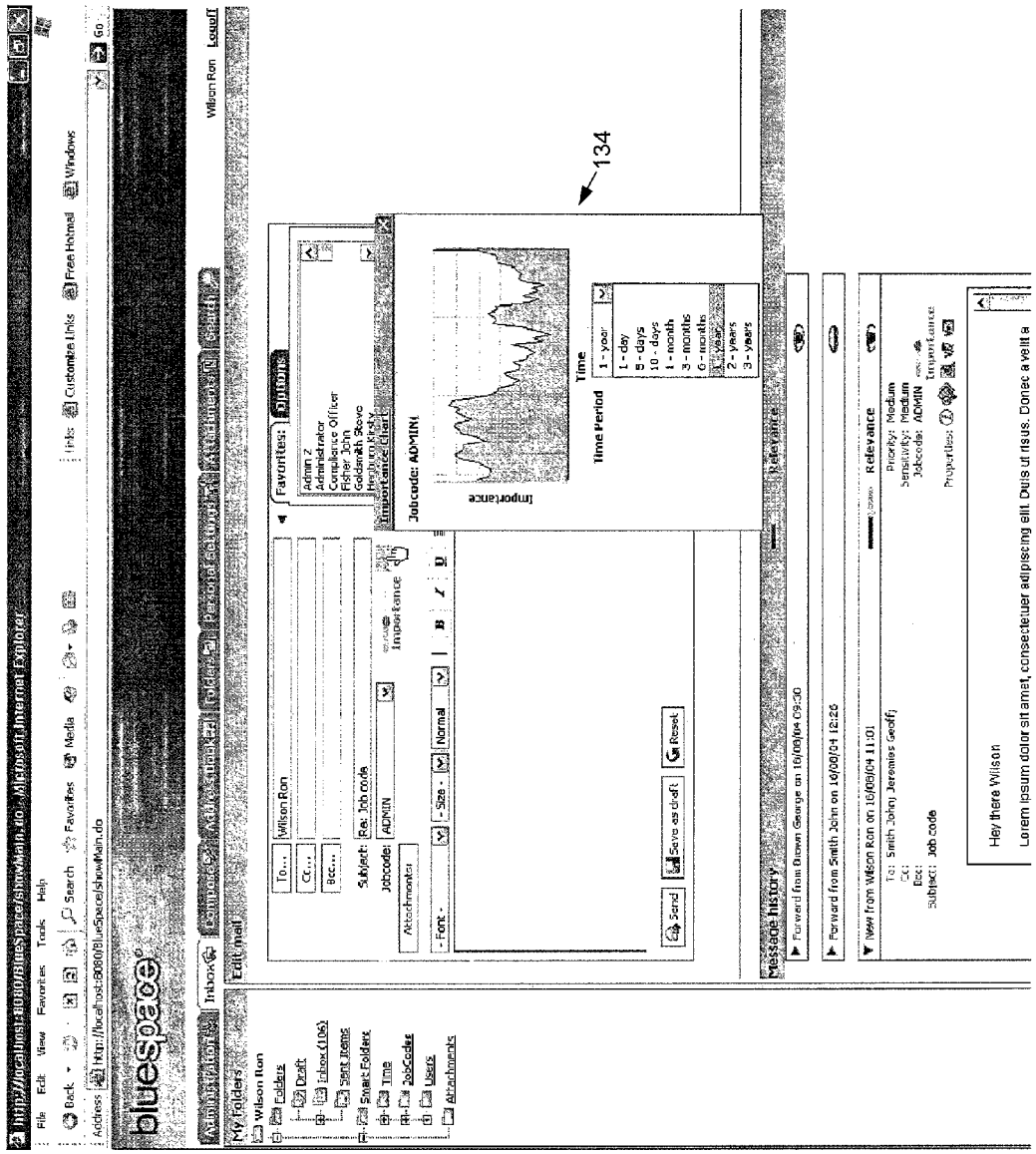
FIG. 11 shows a screenshot of an example of a web page with an importance chart in accordance with one or more embodiments of the present invention.

Further, it is noted that importance may change over time. For example, when a user is interacting strongly with another user on a given project, then that other user may be of greater importance at that point than a year after the time when the project has finished. In another example, if a user is working on a deal linked to a specific job code, that job code may be of greater relevance during the deal than six months after the deal has finished. The chart icons 132 in FIGS. 8 and 10 may be used to generate a chart showing the evolution of importance over time (for a definable period set by the user), as shown in the pop-up window 134 of FIG. 11.

Figure 12:
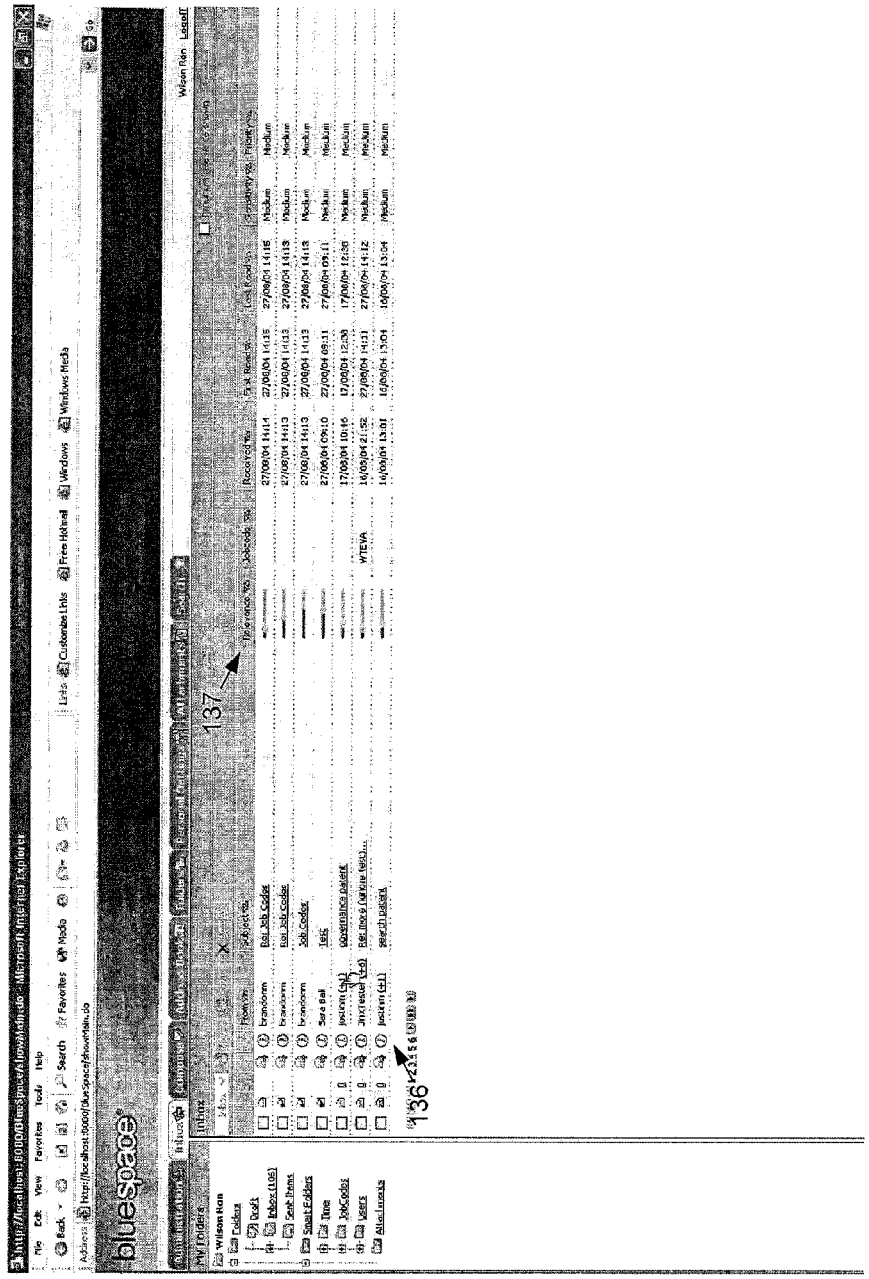
FIG. 12 shows a screenshot of an example of a folder view web page in accordance with one or more embodiments of the present invention.

Now turning to a folder view as described above, reference is made to FIG. 12. As shown in FIG. 12, there is a relevance column 137, which shows a relevance slider (shown, but not labeled) for every electronic mail object in the folder listing. As in the mail view described above, a user may move a relevance slider to provide feedback to the electronic mail application. In addition, the user may click the details icon 136 which, when selected, presents a similar box as that shown in FIG. 10, indicating users' actions and importance indicators.

Figure 13:
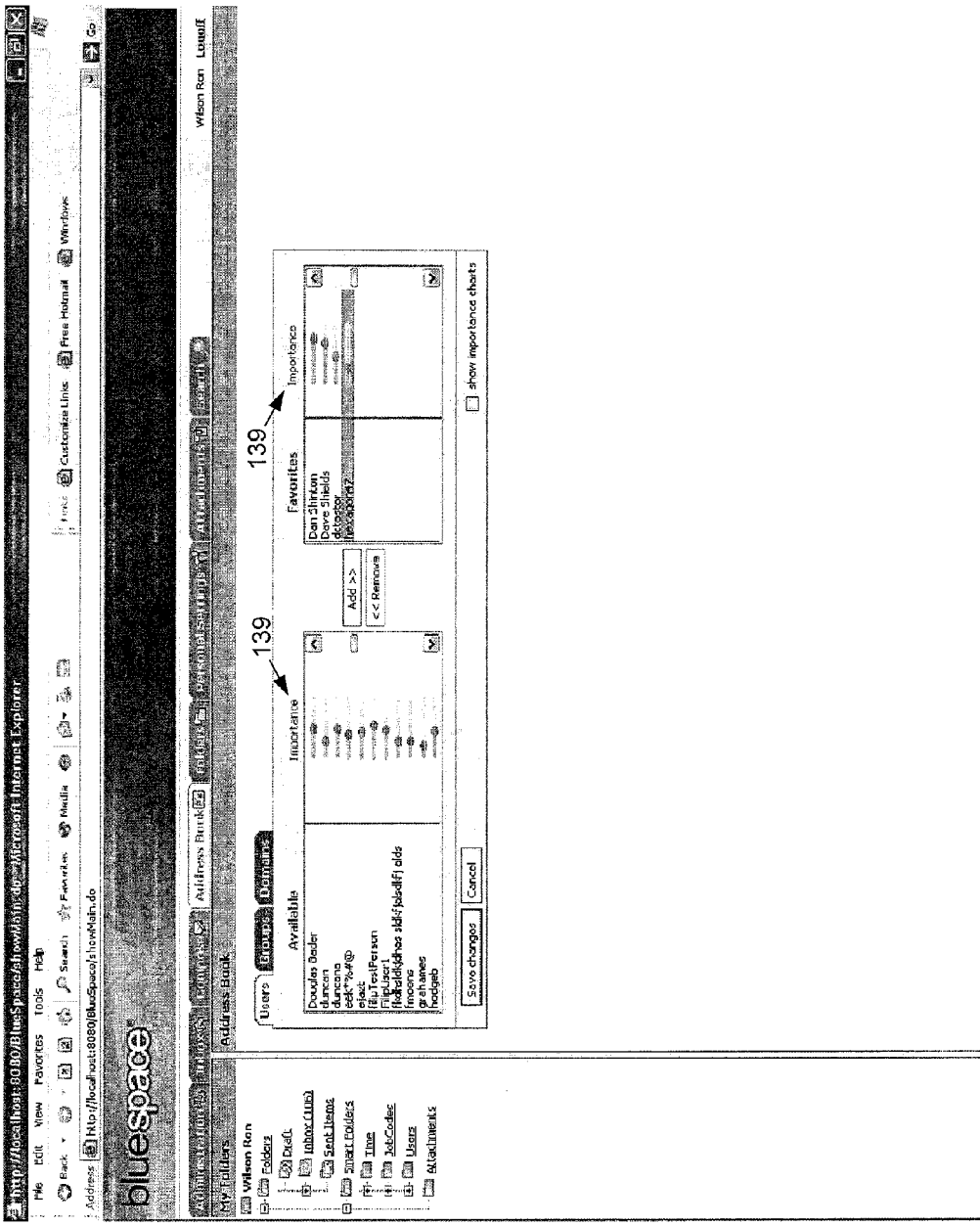
FIG. 13 shows a screenshot of an example of an address book web page in accordance with one or more embodiments of the present invention.

Now turning to an address book as described above, reference is made to FIG. 13. In FIG. 13, importance slider 139 is provided for each user, group, or domain, and allows the user to directly interact with the importance values given to their contacts. The user may either lock the value or provide it as a new start value from which the electronic mail system equilibrates. Further, it is noted, for example, that when user A adds user B to their "favorites," the importance of user B with respect to user A may be given a boost.

Now turning to preference settings as described above, reference is made to FIG. 14. Using preferences, the user can affect the different inputs into the relevance analysis engine. This may allow the user to tune the relevance analysis engine to provide the content that the user is interested in. For example, the user may affect the relative strength of the different actions by users, as well as affecting the relative strength of the different entities with importance (e.g., job codes, users).

Figure 14:
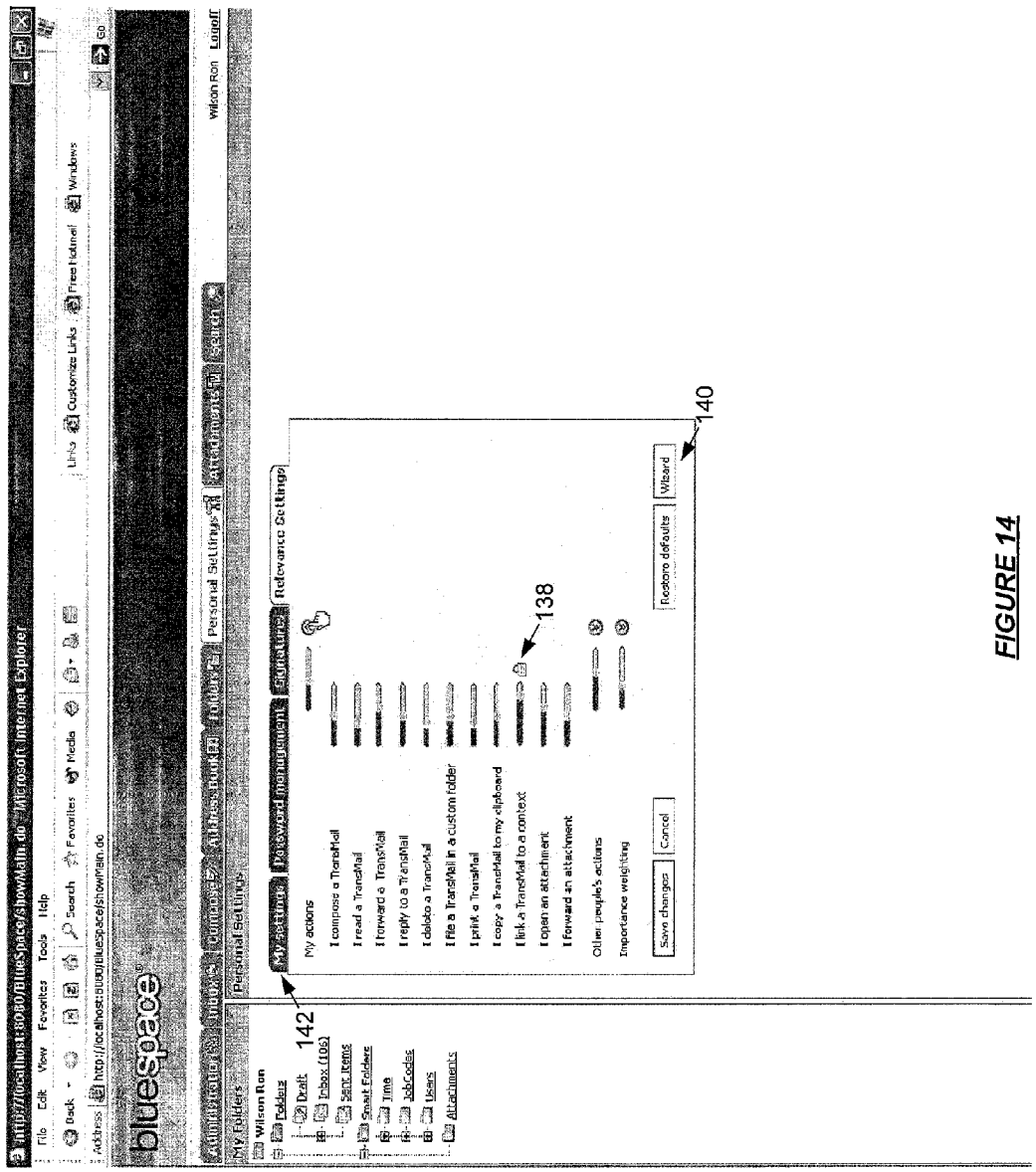
FIG. 14 shows a screenshot of an example of a preference setting web page in accordance with one or more embodiments of the present invention.

In addition to varying the relative strengths of various inputs to the relevance analysis engine, the user may also alter the importance of the different entities in the system, using an interface similar to that depicted in FIG. 13, as linked from FIG. 14. The user may either lock the input at that value or let it equilibrate over time (the slider for the impact of linking content to a context is locked 138 in FIG. 14).

Further, the actions shown in FIG. 14 may be customized. Such customizations may be done on implementation or by a system administrator. Moreover, it is noted that the mechanism of surveying users described above may provide the raw data that usually determines the weighting values. A given user's input may partially determine both their own weighting values and, possibly to a much smaller extent, the overall default weightings across the entire system. At least one reason for taking a content surveying approach to determining weightings is that weightings may be regarded as an esoteric factor, and it is very difficult for a typical user to determine these values directly.

Moreover, in one or more embodiments, determining weightings values may be done via a consulting exercise by an integrator entity implementing the system. The electronic mail application may have the ability to serve automated surveys to users via the weightings interface, in which users are "walked through" various scenarios and their responses determine the weighting values. This may be provided via the "Wizard" button 140 shown in FIG. 14. Additionally, the user may restore the sliders back to their default values.

Another option for searching in one or more embodiments is to display a search capability on every page of the application, allowing the user a familiar search function from wherever they are in the application. This choice may appear under the "My settings" tab 142 in FIG. 14.

Figure 15:
FIG. 15 shows a screenshot of an example of a search interface web page in accordance with one or more embodiments of the present invention.
Figure 16:
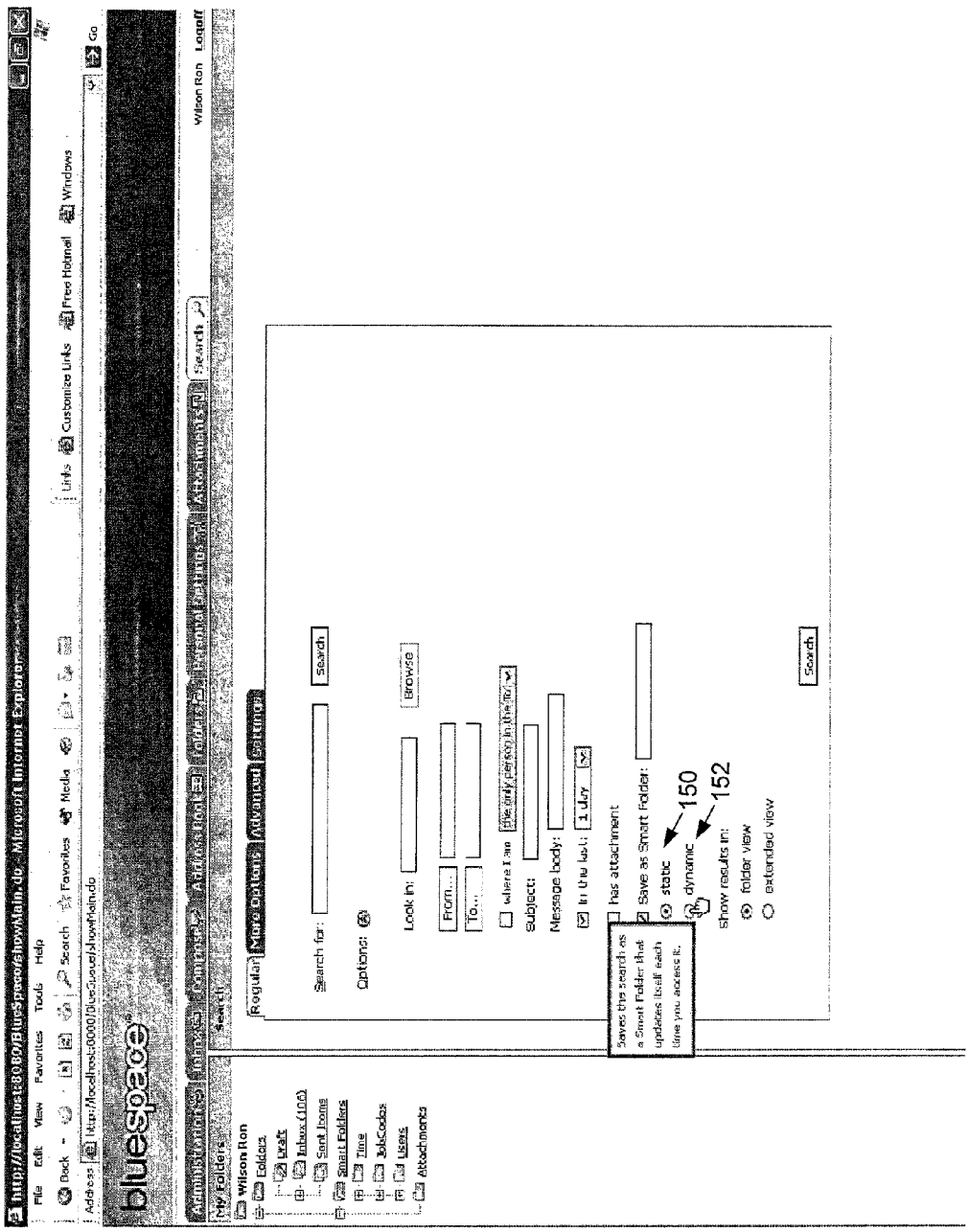
FIG. 16 shows a screenshot of an example of a search interface web page in accordance with one or more embodiments of the present invention.

Now turning to search interface aspects relating an electronic mail system in accordance with one or more embodiments, reference is first made to FIG. 15. A search tool may be divided into two areas—a search form and the search results. The tab 144 shown to be selected in FIG. 15 is the simple search option, in which a user just enters any keywords they are interested in. A search algorithm then searches for this text in all possible criteria (e.g., users, groups, job codes, message subjects, message bodies). If the user clicks the "options" roll down 146 in the search form interface as shown in FIG. 15, the application may then provides some additional search options, such as shown in FIG. 16. It is noted that in one or more embodiments, the application may remember when the user clicks the options roll down 146 and serves the search interface to them with the options already showing the next time the user goes to the search page. The options roll down 146 allows the user to specify, for example, which mail folders to look in, people involved, key words to search for, the date range, and/or whether the electronic mail object should have attachments.

Further, the search interface shown in FIG. 16 provides the user with two pairs of options relating to what happens to search results. Each of these options may have descriptive help in the form of a pop-up window that appears when the user moves their mouse over the option. A user may save any search they are doing as a "smart folder" that appears in a custom folder in their folder tree. A static "smart folder" 150 keeps the historical results of the search, so the user sees the same result set each time they click the "smart folder." A dynamic "smart folder" 152 may carry out the search again each time the user clicks the "smart folder." The user manages "smart folders" through a standard folder management interface. To edit any given "smart folder," the user may click the folder, and the application presents the folder's respective search query through the appropriate search interface. A final decision for the user to make is whether they would like the folder view or extended view for their search results.

Referring again to FIG. 15, the "more options" tab 148 provides another screen similar to that shown in FIG. 16, but with more options for the user to choose through, for example, checkboxes and text fields.

Figure 17:
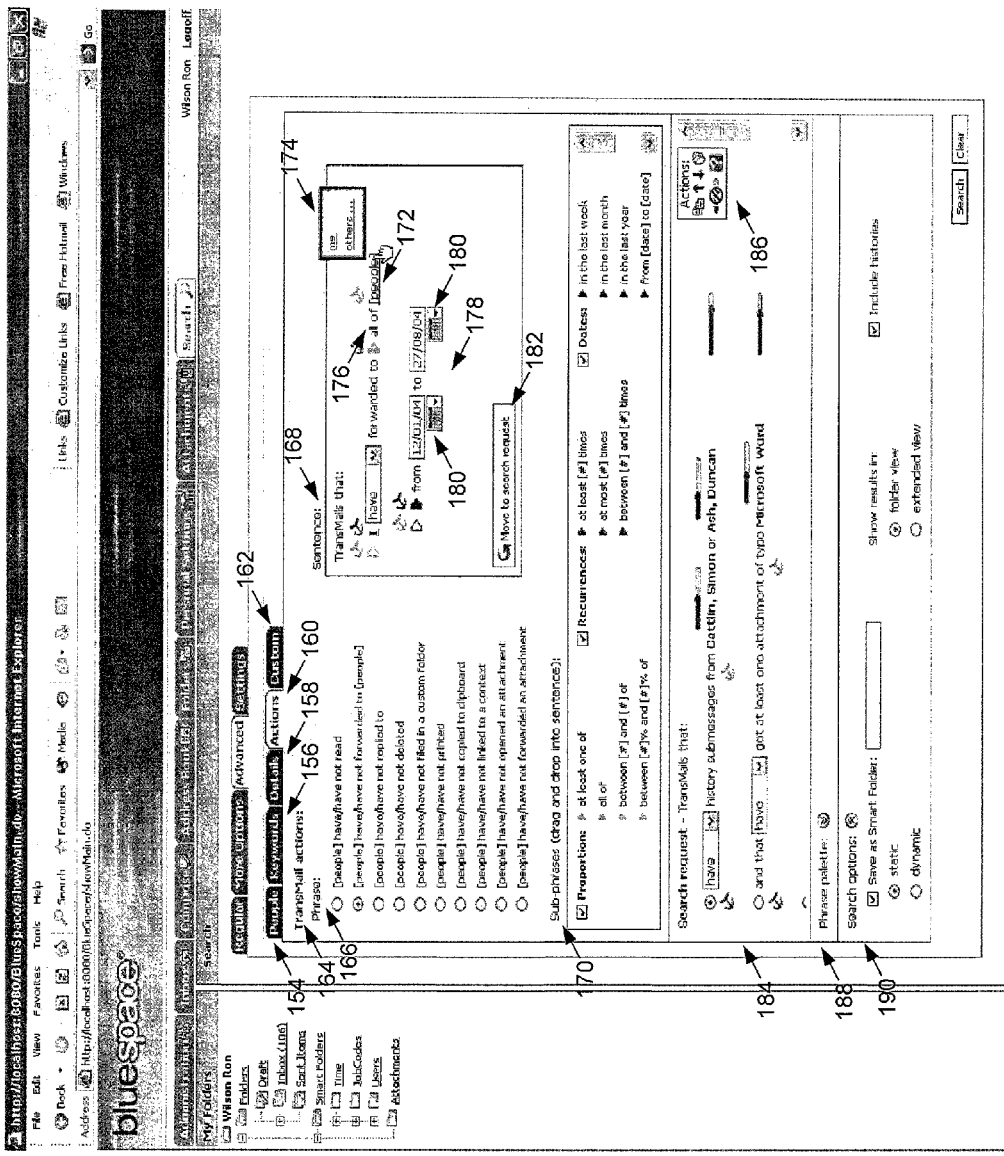
FIG. 17 shows a screenshot of an example of an advanced search interface web page in accordance with one or more embodiments of the present invention.

Now turning to a description of advanced search aspects related to an electronic mail system in accordance with one or more embodiments, reference is made to FIG. 17. With the interface shown in FIG. 17, a user may build search sentences and then use the sentences to do searches. A description of FIG. 17 is further detailed below in regard to sentence types, electronic mail object actions, search request boxes, phrase palettes, and search options.

In one or more embodiments, there may be a plurality of different sentence types in an advanced search interface: people 154—user, groups, and domains that the mail is from and to; keywords 156—keywords in any field in the system (e.g., the subject or message body); details 158—details and properties of the mail (e.g., whether it has attachments or has been assigned a job code); actions 160—user's actions on mail content, such as reading or replying; and custom 162—access to a library of other sentences. Such sentence types may be presented to the user through a tabbed interface as shown in FIG. 17, allowing the user to switch between the different types as they build up their search request.

Mail actions 164 represent a large area of the user interface shown in FIG. 17, because it is that sentence type that is shown in the interface. There may be a plurality of subsections within this part of the view: phrase 166—the area in which the user selects the type of action they wish to use in their search request; sentence 168—the area in which the user builds up the sentence they wish to add to their search request; and sub-phrase 170—the area from which the user can introduce modifications to their basic phrase.

In FIG. 17, an action selected is that of a person forwarding a mail to other people (be they users, groups, or domains). This phrase appears in the sentence box 168, allowing the user to "fill in the blanks." In FIG. 17, the user has already selected the first blank—that they themselves forwarded the mail. The user is in the process of filling in the second blank. By clicking the "people" field 172 with their mouse, they have caused the application to spawn a pop-up window 174. This window 174 allows the user to select the most requested choice or go to a modified view of their address book to select the people they wish.

The user may customize the phrase in the sentence box by adding in sub-phrases from the sub-phrase screen area 170. Each of the different sub-phrase types may have a color-coordinated arrow next to a given sub-phrase and a matching slot in the sentence box. The user can drag and drop sub-phrases into the sentence box 168 and then customize them as they wish. FIG. 17 shows two sub-phrases have been added in—the "all of" sub-phrase 176 and the "from [date] to [date]" sub-phrase 178. The date sub-phrase may require further user interaction to specify the dates, which the user has already carried out using the associated calendar buttons 180. Each calendar button 180 spawns a calendar that allows the user to specify a date. It is noted that date formatting may be a user preference determined globally across the application via the "personal settings" tab.

Once a user has built a search sentence that they wish to add to their search request, they may click the "move to search request" button 182, which will add the sentence to the bottom of the list in the search request box. In addition, the user may use an "anchor" system. Any hard anchor, depicted in FIG. 17, may be dragged to an anchor slot, subject to certain rules regarding how phrases can be combined. The anchor system may be common to the sentence area, the search request box, and the phrase palette. It is further noted that in order to assist the user, there may be various user pop-up help boxes that appear when the user moves their mouse over the different parts of the interface.

A search request box 184 is the screen area in which the user builds up their search criteria, drawing on sentences from each of the different sentence types. Each sentence is shown, along with anchors allowing each sentence to be extended with other sub-phrases. For example, the sentence, "have history submessages from Cattlin, Simon or Ash, Duncan" may be extended at the "from" point to "have history submessages (from Cattlin, Simon or Ash, Duncan) or contain the keywords 'sales proposition.'" Each sentence (in both the search request box 184 and the sentence box 168) may be changed between positive and negative logic. The user may change the "have" dropdown box to "have not." There may be weightings for each sentence and each of its sentence criteria. These are shown by sliders in FIG. 17, and the user can move the positions of these sliders to affect the relative importance of the respective inputs in the search request. In the example shown in FIG. 17, electronic mail objects having history submessages from Simon Cattlin would be given higher ranking than those from Duncan Ash in the search results listing. Further, the first sentence regarding history submessage authorship would be given slightly greater weighting than the requirement to have at least one attachment.

Another part of a search request box shown in FIG. 17 is an "actions" box 186. This part may contain icons that allow the user to manage the sentences that make up their query. The top row from left to right allows the user to copy a sentence (e.g., to search for two very similar sentences), move a sentence up the list, move a sentence down the list, and delete a sentence.

Still referring to FIG. 17, an icon may allow the user to toggle the weighting sliders on and off. When the user turns the weighting sliders off, the ordering of the list is particularly important, as the system automatically attaches greater weighting to sentences further up the list. It is noted that when a weighting slider is off, such may be indicated in the user interface. If the weighting sliders are hidden, an icon may be displayed to show the slider to indicate that it would toggle the weighting sliders back on again.

Another icon in the actions box 186 is a "?" symbol that provides the user with help on using the advanced search interface. When clicked, this icon launches a debugging interface in a pop-up window that walks the user through debugging their sentence to ensure that it is consistent. Such interactive debugging may be useful in helping to ensure that the interface is usable by most individuals, as well as being both sophisticated and powerful.

Further, it is noted that if a user starts designing a search in the regular search interface shown in FIG. 16 and then moves to the advanced search interface as described above with reference to FIG. 17, the user's initial input may be represented as a sentence in the advanced search interface. The user may then further customize and extend the search from there. This provides a convenient first step for a user attempting to move from the regular search interface to the advanced search interface.

Still referring to FIG. 17, a phrase palette 188 may be provided to offer a "dumping ground" for a user to move phrase and sub-phrases about. It is shown rolled up in FIG. 17, but the user can expand it by clicking the appropriate icon/tab. The phrase palette may be particularly useful to the user when transferring phrases from their custom sentence type to mix with other sentence types.

Many of the elements in the search options box 190 may be similar to those provided in other web pages of an electronic mail system in accordance with one or more embodiments. For example, the user may save a search as a "smart folder" that appears in their "custom smart folder" set. The "smart folder" may either be static, in which case it keeps the same result listing as when the search was first run, or dynamic, in which case the application reruns the query each time the user views the smart folder.

Search results may either be displayed in folder view or in extended view, as described above. An additional option for the user is whether to include the historical submessages or not.

Still referring to FIG. 17, a custom sentence type provides access to a library of phrases and sub-phrases. Such a library may be a centralized resource held server-side across an organization. The user may type in phrase fragments and search for phrases that match their desired input, thereby effectively bridging the gap between natural language searching and logic-based searching. The organization may also update the library with new phrases and sub-phrases, mapping these to new logic elements at the search level. Examples of additional phrases include: "that I wrote that became part of a tree linked to job code X"; and "that I wrote and were read by Clarke, John." Other phrases may act to alter the search algorithm's action, such as: "that will help me find someone's name"; "that will help me find a historical document"; and "that will help me find out about a project." These phrases alter the search results in such a way as to assist the user in finding the type of information they are looking for.

Figure 18:
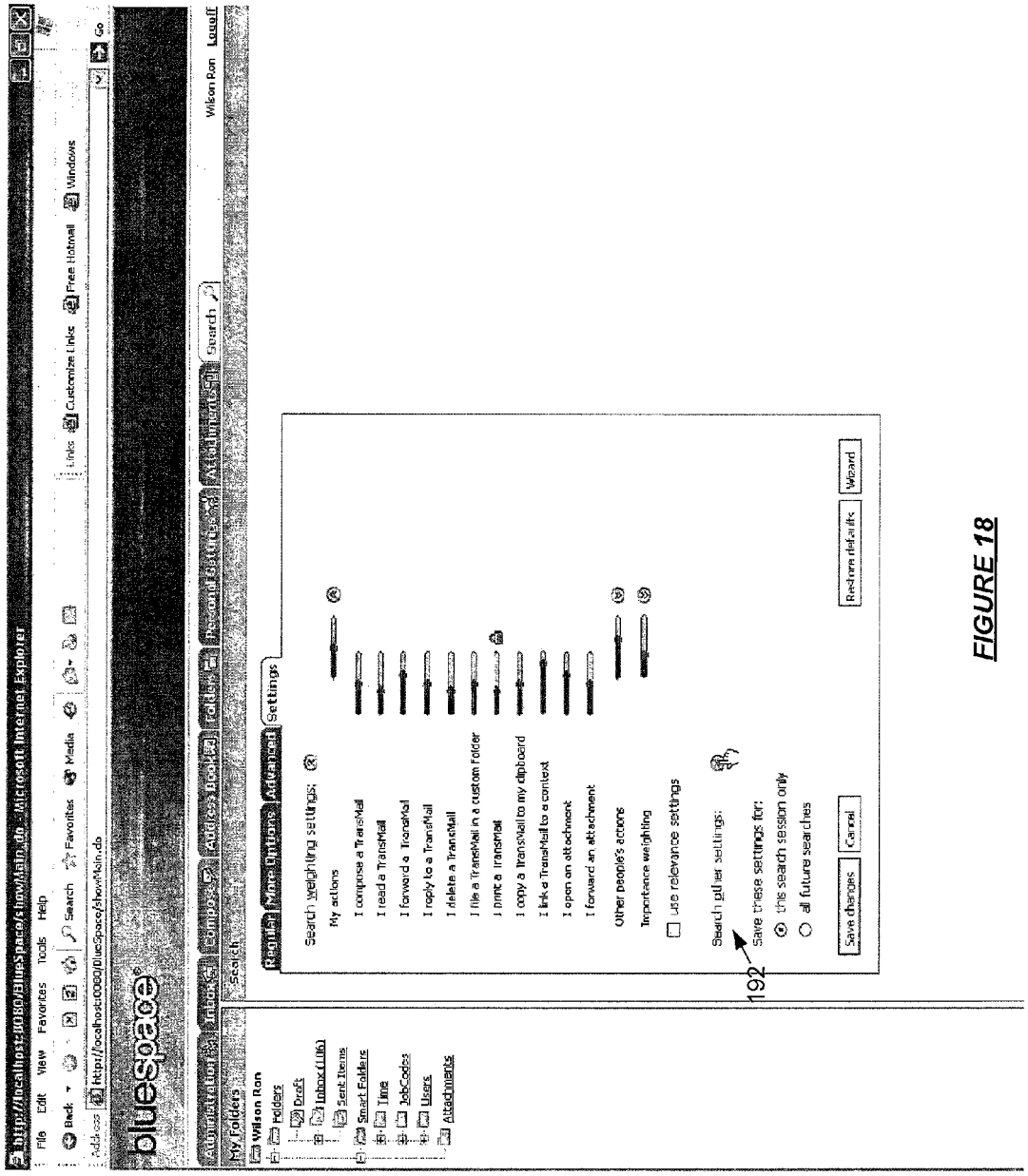
FIG. 18 shows a screenshot of an example of a search settings web page in accordance with one or more embodiments of the present invention.

Now referring to FIG. 18, a user may interact with the settings for the search algorithm and results ranking. Using the interface shown in FIG. 18, a user may change the relative strengths of the inputs to the search algorithm, in a similar manner as a user can adjust inputs to a relevance analysis engine as described above. The user may have the option of tying the weighting settings to be the same as their relevance settings. The user may have additional options they can change under "search other settings" 192 including, for example, the following: the number of results per page in both search result views; the information to include in the extended view; and the columns to include in the folder view (including local relevance and search relevance).

In addition, a user may add in new buttons that allow them to further alter the search results. These may be accessed via a library similar to that described above. Examples of different purposes of such custom buttons include: "limit it to mail I read"; "show me mail read by more people"; "show me more recent content"; and "let me change the weightings" (presents the user with a pop-up window to change the weightings of their search criteria).

Further, a user may enforce any changes on either a session basis (during a particular log in session of searches) or for all future searches. This option allows the user to increase the weighting towards specific criteria for a given search in which those criteria are important.

Now turning to a description of search results aspects of an electronic mail system in accordance with one or more embodiments, the electronic mail system may have a plurality of views for presenting search results. For example, a "folder view" represents a way a user may be accustomed to viewing search results. In another view, an "extended view" more closely resembles the way users are accustomed to viewing web search results. It is noted that providing a plurality of such views and then allowing the user to choose which they prefer as they conduct their search promotes user satisfaction. Further, the electronic mail application may "remember" the user's previous choice and defaults to this view when the user conducts a new search.

Figure 19:
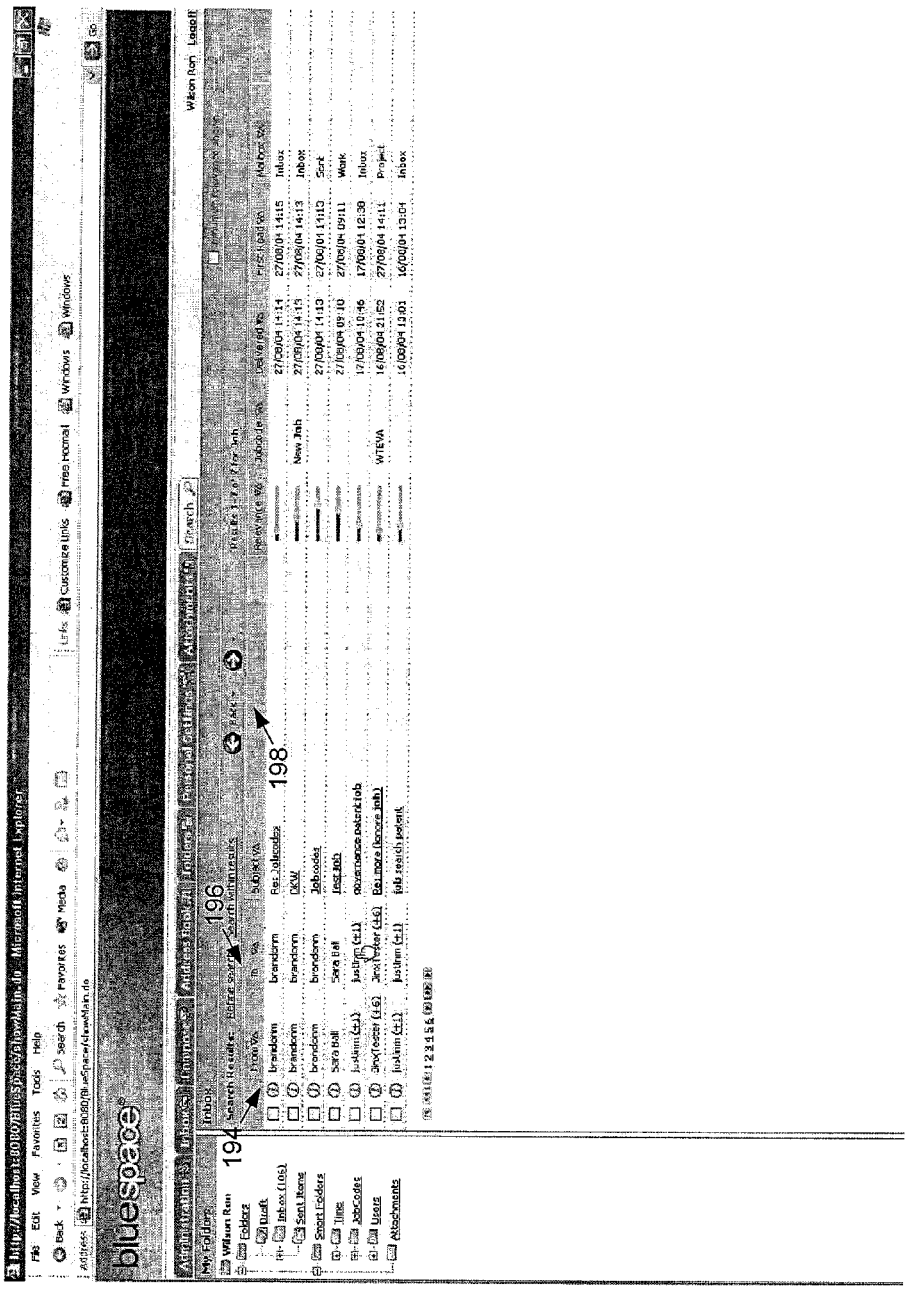
FIG. 19 shows a screenshot of an example of a folder view search results web page in accordance with one or more embodiments of the present invention.

FIG. 19 shows an example of folder view search results. In one aspect, this view may be regarded as being intuitive. The table indicates the author 194 and recipients 196 of each mail, the subject, any designated job code, key dates (delivered and read), and the mailbox the electronic mail object resides in. In addition, the table may include an information icon that allows access to a similar pop-up window as that shown in FIG. 10. Further, the table may display relevance sliders for each electronic mail object returned by the search.

Still referring to FIG. 19, the row above the column headings includes some potentially useful capabilities for the user. The user may refine the search and may also search within the results they have already been presented with. "Back" and "forward" buttons 198 allow the user to move up and down their search history with a single click. The user may also sort each column ascending or descending to further customize the results view.

Figure 20:
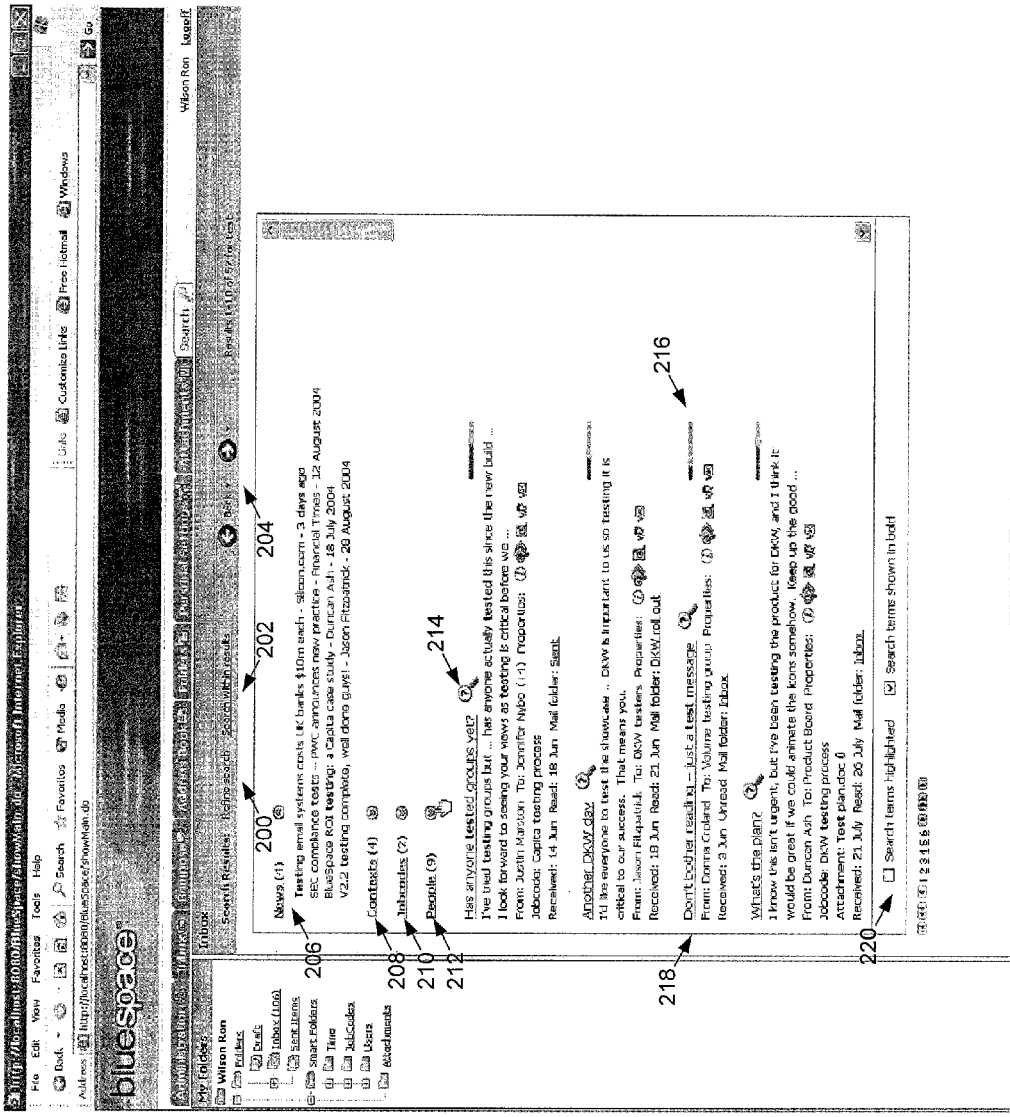
FIG. 20 shows a screenshot of an example of an extended view search results web page in accordance with one or more embodiments of the present invention.

Now turning to a description of search results presented in an extended view, reference is made to FIG. 20. As in the folder view for search results described above with reference to FIG. 19, the extended view interface shown in FIG. 20 includes options to refine the search 200, search within results 202, and move backward and forward 204 through search history.

Still referring to FIG. 20, a "news" content set 206 is the results of searching an organization's knowledge base and intranet site, not electronic mail objects. In the example shown, the first two items are links to external content that a search spider found on the intranet site, while the second two items have been written by other employees as part of the organizational knowledge base. In is noted that the search results presented in accordance with one or more embodiments are highly customizable, and additional content feeds may be placed into these top items. The organization may assign content feeds to each user through the administrative interface or may allow the user themselves to choose different content feeds.

The next three items shows in FIG. 20 are not expanded, but the user may select one of the icons to display each set of search hits. The content makes up these categories includes, for example, the following: contexts (e.g., development, sales) 208; job codes 210; and people (e.g., users, domains, groups) 212. Each of these sets may constitute a set of entities and the occurrences of the search term within them. The number shown in brackets denotes the number of search hits in each category.

Still referring to FIG. 20, below the categories described above (e.g., news 206, contexts 208, job codes 210, people 212), the search results list hits within electronic mail content. Each search hit highlights the content that caused the item to appear in the search results, with, for example, the following display schema: the subject of the submessage; a magnifying glass containing a question mark; the relevance of the submessage; the body text showing the instances of the search term; the people involved (senders and recipients); a set of property icons similar to those described above with reference to FIG. 8; a job code or attachment name if they are part of the search hit; the date the mail was received and read; and the mail folder in which the respective electronic mail object appears.

In one or more embodiments, clicking a user (or group or domain) name causes the application to display the respective "smart folder" of the searcher's interactions with that population entity. Clicking a job code, context, or other entity may have a similar effect.

Clicking the magnifying glass 214 with a question mark inside may spawn a pop-up window indicating to the user how the result matches their query. This allows the user a quick way to understand why the result would be of relevance to their query and how the application arrived at that decision. It also allows the user to provide feedback to the electronic mail application by indicating whether the result was what they were looking for.

It is noted that the relevance slider 216 for the submessage with the subject "don't bother reading—just a test message" 218 is quite low given that this is the first page of the search results. This highlights that the relevance sliders may not be respective to the search being conducted—they are local relevance values based on the output of the relevance algorithm. Relevance in search is used to determine the ranking for the search results (though, this may also be displayed as a user preference). The test submessage was deemed to have low relevance as few people read the submessage, given that the submessage was a test and not real content. However, because the body of the submessage includes many instances of the word "test," this helped drive the submessage up the ranking of the search results given the query was for the word "test."

As shown in FIG. 20, the search result "don't bother reading—just a test message" 218 does not show the instances of the search term in the message body. This is because the submessage is unread, and in one or more embodiments, an electronic mail system may not allow partial reading of a piece of content in a user's incoming electronic mail. In this case, the user may click the submessage to read it if they wish to view the content.

In one or more embodiments, search terms displayed in search results may be highlighted in one or more of a plurality of ways. For example, as shown in FIG. 20, search terms are displayed in bold to help the user identify the terms. Another option, used at the bottom of the interface shown in FIG. 20, is to highlight the search terms 220. Such a feature may be particularly useful for searches for multiple terms, as it may highlight each search term in a different color.

As described above, an electronic mail system in accordance with one or more embodiments may use a relevance analysis engine for one or more of various purposes (e.g., managing and presenting electronic mail, forensics, searching). Now will be provided a more detailed description of how such a relevance analysis engine may be implemented in either software and/or hardware. "Importance" and "relevance" are at least two components or concepts associated with the relevance analysis engine. A "relevance" score attaches to electronic mail and indicates to the recipient the priority they should give to dealing with this piece of electronic mail. Because a given piece of electronic mail may actually have more than one "sender" (e.g., an individual and a job code, a forwarded user), the relevance of the piece of electronic mail may relate to a set $\{s\}$ of senders. An "importance" score attaches to an individual user (though this could sometimes be, for example, a job code rather than an individual). Importance is a metric used to help to determine the relevance of electronic mail objects by reference to who sent or forwarded them.

In order to describe one or more embodiments of a relevance analysis engine, the following components will be used:

1. Mail Data Component: a mail data component is a feature of or attachment to a particular electronic mail object (e.g., date or flag for follow up). [symbol: $^xMDC$ for mail data component of electronic mail object x; this is calculated from the various mail data factors $^xMDF_i$]
2. Individual Relevance Component: an IRC value is a relevance score for a piece of content respective to a given individual user, and is based on the actions of that user. [symbol: $^xIRC_r$ for recipient r's actions on electronic mail object x from senders $\{s\}$]
3. Individual Importance Component: an IIC value is an importance score for an entity (e.g., a sender or job code) s respective to a given individual user, and is based on the actions of that user. [symbol: $IIC_{sr}$ for recipient r's actions on past mail from sender s]
4. Global Importance: a global importance value is an importance score for an entity respective to the entire system, and is a weighted average of all IIC values for that entity. [symbol: $I_s^g$ for sender-entity s]
5. Global Relevance: a global relevance value is a relevance score for a piece of content respective to the entire system, and is a weighted average of all IRC values for that piece of content. The weights used relate to the global importance values of those to whom the IRCs relate. [symbol: $^xR^g$ for a piece of content x from senders $\{s\}$]
6. Cognate Group: for each user, over time, the system identifies a "cognate group" of the n other users regarded as most similar. This group is defined by similar past user actions and assessments, and/or a direct input by a user. It is noted that it is not assumed that the population of recipients falls into separate and mutually exclusive cognate groups. Rather, each recipient may have their own cognate group of those the system regards as most similar to that recipient. Thus, in some cases, for example, user A may be in user B's cognate group (because A is in the n users most similar to B), but at the same time, B may not be in A's cognate group (because there are n other users more similar to A than B is).
7. Cognate Relevance Value: a cognate relevance value is a relevance score for a piece of content respective to a given recipient based on a weighted average of the IRC's of the n users considered to be the cognate group for that recipient. [symbol: $^xR_r^c$ for the relevance input from the cognate group c of recipient r, on electronic mail object x sent by senders $\{s\}$ to recipient r]
8. Cognate Importance Value: a cognate importance value is an importance score for an entity respective to a given user, based on a weighted average of the IIC's of the n users considered to be the cognate group for that recipient. [symbol: $I_{sr}^c$ for the sender s to recipient r in cognate group c]
9. Local Importance: a local importance value is the importance value for an entity (e.g., a sender, a job code) to a given user which is shown to that user through the interface. It is a function of the user's own IIC for that sender, together with global and cognate importance values for the sender. [symbol: $I_{sr}^1$ for local importance of sender s to recipient r]
10. Combined Importance: local importance values are stored locally for each recipient for each sender or entity with which that recipient has interacted. There may be a set $\{s\}$ of senders associated with a given incoming electronic mail object, and the local importance factor germane to that electronic mail object is then not a single sender local importance but a value arising from the combination of local importance values for that set of senders. Whereas local, cognate and global importance values may each relate only to individual senders, the combined importance is a combination of importance values that relate to the particular set associated with a particular electronic mail object. [symbol: $^xCI_{\{s\}r}^1$ for local importance to recipient r of the particular set of senders $\{s\}$ associated with electronic mail object x]
11. Local Relevance: a local relevance value is the relevance value for a piece of content to a given user that is shown to this user through the interface; it is a function of the user's own IRC, the global and cognate relevance scores, and the combined importance relating to that mail. [symbol: $^xR_{\{s\}r}^1$ for content x sent by senders $\{s\}$ to recipient r]

Figure 21:
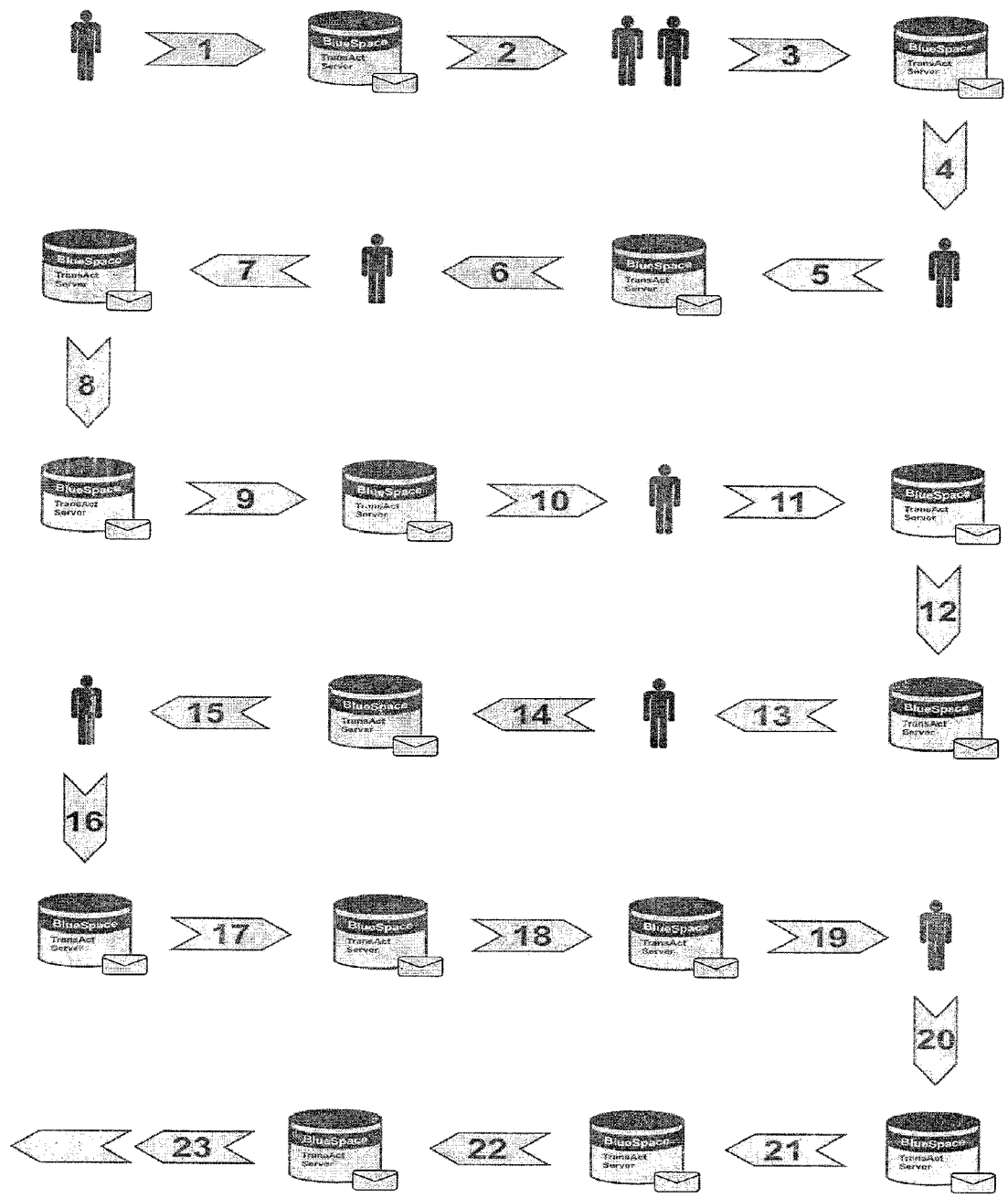
FIG. 21 shows an example flow process of a relevance mechanism flow in accordance with one or more embodiments of the present invention.

Further, FIG. 21 shows an example chronological scenario for the relevance analysis engine. FIG. 21 shows at a high level how the terms described above relate to each other and the process by which they are calculated in the functioning of relevance analysis engine. Below is provided a more in-depth description of relevance techniques and computational implementation. It is noted that the scenario in FIG. 21 depicts a final relevance mechanism (described below), which includes cognate relevance.

The steps exemplified in FIG. 21 are as follows. In step 1, John sends an electronic mail object to Sue, Harry, and Chris. In step 2, a "knowledge server" (or "object-based electronic mail server") (e.g., TransAct developed by BLUESPACE SOFTWARE) in accordance with one or more embodiments carries out the following processes: sends the first electronic mail object; and calculates the combination importance for each recipient. Then, in step 3, Sue and Harry are active or logged in. Subsequently, in step 4, the knowledge server initiates a batch cognate relevance recalculation for Sue, and so calculates the first cognate relevance value for this electronic mail object (at this point, the values is zero because there are no IRCs yet, so it has no input to the local relevance when evaluated). In step 5, Sue accesses her inbox. Then, in step 6, the knowledge server calculates Sue's local relevance value for the electronic mail object (in order to show the value in her folder listing). Thereafter, in step 7, Sue reads the electronic mail object. In step 8, the knowledge server carries out the following processes: marks the electronic mail object as having been read by Sue; calculates Sue's IRC value for the electronic mail object; recalculates Sue's IIC value with respect to John; and recalculates Sue's local relevance value (which changes because she has done something with it). Then, in step 9, the knowledge server calculates the first global relevance value based on Sue's IRC value. Subsequently, in step 10, the knowledge server initiates a batch cognate relevance recalculation for Harry, and so calculates Harry's first cognate relevance value for this electronic mail object, based on Sue's IRC value. In step 11, Sue replies to the electronic mail object. Then, in step 12, the knowledge server carries out the following processes: sends the replying electronic mail object; calculates the combination importance for each recipient for the replying electronic mail object (based on both Sue's importance and John's importance as the two authors) (it is noted that this replying electronic mail object may initiate a separate process thread); and updates Sue's IRC for the original electronic mail object and her IIC value for John. Thereafter, in step 13, the knowledge server recalculates Harry's cognate relevance value for the original electronic mail object based on Sue's IRC value. In step 14, Harry accesses his inbox. Then, in step 15, the knowledge server calculates Harry's local relevance value (for his folder listing). In step 16, Harry reads the TransMail. Subsequently, in step 17, the knowledge server carries out the following processes: marks the electronic mail object as having been read by Harry; calculates Harry's IRC value for the electronic mail object; recalculates Harry's IIC value with respect to John; and recalculates Harry's local relevance value. Thereafter, in step 18, the knowledge server initiates a batch cognate relevance recalculation for Sue, and so recalculates Sue's cognate relevance value for the (original) electronic mail object, based on Harry's IRC value. In step 19, the knowledge server calculates the second global relevance value, based on the IRCs from Sue and Harry. Then, in step 20, Chris logs in or becomes active. Subsequently, in step 21, the knowledge server calculates Chris' cognate relevance value for the original electronic mail object for Chris based on the IRC value from Sue (Harry is not in Chris's cognate group). In step 22, the knowledge server continues to recalculate cognate relevance values and the global relevance value at specified, but, for example, increasing intervals. Then, in step 23, the knowledge server, during a period of low activity (e.g., in the evening), recalculates global importance, cognate importance, local importance, and combination importance values. A detailed visualization of how these different variables interact is exemplified in FIG. 21.

As apparent from the description above in regard to a relevance analysis engine in accordance with one or more embodiments, the relevance analysis engine may continually update a set of inter-related values, based on user action, so that everyone's actions affect everyone else. Thus, in view of this, each user/post may have a different individual set of importance and relevance criteria. Further, an electronic mail system of this kind in accordance with one or more embodiments may also require the input of user-set values for the relevance and importance criteria, which both correct the values for the user concerned and may also offer a check on the effectiveness of particular relevance mechanisms being used. Moreover, it is noted that for organizations with many posts attached to user teams, an electronic mail system of this kind may allow users and posts to be treated separately with varying levels of inter-correlation.

Now turning to a description of a core of a relevance analysis engine in accordance with one or more embodiments, it is assumed that (i) there exists a set of people a, b, c, . . . d involved in sending and receiving electronic mail objects; and (ii) senders {s} (plural because more than one may have been involved in forwarding it) send a piece of electronic mail x to the recipient r. Accordingly, an aim of the relevance analysis engine is to produce for recipient r a "good" value for the local relevance $^xR_r^1$ for that piece of electronic mail. Thus, such an aim may be expressed as follows: "if the recipient r were to open a set of incoming mails and consciously assign relevance scores and rankings, these would correlate highly with the $^xR_r^1$ values calculated by the system."

It may also be possible to define the relevance ranking of an incoming electronic mail x to recipient r before it is opened (its "before-reading" local relevance $^xR_r^{1b}$) and after it is opened and read (its "post-reading" local relevance $^xR_r^{1p}$). This may not be exactly the same as relevance of incoming and stored electronic mail object, because some electronic mail objects may be stored without being opened. The icon in the user's view indicates that the electronic mail object has been read by an open letter symbol, so that it is clear which is being given as the local relevance value for a given content. Opening may be only one of the activities comprising the IRC for that recipient and electronic mail object (it could, for example, be deleted without opening it), but could be a key one in terms of ensuring that the actions done are based on full knowledge of the nature of the electronic mail object.

Further, there may also be a concept of search relevance $^xR_r^S$, which is a number assigned to the results of a particular electronic mail object search. These values may be computed using the local relevance values together with the search criteria and weights for them of the weighting slider icon (if utilized) given by the user to change the level of impact each action or entity has on the search request s.

For the Sth search, if $^xC_i^s$ is a dichotomous variable indicating the presence or absence of that search criterion in the electronic mail object (i.e., will have a value 0 or 1), and $W_i^s$ is the sliding weight given it by the user for that search, then the search relevance may be calculated by:

$$^xR_r^S = f\left(^xR_r^l; \sum_{i=1}^{m} {}^xC_i^s W_i^s\right).$$

Search relevance values may be stored locally while the search results are being examined (unless explicitly stored by the user). It is noted an objective is for these to be allocated by the system to closely resemble the ranking which the user would assign were they to be able to look at the overall view and contents of their electronic mail.

Now turning to a description of factors used by a relevance analysis engine in accordance with one or more embodiments, a plurality of factors may make up the IRC. The first are indicator functions, $^xIRCD_{ri}$, which are dichotomous (i.e., are simply "on" or "off") depending on whether the action has happened or not. This includes attributes such as factors that are available only for past-reading local relevance: "the user opens the electronic mail object" (if so, then D=1, if not, then D=0); "the user clicks on a hyperlink in the electronic mail object" (if so, then D=1, if not, then D=0); and "the user replies to the electronic mail object" (if so, then D=1, if not, then D=0).

A second set of variables $^xIRCC_{rj}$ are values on cardinal scale (or ordinal scale transformed for the model to a cardinal scale): "how many extra times the user opens the electronic mail object"; and "to how many people the user forwards the electronic mail object." These may be placed into suitable functions $f(^xC_{rj})$ that are between 0 and 1. Some of these factors may also "decay" over time. While it may be difficult to determine this without some indication from the user, there clearly may be some electronic mail objects connected with projects that, once completed, leave the user unlikely to wish to consult the electronic mail objects again. Some feedback may be useful connected with a particular job or project code. Further, there may be occasions when the relevance of an incoming electronic mail object is highly affected by the life cycle of a project. This means that it may be useful to include a time related factor of importance that has a discontinuity break when the project is completed. Moreover, this would mean that the relevance could be multiplied by a time-related factor $^xG_r(t)$. For example, $^xG_r(t)$ may reflect relevance of a project up to a deadline time, $t_0$, beyond which the relevance begins to decay:

$$^xG_r(t) = \begin{cases} 1 & t \leq t_0 \\ e^{-\lambda(t-t_0)} & t > t_0 \end{cases},$$

where λ is a decay constant (high for rapid decay, low for slow decay). In one or more embodiments, most stored electronic mail objects may have a time-decay-based element of relevance.

As described above, various mail data features may be considered that may affect relevance and that are inherent to the electronic mail object itself. For example, the electronic mail object may contain a flag for action from the sender. In another example, the electronic mail object may itself be a reply to an earlier electronic mail object. These factors $^xMDF_i$ enter the relevance calculations for the inherent or mail data electronic mail object component $^xMDC$.

Another factor in relevance calculations is the importance of the initial and/or a subsequent sender (e.g., a forwarder), and other entities involved in the communication, e.g., job codes. In one or more embodiments, importance may be on a scale of numbers, and may be put into a function (e.g., $f(I_{sr}^1)$, which is between 0 and 1). There may be an absolute global importance and also an importance to the particular recipient. For example, a recipient's manager may have low importance in the great scheme of things, but high importance to the recipient him/herself. Still further, as described above, the importance of the sender to the cognate or similar group within which a recipient is located may be considered. Accordingly, this means that there may be at least three factors for consideration as to importance:

1. $I_s^g$ is the "global importance" of the sender s. This number may be the same for all recipients of all electronic mails from that sender at around that point in time, though clearly can change over time as the commercial scene changes. It may often depend, in particular, on the importance of the post as located in the organization chart of an organization.

2. $I_{sr}^1$ is the "local importance" of the sender s to that individual recipient r. This may depend, for example, on where within the organizational chart the sender is relative to the receiver, or whether the receiver is working with the sender on some particular inter-company project.

3. $I_{sr}^c$ is the "cognate importance" of the sender to a particular recipient, which is the sender's importance to the cognate or similar group within which the recipient is located. This may be thought of as a more focused element of communal importance than the global importance, which is universal.

There are two elements of both global and local importance: the "role importance" attaching to the post(s) held, and the importance that may attach to an individual per se. For example, suppose that the assistant to a director in one department moves to become the assistant a director in another department. Though the assistant may retain her electronic mail identity as an individual, much of both the global and local importance values may often attach to the posts held rather than the individual.

Further, there may also be importance factors involved in cases where the immediate sender s is forwarding mail from one or more previous senders, who also have their own importance values. This set is represented by {s}. This is why the input into the local relevance is actually a weighted average of the local importance values of all the senders, the combined importance $^xCI_{\{s\}r}^1$, which relates specifically to the combination of senders in this electronic mail object x as received by r. The local, global and cognate importance values, however, may relate to individual senders or entities in the system, instead of to combinations.

Now turning to factors for consideration in importance determination, the factors labeled $^xD_{ri}$ and $^xC_{rj}$ are things that either happen or do not happen (e.g., "does the recipient reply?"). Their values may not be readjusted in the light of the success or otherwise of the prediction of relevance values for incoming electronic mail objects—only the weightings given to them are adjusted (using a model based on linear regression as described below).

The importance factors $I_{sc}^c$ may be different, because they are not ascertainable variables but are (estimated) parameters constructed within the model itself. In this case, the values of these factors are affected by the electronic mail traffic that has occurred. For example, the importance of a user may be affected by the receipt of electronic mail from other users—his/her importance perturbs or is shared by the importance of the other users. This interactive process may be taken into account before the importance is fed into an importance determination mechanism.

If recipient i receives electronic mail from sender s, there may be some true local importance value $^\Omega I_{sr}^1$, which would be the importance r would give s with perfect information. In practice, this may not be static (importance values may constantly changing), but it may serve as a useful idealization. Initially, a starting value of $^0I_{sr}^1$ may be set globally, based on judgments of levels of responsibility within the organization. An example objective is that starting from $^0I_{sr}^1$, the system will converge over time to a value near to $^\Omega I_{sr}^1$.

The global importance value of a sender $^\Omega I_s^g$ is in some ways more simple because each sender has only one value, but it is also more complex insofar as it is arrived at as part of a large interconnecting matrix of importance values (so that, for example, a sender is more important if fewer but more important other users so regard him or her). The global importance may be an average of all the local importance values, but nonetheless may be a weighted average.

The cognate importance value of a sender $^{\Omega}I_{sr}^{c}$ to a recipient r is computed in run time, based on the individual importance components of those in the cognate group to this particular user. It may also be necessary to add in a factor that enables importance to be carried over from posts. For example, if user A moved from post S to take over post T, then user A's global importance will be a function of their previous importance while in post S and the importance the previous holder of post T had. Likewise, local importance may also be a function of post as well as individual.

Further, importance attaches to the sender, and may also attach to the job code and/or context, which are also (passive) entities within the system. The job code type carries an importance value alongside the sender. This added complexity means that the relevance determination mechanism may contain weightings of both types of importance—sender and job code type, among other factors.

In regard to computing the individual importance component, significant local action may be assessed. These are actions based on past receipts. These are weighted, based on a time-dependent function as described above, so that more recent actions have greater weighting. For example, taken into consideration may be the percentage of times previous "unsolicited" electronic mail objects have been deleted or stored without opening. The following may be used to compute such a percentage, where $n_s$ is the number received:

$$\frac{1}{n_s}\sum_{x=1}^{n_s} f^t(del; no).$$

Here, $f^t$ is a time-based function for electronic mail object x, which is a function of whether the electronic mail object is deleted or stored unopened.

Further with respect to past received electronic mail, taken into consideration may be the "attention ratio" of $t_x/L_x$ for electronic mail objects opened, which is the time spent reading the mail in relation to its length. The following may be used to compute an attention ration, where $m_s$ is the number that have been opened:

$$\frac{1}{m_s}\sum_{x=1}^{m_s} f^t(t_x/L_x).$$

In addition, taken into consideration may be any past relevance scores given by the recipient to electronic mail from this sender (a weighted average if more than one has been graded). If n relevance scores have been given for past electronic mail, the significance of awarded rankings will decay over time according to the following:

$$^xR_{rs}^{assigned} = \sum_{x=1}^{v} f^t(R(T_x)).$$

This may also be extended to user-assigned relevance values for particular job codes.

In regard to user-assigned importance scores, when an electronic mail object is opened, there is a slider showing the local importance of the sender as calculated by the system (as described above with reference to FIG. 8). The recipient is able to adjust this if they feel that it is inappropriately low or high. If this is the first time an electronic mail object has been received from this sender, then the recipient can select a setting that will flash to remind him or her that they have not previously received any electronic mail object from this source, and that readjustment of the calculated importance of the sender might therefore be particularly useful.

The effect of this action by the user may be very great when it is first set. Users would find it odd were they, for example, give a ranking of 5 and then immediately find that system assigns a local relevance of 1 based on their past actions. They may be in a better position to know the import of their past actions (if any) than the system.

Over time, however, if, for example, all the electronic mail from a sender assigned a high importance were in fact deleted without opening, the system would be expected to begin to adjust the local importance. In this case, an appropriate function, however, is $f^t(I_{rs}^{assigned})$. The assignment of importance may either be "locked" by the user (so that it does not change) or can be left for the effect of the assigned score to decay over time as just described above.

The individual importance component (IIC) may therefore be a weighted function of all these various elements of the individual recipient's actions towards sender s, as follows:

$$IIC_{sr} = w_1 \frac{1}{n_s}\sum_{x=1}^{n_s} f^t(del; no) +$$

$$w_2 \frac{1}{m_s}\sum_{x=1}^{m_s} f^t(t_{x1}/L_{x1}) + w_3 \sum_{x=1}^{v} f^t(R(T_x)) + w_4 f^t(I_{rs}^{assigned}).$$

A factor that affects local relevance is a weighted combination of the individual local importance values of the set $\{s^x\}$ of all the senders (and other entities, such as job codes) involved in sending and transmitting the electronic mail object x (which may be effectively a kind of mail thread with those past senders recorded in the mail data).

Now turning to a description of computing global importance, global importance may not be updated at run time, but on a periodic review system. It may be a function of the elements now immediately described below. One element may relate to the weighted sum of individual importance components. The global importance value will be a weighted aggregate of all the individual importance components (IICs). It may be weighted because if, for example, 10 important people believe that John Doe is important, this is more indicative than if 100 unimportant ones find John Doe to be important. It is noted that this may imply a degree of circularity in the process, because global importance values are therefore mutually dependent. As described below, this requires a system of equations solved iteratively in what is, for example, essentially a Gauss-Seidel algorithm procedure until convergence to a sensible precision. In essence, however, this key element of global importance is:

$$f\left(\sum_{r=1}^{n} f\{IIC_{sr}^{(k-1)}; I_r^g\}\right),$$

where k−1 represents that global importance values in the previous period in this calculation are being used).

Another element for computing global importance may relate to electronic mail objects received. Receipt of an electronic mail object from a more important sender increases the importance of a given recipient, dependent on how many others receive the same electronic mail object. "Shared importance" may therefore depend on $I_s^g/N_x$, where $N_x$ is the number of recipients of the xth electronic mail object. The results may depend both on the number of electronic mail objects and the average of the shared importance values. The factor affecting the global importance at time k of a user may be given by:

$$f\left(\sum_{j=1}^{m}{}^{(k-1)}I_s^g/N_j; \frac{1}{m}\sum_{j=1}^{m}{}^{(k-1)}I_s^g/N_j\right),$$

where this represents a summation across the m senders of m electronic mail objects in time k−1 to k.

Another element for computing global importance may relate to directly assigned values. For example, in some cases within an organization, the human resources section may wish to directly intervene in the importance rankings. For convenience, this may be termed $f({}^OHR_s^t)$, where O represents the HR section of organization O, s represents the user (potential sender) concerned, and t represents the time at which the intervention was made (this may be locked).

Still another element for computing global importance may relate to transferred post importance. This may, for example, relate to human resources, and may involve any change in importance due to assuming another or upgraded post or role in the organization: $f({}^OHR_s^P)$.

With respect to calculating global importance in accordance with one or more embodiments, a global importance determination mechanism may readjust the global importance in time k from that of k−1 using various functions, where value α indicates how fast the global importance should change over time:

$$^kI_s^g = \alpha^{(k-1)}I_s^g + (1-\alpha)\begin{bmatrix} w_1 f\left(\sum_{r=1}^{n} f\{IIC_{sr}^{(k-1)}; I_r^g\}\right) + \\ w_2 f\left(\sum_{j=1}^{m}{}^{(k-1)}I_s/N_j; \frac{1}{m}\sum_{j=1}^{m}{}^{(k-1)}I_s/N_j\right) + \\ w_3 f({}^OHR_s^t) + w_3 f({}^OHR_s^p) \end{bmatrix}.$$

These global importance values may be recomputed by the system every period at intervals as determined by a system operator/administrator. They may be heavily inter-related and so this system of equations may be solved iteratively in what is essentially a Gauss-Seidel algorithm procedure until convergence to a sensible precision. Further, it is noted that as a given implementation is developed and customized, more powerful iterative systems may be applied.

Now turning to a description regarding computing cognate importance in accordance with one or more embodiments, an electronic mail system may store for each user, a set of n other users considered to be most similar to the user concerned—this is that user's "cognate group." The composition of this cognate group may be altered by a periodic review (a rapid change not being vital). The cognate importance for a particular sender is computed periodically using the individual importance components of each of the cognate group. In some cases, there may be no individual importance components for a particular member of the cognate group. In this case, the value may be computed from those for which components do exist, with a decreased weighting in the final formula for local importance:

$$I_{sr}^c = \frac{1}{n_c}\sum_{i=1}^{n_c} f(IIC_i),$$

where $n_c$ is the number in the cognate group with non zero IICs.

In regard to computing local importance in accordance with one or more embodiments, the local importance represents the local importance to the recipient of the sender of an incoming piece of mail. It may be a function of, for example, the following: the individual importance component (IIC) (based on the user's own actions); the cognate importance component (based on the IICs of the users in the group currently identified as cognate to the present recipient); and the global importance value (based on the global values assigned at the last periodic review made by the system). Thus, this may be expressed as:

$$^kI_{sr}^1 = f(IIC_{sr};{}^{(k-1)}I_{sr}^c;{}^{(k-1)}I_s^g).$$

If this is the first time the recipient has received any communication from s, then there may be no value for $IIC_{sr}^k$ at all, in which case $^0I_s^1$ will be based purely on $I_{sr}^c$ (if this exists) and $^{(k-1)}I_s^g$. If the sender is a completely new user unknown to the system and having no importance value at all (not even one assigned by a human resources department), then the system may not have an obvious way to decide how important is the sender, and so how relevant the mail. Because the default importance in such a case will be low, "newcomers" may be advised to encourage their human resources departments and/or potential recipients to set importance values for them, and in the case of, for example, a sales team, contacting a new customer they need to set the importance values for that customer accordingly. Each customer may form their own policy on how to assign initial global importance values, with correlation to rank or remuneration being most likely.

A well-established $^kIIC_{sr}$ may have a greater weighting over the $^kI_s^g$ value, and, as already described, a specific $f(I_{rs}^{assigned})$ gives high weighting within the $^kIIC_{sr}$ to any specific assignation of importance by the user. Further, if the individual user has specifically said that a particular sender (e.g., a spouse) is important, their lack of global importance or cognate will not be expected to alter this.

In regard to computing combined importance in accordance with one or more embodiments, it is noted that the combined importance may be a function of the local importance values of the set {s} of senders (and other entities, such as job codes) involved in electronic mail object x:

$$^xCI_{\{s\}r}^l = f\left[\sum_{\{s\}} w_s I_{sr}^l\right].$$

As described above, a sample may be collected by the system of the actual relevance scores that a user would have assigned, having looked at electronic mail, on a sliding scale that effectively works as a percentage. A "good" system would produce a priori relevance weightings that turned out to be near to the ones assigned post-opening by the recipient. The formula described above is actually a linear combination of the various given values of the D, C and I's. It is therefore possible, given enough feedback data, to use linear regression to derive the weights which would minimize the error-squared terms in predicting the scores for relevance as given by the user. The database used may essentially be a very large matrix, with a large number of zeros and can often become ill-conditioned.

Such analysis enables a plurality of features. First, for example, different recipients who provide feedback may have their own individual weighting estimated. Further, if patterns of weightings emerge for different types or levels or importance scores of users, then global best estimates of weightings on a user category basis may be refined over time and these can be useful particularly in assigning initial weighting to a new user.

Figure 22:
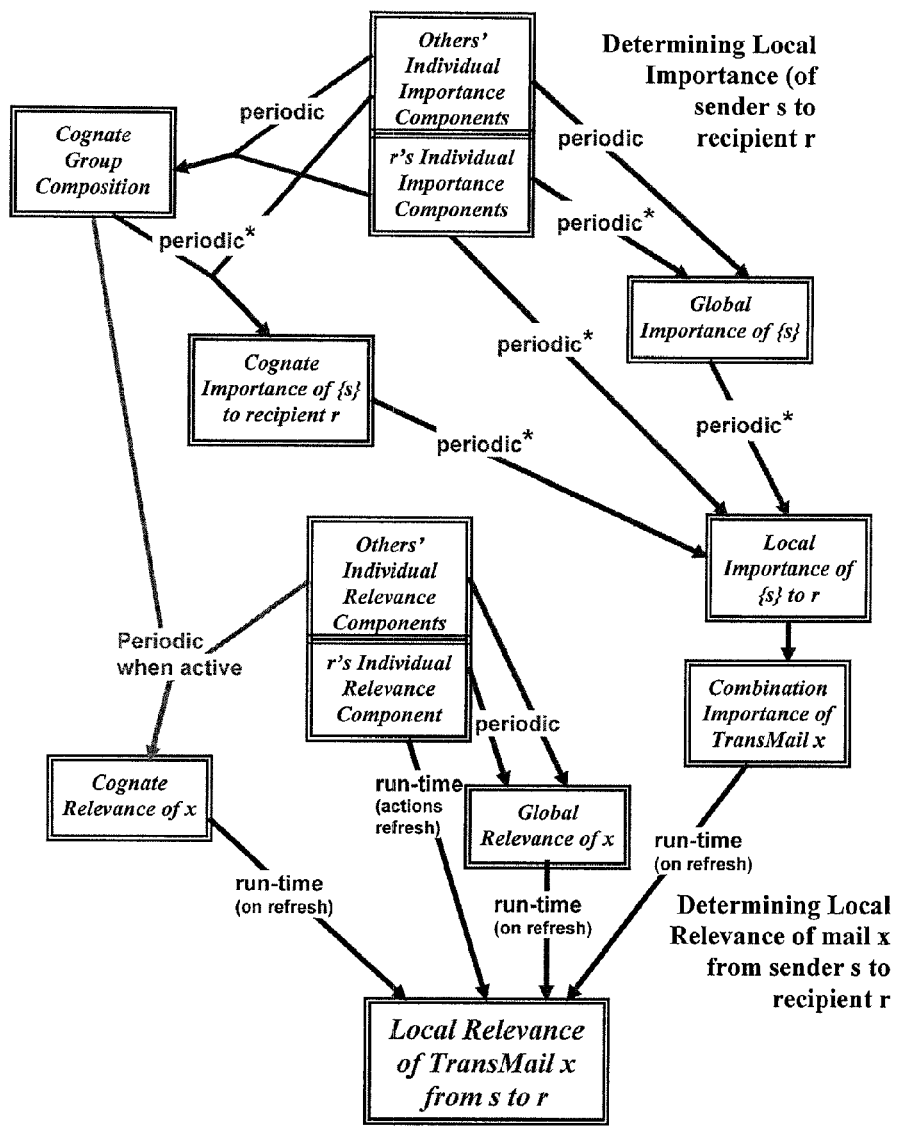
FIG. 22 shows a relevance determination mapping and flow in accordance with one or more embodiments of the present invention.

An example of interrelationships among at least some of the different types of values described above is shown in FIG. 22. It is noted that the local importance and relevance values are what are shown to the user. FIG. 22 also indicates the timings by which the different elements are calculated (further described in detail below).

Still referring to FIG. 22, an individual user's actions on a particular piece of electronic mail may have at least two effects: (i) they contribute scores to that user's individual relevance components (IRCs) for that electronic mail object x; and (ii) they contribute scores to that user's individual importance components (IICs) for the sender(s) {s} of that electronic mail object. These may be stored locally to that user. In the communal sphere: the user's IRCs then contribute to a global relevance score, and are available to contribute to any cognate relevance scores for other users; the user's IICs then contribute to a global importance score, and are available to contribute to any cognate importance for other users; global importance scores for senders are calculated periodically using the IIC's; and global relevance scores for each mail are calculated periodically using the IRCs (being revised more frequently in initial stages of an electronic mail). For each user, a cognate group of n users is identified, whose IICs correlate most closely with that user. As described above, this means that it is quite possible for John to be in Joan's cognate group but not vice versa. The identification of these n users does not have to change rapidly, and may be done on periodic review, with the identities of the n stored locally for user r. Further, for each user, a local importance value for each individual sender with whom a recipient r has interacted is calculated periodically and stored locally to r. This may utilize the recipients own IIC's for s, the global importance of s, and a value for cognate importance for s found from the combination of IICs amongst the current n identified as cognate to r. Still further, for each user, when an electronic mail object arrives, its mail data may include inputs from a set of senders {s} who have forwarded or contributed to the history of that mail. A combination importance for that electronic mail object x may be calculated when it arrives, using the mail data to identify senders {s} (as well as any other entities involved, such as job codes), and stored locally to r. If any key senders in {s} have not previously interacted with this recipient, there may be no stored value for local importance for them. In this case, a local importance figure is calculated for that sender when the mail arrives, using just the global and cognate importance values because there are no IICs at that point.

In regard to finding local relevance in accordance with one or more embodiments, a local relevance value for recipient r for an electronic mail object x is calculated using the following, for example, as inputs: mail data (as incorporated in the electronic mail object itself); combination importance of senders {s} of electronic mail object x (as cached on arrival using periodically reviewed local importance values); global relevance of electronic mail object x (as stored on periodic review); recipient r's IRCs for electronic mail object x (i.e., any actions done on the mail which affect local relevance immediately); and cognate relevance for electronic mail object x (looking at the IRCs of the n in the cognate group).

Further, it is noted that the recipient r's IRCs may include actions done by him or her on this electronic mail object. The user's IICs may include both of these and of any past actions done on the electronic mail object from the same sender. These may be stored locally to the user.

It is additionally noted that the cognate group composition may be determined by correlating the IICs. The n other users with the most similar IICs to r will be the user's cognate group. This may be done on periodic review basis, as it does not need to change rapidly.

Moreover, it is noted that the sender s's global importance may be found from all the IICs (including that of r) on a periodic review basis. As described above, because importance values are used to weight the IICs to determine importance values, this is circular, but it is solved to a given accuracy on this periodic review basis.

Further, it is noted that the cognate group may have at least two effects. One is through IICs of Cognate Group on these senders, to cognate importance values, to local importance values, to combined importance of senders, to local relevance, which reflects how the cognate group in general has rated the senders. Another effect is through the direct actions of the cognate group on this particular electronic mail object (e.g., IRCs of cognate group on this electronic mail, to cognate relevance, to local relevance).

Additionally, it is noted that an aim of one or more embodiments is to produce a "good" figure for local relevance, which is the relevance value seen by the recipient when they are browsing through the interface. The system offers a rapid effect of actions on the mail of (in, for example, decreasing order of importance and so rapidity of change): the actions of user r him/herself on electronic mail object x; the actions on the electronic mail object x of the group cognate to r; and the actions of all the other recipients on the electronic mail object.

Each of the different relevance and importance values may have different characteristics that help to determine how frequently the values must be updated and the mechanisms for doing so. One aim may be to provide as "up-to-date" a value as possible for local relevance scores for a given piece of electronic mail in a given user's area. To do this, there may be different frequencies at which changes have to be made to the values used. Local relevance may be based on, for example, the following: mail data factors; individual importance components; individual relevance components; global importance values; global relevance values; cognate importance values; and cognate relevance values. One or more of these may be available in a browse mode. Whereas older historical mail may not need the local relevance to update so rapidly, it may be particularly important that the most recent relevance figure be available for incoming or recent electronic mail objects structured as described above with reference to FIG. 1B. Further, it may be particularly useful to a given user to know what, for example, cognate users, have done with the electronic mail object soon after it arrives, as this will help him/her to assess priorities.

As to slowly changing values, the identification of a cognate group may be done on a periodic review basis. If a user is new to the system, it may be desirable to revise their cognate group more rapidly in the early stages, as opposed to for a well-established user. However, it is noted that may not be necessary that the identities of the cognate group be very recent for a relevance mechanism to be useful.

Further, global importance values may not need to change rapidly. They represent the overall importance of entities in the system. It is note that these values may need to change more rapidly for newer entities than for existing ones that already have the history. Moreover, updates to the global importance may be carried out on either a queue or periodic review basis.

As to moderately changing values, cognate importance may change faster than global importance, but perhaps not as fast as local importance. Cognate importance is based on purposefully biased samples, but still involves the views of a significant number of individuals rather than just one user.

In regard to local importance, the elements of local importance that relate to actions in the IIC may be used at run-time to update the value of local importance. An important attribute of local importance is that once a value has been assigned based on a reasonable data set, the local importance value may not need to change rapidly. New entities interacting with a given user have the ability for their importance value to change more quickly, as the data set is smaller. This is a property of increasing sample size on average in any case. Effects on local importance of the wider issues of global changes may be done by periodic review, as are those of cognate importance.

Still referring to moderately changing values, if global relevance values are the basis for the communal component of local relevance, then they may have to be kept up-to-date. If not, the value of the communal component in local relevance may be greatly reduced. For example, the impact of five other recipients deleting the electronic mail object before the user in question reads it will not affect his/her local relevance value until after he/she has dealt with the electronic mail object. As with local relevance, the rate of change in a global relevance value for a given piece of content should be greater the newer the content is (as the first users interact with it). In practice, it may not be dealt with in run-time, and thus may be queued and periodically reviewed. It is noted that the rapid reassessment in the early stages of the electronic mail object's history, may, however, be important.

As to rapidly changing values, cognate relevance values may be similar to global relevance values, in that they change rapidly when content is new, reflecting the first real user validation of the relevance predictors for the content. It is noted that the number of calculations is potentially large. Examples of such scenarios are now described below based on the following assumptions: an electronic mail is sent to 200 people; and n=20 is the number in a cognate group. To find the global relevance requires data from 200 sources and gives one figure for global relevance of the mail. Each of the 200, however, may have a cognate group, and the calculation of cognate relevance scores for each one will require up to 200×20=4000 figures to be combined into 200 individual cognate relevance scores. Thus, the cognate relevance needs to be updated faster than the global, because it is what offers the best guide to the user as to whether to prioritize looking at the current electronic mail object.

In one scenario for calculating cognate relevance, cognate relevance may be recalculated whenever the user acted on electronic mail or refreshed the browse mode. This means that if, for example, there are 150 active mail items in the box, then each time the user acts or refreshes, there needs to be 150×20=3000 pieces of information combined into 150 separate figures. Refreshing many of these maybe unnecessary, if they have been around a long time. Changes are more likely in the early stages of their life cycle.

In another scenario for calculating cognate relevance, cognate relevance may be recalculated on a periodic basis, with a recycle period which starts short and gets longer during the mail's life cycle. This means that each time the review appears, if 200 received the mail, then there has to be up to 200×20=4000 retrievals and 200 calculations. This may happen even if the user is not accessing or reading mail (e.g., if the user is on vacation). At least one advantage is that this will be frequent only in the early stages of the mail's lifetime.

In still another scenario for calculating cognate relevance, cognate relevance may be generally calculated on a periodic review basis, with a shorter cycle in the earlier stages of the mail's life cycle. The actual period in these early stages, however, may depend on whether the user was active on his or her mail. When the mail arrives, it has some local time-flag indicating periodicity of review of cognate relevance, and this decreases if the user refreshed the browse-mail or did a mail action. This contrasts with the scenario described above in which there is only a single time-flag for any given electronic mail, and a single mathematical series for review of all recipient's cognate relevance for that mail simultaneously. Mathematically, it may involve a function with, for example, an exponentially increasing review period, but with its parameters also dependent on mail-action frequency.

In yet another scenario for calculating cognate relevance, a cognate relevance calculation may be triggered by recipient refresh or mail-action in its early stages, but thereafter, on a periodic review basis, with an increasing cycle length. Within a certain time of arrival (e.g., the first two hours), which has been termed "phase one," any refresh or action by the user on other mail would trigger the recalculation of the cognate relevance for this particular electronic mail object. After that cut-off period, i.e., during "phase two," recalculation may be done on a periodic review basis. This scenario may have the advantage of focusing a greater frequency of recalculation where it is most needed. It makes it also possible to build in a "minimum recalculation cycle" during phase one, so that it is not literally every mail-action that causes recalculation, but that minimum-period reviews take place on this electronic mail object during times the mail browse is "active." In the critical early stages of the electronic mail object, review occurs when relevant (e.g., when the user is looking), but later in its life, its cognate relevance may not be triggered unnecessarily often.

In another scenario for calculating cognate relevance, cognate relevance calculation may take place on a periodic review system during the time that the user is active. Each review recalculates cognate relevance for any mail received during the last P minutes, where P depends on the time since that active user-session began. The effect of this is to review more recent mail more often, but only during an active session. This system may be combined with a general recalculation during the system's "quiet time," which adjusts older mail relevance scores.

In one or more embodiments, when the user logs in or becomes active, a time-line begins, with recalculations every T minutes. T may be a function of the global importance of the user r, and the time t since login or recommencement of activity:

$$T = f(I_r^g; t).$$

The system may allow more important users a more rapid period of recalculation, but the users themselves may not determine their own recalculation period pattern because everyone would otherwise opt for the shortest periods possible. It is noted that potentially an organization may choose to vary their recalculation frequency factors correlated to user type, e.g., seniority. The time P may itself be a function of t so that the cognate relevance of older mail is recomputed less often:

$$P=f(t).$$

When the user logs out or becomes inactive, the process is paused, waiting to recommence once the user logs back in or becomes active again.

The periodicity of recalculation and time periods involved may be varied on a per implementation basis depending on the computational resources and priorities of a given system. It may also be automated to modify itself automatically if the computational pool recalculating cognate relevance values reaches full capacity and begins building an extended queue. Such a system may have one or more advantages. For example, recalculation is done only when either the user is active or during computational quiet times. It may not be necessary to have up-to-date relevance values (requiring repeated recalculation) if the user is not looking at them anyway. As to another advantage, cognate relevance values of most recently arrived mail are recalculated more frequently, up-to-date information on these being the most useful to the user. As to a further advantage, the application may not need to consider each cognate relevance value to see whether it must be recalculated. Instead, it may run a single process, starting at the top of each user's inbox at the time correlated to their activity, and recalculate each cognate relevance value until it reaches mail that is older than the period currently being recalculated. At this point, it may halt, and does not need to evaluate any further electronic mail objects for cognate relevance recalculation. Another advantage is that the system may allow separate recalculation of, for example, the last month's worth of, cognate relevance values for each user on each weekday night ("quiet time"), and recalculation of the last years (or more) worth of cognate relevance values for each user over the weekend (quiet time). This may ensure that the older mail values do not become anachronistic, by using space computational capacity in off-peak periods.

Accordingly, in one or more embodiments, an electronic mail system may ensure that users have up-to-date (including, for example, as many actions of other users as possible) cognate relevance values for recent content, while acting to minimize overall computational load, but still ensuring that cognate relevance values for historical content (which should change much more slowly) are recalculated periodically in computational "quiet time." As an example of this, a scenario is now described. A user becomes inactive or logs out at time t=m. Then, the user becomes active or logs in at time t=n. If n−m>20, the system calculates initial cognate relevance values for electronic mail objects received between t=m and t=n. If n−m<20, the system recalculates cognate relevance values for electronic mail objects received between t=n−20 and t=n. If the user is still active or has not logged out at time t=n+5, the system recalculates cognate relevance values for electronic mail objects received between t=n−10 and t=n+5. If the user is still active or has not logged out at time t=n+10, the system recalculates cognate relevance values for electronic mail objects received between t=n−5 and t=n+10. If the user is still active or has not logged out at time t=n+15, the system recalculates cognate relevance values for electronic mail objects received between t=n−45 and t=n+15. If the user is still active or has not logged out at time t=n+20, the system recalculates cognate relevance values for electronic mail objects received between t=n+5 and t=n+20. If the user is still active or has not logged out at time t=n+25, the system recalculates cognate relevance values for electronic mail objects received between t=n+10 and t=n+25. If the user is still active or has not logged out at time t=n+30, the system recalculates cognate relevance values for electronic mail objects received between t=n−150 and t=n+30. If the user is still active or has not logged out at time t=n+35, the system recalculates cognate relevance values for electronic mail objects received between t=n+20 and t=n+35. If the user is still active or has not logged out at time t=n+40, the system recalculates cognate relevance values for electronic mail objects received between t=n+25 and t=n+40. If the user is still active or has not logged out at time t=n+45, the system recalculates cognate relevance values for electronic mail objects received between t=n−15 and t=n+45. If the user is still active or has not logged out at time t=n+50, the system recalculates cognate relevance values for electronic mail objects received between t=n+35 and t=n+50. If the user is still active or has not logged out at time t=n+55, the system recalculates cognate relevance values for electronic mail objects received between t=n+40 and t=n+55. If the user is still active or has not logged out at time t=n+60, the system recalculates cognate relevance values for electronic mail objects received between t=n−300 and t=n+60. If the user is still active or has not logged out at time t=n+65, the system recalculates cognate relevance values for electronic mail objects received between t=n+50 and t=n+65. If the user is still active or has not logged out at time t=n+70, the system recalculates cognate relevance values for electronic mail objects received between t=n+55 and t=n+70. If the user is still active or has not logged out at time t=n+75, the system recalculates cognate relevance values for electronic mail objects received between t=n+15 and t=n+75. If the user is still active or has not logged out at time t=n+80, the system recalculates cognate relevance values for electronic mail objects received between t=n+65 and t=n+80. If the user is still active or has not logged out at time t=n+85, the system recalculates cognate relevance values for electronic mail objects received between t=n+70 and t=n+85. If the user is still active or has not logged out at time t=n+90, the system recalculates cognate relevance values for electronic mail objects received between t=n−90 and t=n+90. If the user is still active or has not logged out at time t=n+95, the system recalculates cognate relevance values for electronic mail objects received between t=n+80 and t=n+95. If the user is still active or has not logged out at time t=n+100, the system recalculates cognate relevance values for e-mal objects received between t=n+85 and t=n+100. If the user is still active or has not logged out at time t=n+105, the system recalculates cognate relevance values for electronic mail objects received between t=n+45 and t=n+105. If the user is still active or has not logged out at time t=n+110, the system recalculates cognate relevance values for electronic mail objects received between t=n+95 and t=n+110. If the user is still active or has not logged out at time t=n+115, the system recalculates cognate relevance values for electronic mail objects received between t=n+100 and t=n+115. If the user is still active or has not logged out at time t=n+120, the system recalculates cognate relevance values for electronic mail objects received between t=n+240 and t=n+120. Thus, at 5, 10, 20, 25, 35, 40, 50 and 55 minutes, the system recalculates the last 15 minutes worth of electronic mail cognate relevance values. At 15 and 45 minutes, the system recalculates the last 30 minutes worth of electronic mail cognate relevance values. At 30 minutes, the system recalculates the last 3 hours of electronic mail cognate relevance values. At 60 minutes, the system recalculates the last 6 hours of electronic mail cognate relevance values.

When the user logs out or becomes inactive, the process is paused, waiting to recommence once the user logs back in or becomes active again. It is noted that the times described above are just examples. In practice, the periodicity of recalculation and time periods involved may depend on the global importance of the user, and may be also varied on a per implementation basis depending on the computational resources and priorities of a given system.

For organizations involved, for example, in forensic analysis, investigation, or intelligence, a greater level of content analysis may be appropriate. A relevance analysis engine in accordance with one or more embodiments may have the capability to go to greater levels of granularity than submessages, for example, by resolving paragraphs of text or individual words. This may involve the system itself using spiders to identify terms within the content of any electronic mail object that statistically increase the likelihood that it is relevant to the recipient or person performing discovery.

Keywords of high relevance in a community of users may be automatically discovered based on statistical techniques. The frequencies of words in a set of mail content may be compared to regular (average) values, to discover the words that are used more than average in the volume of electronic mail. The more frequent words may then be correlated to content relevance, to highlight more frequent words (compared to average values) that are used in the more relevant content.

Further, such techniques may allow for "dashboarding" and visualization of sets of content (corresponding to, for example, communities or sub-communities), to provide insight into the nature of the community for an analyst or investigator. This may be particularly useful when very large amounts of mail communications are being analyzed, and content must be semi-automatically sampled for further investigation.

In certain cases, users may seek to find ways to increase their own global importance. Thus, for example, two friends on similar grades may arrange to send each other large numbers of electronic mail objects that they would leave open for a while—each therefore increasing the other's importance. Each can monitor the other's actions over time, and large numbers of read electronic mail objects may increase both their global importance values. At least one advantage of this to them is that both may then get their electronic mail objects read faster when sending to others. In another scenario, when the content analysis is advanced, senders may deliberately introduce phrases and words to get their electronic mail objects read. Accordingly, one or more embodiments may incorporate detection devices identifying such behavior, and to penalize, mitigate, and/or halt the behavior where and as appropriate. In addition, this type of behavior may be flagged to administrators inside an organization.

To further describe an electronic mail system in accordance with one or more embodiments, a series of stages are now described to illustrate a software implementation. In a first stage, local relevance of content may be based on some factors of the mail data (e.g., features inherent in or attached to an electronic mail object) and each individual user's actions on content in their own folders (effectively recording what each user does with each mail, and treating every mail separately). Analysis may be based on the current submessage, and not retrospectively applied to historical submessages. Incoming mail relevance may be based on mail data contained within the electronic mail object itself (e.g., a flag for follow up or urgency flag).

In a next stage, in addition to local relevance based on IRC on this electronic mail object, each entity that a user deals with is given a local importance value derived from that user's actions—i.e., using the IIC. The input to local relevance is through a combined local importance value, considering all the senders involved in this particular electronic mail object. At this stage, there may be no communal aspects that would estimate importance using other user actions; the importance values of senders to a recipient are based on the past actions of that recipient. Analysis may still be based on entities in each electronic mail object's respective current submessage, and not changing importance values of entities in the history portion.

In a third stage, user opinions are sampled, to confirm that the relevance and importance values assigned are accurate reflections of each user's real opinions. Also, there may be a facility for optional feedback via the sliders into the algorithm (as opposed to the sliders being for information presentation only).

In a next stage, relevance values of historical, and implicitly "future," submessages are changed based on each user's actions on a current submessage. Then, in a next stage, changes are made to the local importance values of entities involved in historical (and future) submessages based on each user's actions on a current submessage. Subsequently, relevance and importance are integrated with search, each again on a single-recipient basis (not taking any communal actions or values of other users into the implementation other than those directly implied in the mail data itself). In a next stage, relevance and importance values are decayed effectively, so that older content loses its weight over time unless it is re-accessed by the user. Thereafter, users are allowed to vary their own settings, including the impact different actions have on relevance and importance.

In a next stage, global importance values are calculated and periodically updated for each entity, based mainly on a combination of each user's actions (IIC), which indicate importance of the sender. This may be the first step in communal importance. There may be human resources input also to the global importance values. Incoming mail relevance may now be based also on global importance values to give meaningful global (or communal) relevance.

In a next stage, global relevance values are calculated for each piece of content, based on the overall result of each user's local relevance values. Initial relevance for content can then include input from the global values (as well as, for example, local importance), and global relevance can still form a component of each user's local relevance even after they have read the content. This may be the first step in communal relevance. Incoming mail relevance can now be based also on global relevance scores, which are derived from a weighted aggregate of local relevance scores.

In a next stage, collaborative search takes place, allowing users to search other users' content, according to the rules set by a compliance policy. In a subsequent stage, there may be integration with human resources to assist in assigning similar users, to allow an indication of when a user changes roles. Also, in another stage, correlation of groups, domains, and other aliases with users is done, so that the system can imply a degree of change on users' other identities when an action causes one of their identities to change. In a next stage, there is integration with enterprise naming systems, such as job codes, so that similar types and categories can be used in calculating importance values for related entities.

In a next stage, the system identifies a cognate group of n other users most similar to a given user/recipient. This is done, directly or indirectly, based on past actions. Calculation of each user's local importance values for other entities is based on their own actions, and also actions of those in their cognate group. An individual importance component value (IIC) or individual value inputting into the cognate importance component ($I_{sr}^c$) may be assigned when a user has interacted with an entity.

In a next stage, a cognate relevance value is now input into the final figure for local relevance. This is based on the actions of those in the group cognate to the recipient on the particular electronic mail object. In one or more embodiments, this may operate at run-time, but, in practice, it may have to be on a periodic review that initially has a more rapid review period.

In a next stage, communal weighting adjustment (of the impacts of different actions as described above) is allowed in a feedback loop, inside, for example, a single organization. Further, in another stage, smaller fragments are analyzed, such as paragraphs and words, as subsets of the overall electronic mail, to determine importance for these entities as well. In a next stage, federation of action weighting and other system constants is facilitated, based on other organizations' data (possibly anonymously) to improve the accuracy of one or more of the mechanisms described herein.

As described above, a cognate group may be an important aspect of determining mail relevance in accordance with one or more embodiments. In some cases, a single global value for relevance of a given piece of content may not be the most appropriate measure of its relevance to a given community. For example, an electronic mail object regarding human resource policies might be most relevant to the human resources department, and of less relevance to other users. To improve the accuracy of the algorithm, it may be better to compare a user to a set of similar or cognate users rather than to the global population. In regard to how such similarity or identification of the cognate group is determined, one or more of the following approaches may be used: role or group based; collaborative filtering; fingerprinting; cluster models; search-based methods; frequency analysis; and importance value correlation. Each of these different approaches, which may be used singly or in any combination, will now be described in turn.

In regard to the role or group based approach, determining similarity may be dealt with in part by the role-based component in the effective local relevance value for each end user. Components may also be included for groups, domains, and other sets of users (or other entities). Users in the same groups or roles may be assumed to be similar. For example, if a number of users in a role receive an electronic mail object, and other users in that role have already viewed it and deleted it, then it is likely to be of low relevance to another user in that role. Further, users within the same group or role may have their historical behaviors correlated, to see which users within each group do, in fact, behave in a similar manner. This method compares historical relevance values for content that users in the group have received, with those of the user in question (for the same content). This technique for extending the basic mechanism is essentially communal filtering (further described below). It is important to properly recognize the group (and other) local relevance and importance values used for determining relevance for content sent to those identities, with their role in ascribing similarity between users. A resulting statement of similarity from role or group methods might be, for example, "other users who also work in the development team found this mail to be of high relevance."

As to communal filtering, this mechanism may use the behavior of other recipients of a given piece of content to determine the content's relevance to the user in question—communal relevance. However, rather than just using the global relevance value for the content, the application may correlate the past behavior of other users to the user in question to improve the relevance predictor. A resulting statement of similarity from communal filtering might be, for example, "other users whose relevance values typically correlate to the user in question (based on comparison for historical content) found this mail to be of high relevance."

In regard to fingerprinting, it adopts a historical comparison method similar to that of communal filtering, but reduces the sparseness of the matrices by focusing on a sample of content with large numbers of recipients. Fingerprinting may rely on analyzing users' relevance values for a set of data that has been sent to very large numbers of users. This then provides relevance values for a common set of data, allowing a "fingerprint" of each user's relevance values to be calculated, and then compared to that of other users. User fingerprint correlation may then be used as a basis for predicting a given user's relevance values for a new piece of content, based on other similar user's relevance values for the same piece of content. Thus, as more users read a new piece of mail, the initial relevance values for that content for the remaining recipients should be predicted more accurately. The correlation between users' behavior for mails with few recipients and large numbers of recipients may vary from one community to another. However, the feedback mechanisms in the relevance algorithm allow the strength of this correlation to be tested, and the suitability of fingerprinting for use in predicting behavior for all mail content to be evaluated. It is noted that for mail content sent with very large numbers of recipients, fingerprinting may be a reasonably accurate method for determining similarity. While this description has focused on users and content, other entities may also be subject to fingerprinting. The same matrix with content in one dimension may also be applied to groups and domains. A resulting statement of similarity from fingerprinting might be, for example, "other users whose relevance values typically correlate to the user in question (based on comparison for a non-representative sample of historical content) found this mail to be of high relevance."

As to cluster models, they work by segmenting users (and other entities) into categories based on their actions or attributes. In some ways, this approach may be similar to (and partly contains) role and group based similarity, but it may not assume separate relevance and importance values are stored for each cluster. Examples include, but are not limited to, the following: users who reply frequently, who forward frequently, who never delete mails, who send mails to large groups, who receive certain mail volumes, who belong to particular groups, who work in particular departments, etc.; job codes, which have a particular job code parent or type, which are at a certain point in the domain hierarchy, which have a particular retention period, which result in particular external actions, which have certain allowed readers (access rights), etc.; and content, which has a large chain length (number of history submessages), which is of a certain length, which has attachments of certain size or type, which has a large number of recipients, which contains certain keywords, which is linked to a particular job code, which has a particular sensitivity rating, which interacts with certain external systems, etc. Further, it is noted that cluster models may potentially be applied to both entities and content in determining similarity and using it as a predictor for user relevance. A resulting statement of similarity from cluster models might be, for example, "other users who also forward mails regularly found this mail to be of high relevance."

In regard to search-based methods, they may operate with respect to content, or as a filter to then perform correlative analysis of users' historical relevance values. Search-based methods with respect to content may treat the similarity problem as a search for similar content in the user's historical content store. They then compare the relevance values from that user for similar historical content to predict the relevance of the new content. This essentially moves the similarity question to being a function of third party applications, but still relies on the user's own actions to determine relevance. In another approach, using search-based methods as a filter for comparing other users' historical behavior, the application finds similar content to that in question and then inspects the relevance values given to it by other users. The approach then uses these relevance values from other users for similar content as an input to determine the initial relevance of the given content for the user in question.

As to frequency analysis, this may be another mechanism for reducing data size by communal filtering determining cognate groups. In this method, each user may have a set of other users associated with them based not on similarity, but on frequency. The method may work by finding the users who have the most content in common with the user in question (e.g., the most frequent to:, cc: and potentially bcc: recipients). Further, this method may not imply similarity among, for example, 100 users, who have most content in common with the user in question. Rather, it may provide a rich (not sparse) matrix of content on which to search for correlations (and anti-correlations) in user relevance values. On a periodic basis, such as each month, the ten most infrequent users in common with a given user may be removed from the matrix, and the ten most frequent users in common (not already identified in the matrix) may be added. This acts to keep the matrix rich with common values. From an importance perspective, this mechanism may be used to compare a user's own importance values given to entities (e.g., job codes) to those of other users. These correlations may then be used to provide more accurate estimates of initial importance for when a user interacts with that job code for the first time (as opposed to being forced to rely on the global value).

To further illustrate frequency analysis, consider, for example, a user, A, and four other users, B, C, D and E, with whom A has a significant volume of content in common. The table below lists the relevance values ascribed to historical content, electronic mail objects A through T, that user A has in common with most or all of the other users.

|  | User | | | | |
| --- | --- | --- | --- | --- | --- |
| Content | User A | User B | User C | User D | User E |
| TransMail T | 5 | 9 | 9 | 4 | 1 |
| TransMail S | 6 | 2 | 3 | 7 | 4 |
| TransMail R | 2 | 5 | 7 |  | 5 |
| TransMail Q | 8 |  | 4 | 6 | 6 |
| TransMail P | 4 | 7 |  | 2 |  |
| TransMail O | 2 | 6 | 9 | 4 |  |
| TransMail N | 6 | 9 | 1 | 5 | 8 |
| TransMail M | 9 | 6 | 3 | 8 | 2 |
| TransMail L | 6 | 3 | 2 | 5 | 5 |
| TransMail K | 4 | 1 | 4 | 1 | 6 |
| TransMail J | 7 | 5 |  | 5 | 6 |
| TransMail I | 2 | 2 | 3 | 2 |  |
| TransMail H | 4 | 8 | 6 | 3 | 9 |
| TransMail G | 3 |  | 7 |  | 8 |
| TransMail F | 1 | 4 | 6 | 3 | 4 |
| TransMail E | 8 | 7 | 8 | 7 | 2 |
| TransMail D | 5 | 8 |  | 7 |  |
| TransMail C | 7 | 2 | 6 | 6 | 5 |
| TransMail B | 3 | 9 | 5 | 4 | 8 |
| TransMail A | 2 | 6 | 8 |  | 4 |

The list of relevance values for historical content allows each user's historical behavior to be correlated with each other user. The resulting linear correlation values are presented in the table below.

|  | Correlations | | | | |
| --- | --- | --- | --- | --- | --- |
|  | User A | User B | User C | User D | User E |
| User A | 1 | 0.042675 | −0.35891 | 0.754378 | −0.28248 |
| User B | 0.042675 | 1 | 0.301382 | 0.154122 | 0.122467 |
| User C | −0.35891 | 0.301382 | 1 | −0.0957 | −0.31789 |
| User D | 0.754378 | 0.154122 | −0.0957 | 1 | −0.43545 |
| User E | −0.28248 | 0.122467 | −0.31789 | −0.43545 | 1 |

Correlation may be a statistical function that indicates the extent of the similarity between two data sets. From the table above, it can be seen that user A behaves very differently to user B, often has opposite relevance values to user B, and ascribes very similar relevance values to the same content as user D. Thus, the behavior (and resulting relevance value) of user D on a new piece of content sent to both users A and D would be a good indicator of the likely relevance of that content to user A.

User behavior may evolve over time, so the correlation formula may be weighted towards the newer content (a non-linear distribution of the square of the error terms in the regression). In addition, there is no requirement that the relationship be linear; thus non-linear correlation techniques may also be appropriate. In a system of very high computational power, the regression formula for each similar pairing could be used to "forecast" a suitable value for the communal component.

Another way to determine cognate users relates to correlating importance values. An identification may be to find the n users whose matrices of importance values correlate most highly with those of the given user r. This approach assumes that the effects of other factors (e.g., user actions) have fed through into the importance figures. In one or more embodiments, a single mechanism for determining the identities in cognate groups may rely primarily on the correlation of importance values, and these may be reconsidered during computational quiet periods as described above.

As described above, approaches for determining cognate groups may be combined. For example, cluster models may be added as another dimension to frequency analysis. Further, it is noted that for one or more of the cognate group determination approaches described above, the contribution of more recent content to the similarity function may be greater than that of older content, reflecting the changing nature of the user population as the organization and their roles within it evolve. As described above, an exponential function may be applied to these contributions to decay them over time. Further, older data may be removed as new data is added, to ensure that the similarity structures may be maintained at a given size. The frequency of updating various relevance and importance values may also be determined on a per organization basis, depending on, for example, the business requirements and computational power available.

As apparent from the description herein of an electronic mail system in accordance with one or more embodiments, various advantages may be achieved with the electronic mail system. In one aspect, the electronic mail system "watches" how users interact with content, as well as implicitly other users and entities in the system, and takes each user's behavior as the primary input into a relevance analysis engine of the electronic mail system. An attraction of this approach might be that it collects vast amounts of statistical input data to the engine, but does not require additional user time. Further, the electronic mail system may be applied at a single user level only, based on a user's own actions. It may also be applied across an entire organization in a manner looking communally at other users' actions, which greatly increases its accuracy by providing more contextual data. In another aspect, the electronic mail system may be integrated with traditional email systems. Further, the electronic mail relevance system may also be applied to historical content, providing "dashboard" summaries and visual representations of communication communities. In a further aspect, the electronic mail relevance system may enhance an investigative process, improving sampling, and ease of analysis.

While the invention has been described with respect to a limited number of embodiments, those skilled in the art, having benefit of the above description, will appreciate that other embodiments may be devised which do not depart from the scope of the present invention as described herein. Accordingly, the scope of the present invention should be limited only by the appended claims.

What is claimed is:

1. A computer-implemented system for determining a relevance score of a piece of electronic content sent from a sender to a user, the relevance score determined with respect to the user, the computer-implemented system comprising:
    a computer processor; and
    a computer-readable storage medium storing computer program modules configured to execute on the computer processor, the computer program modules comprising:
        a monitoring module configured to track actions by a plurality of users associated with an application for managing electronic content;
        a first relevance measurement module coupled to the monitoring module and configured to determine a first measure of relevance of the piece of electronic content based at least in part on one or more actions of the user on the piece of electronic content;
        a second relevance measurement module coupled to the monitoring module and configured to:
            identify at least one other of the plurality of users that is a recipient of the piece of electronic content and that is cognate to the user, and
            determine a second measure of relevance of the piece of electronic content as based at least in part on one or more measures derived from the group consisting of:
                a local importance describing an importance of the sender to the user,
                a global importance describing an importance of the sender within an organization with which the plurality of users are associated,
                a content relevance determined responsive to content of the piece of electronic content, and
                one or more actions on the piece of electronic content of the at least one other of the plurality of users that is a recipient of the piece of electronic content and that is cognate to the user; and
        a relevance analysis module configured to determine the relevance score of the piece of electronic content sent from the sender to the user, the relevance score being determined based at least in part on the first determined measure of relevance and on the second determined measure of relevance.

2. The system of claim 1, further comprising:
    a content presentation module configured to present the piece of electronic content to the user in accordance with the determined relevance score and to present to the user a value describing the determined relevance score.

3. The system of claim 1, further comprising:
    a search module configured to search the electronic content in accordance with the determined relevance score.

4. The system of claim 1, wherein the piece of electronic content comprises an electronic mail object in a relational mail system.

5. The system of claim 1, wherein the electronic content comprises at least one of an email, a document, an instant message, and an SMS message.

6. A computer program product for determining a relevance score of a piece of electronic content sent from a sender to a user, the relevance score determined with respect to the user, the computer-program product having a computer-readable storage medium having computer program instructions encoded thereon comprising:
    a monitoring module configured to track actions by a plurality of users associated with an application for managing electronic content;
    a first relevance measurement module coupled to the monitoring module and configured to determine a first measure of relevance of the piece of electronic content based at least in part on one or more actions of the user on the piece of electronic content;
    a second relevance measurement module coupled to the monitoring module and configured to:
        identify at least one other of the plurality of users that is a recipient of the piece of electronic content and that is cognate to the user, and
        determine a second measure of relevance of the piece of electronic content based at least in part on one or more measures derived from the group consisting of:
            a local importance describing an importance of the sender to the user,
            a global importance describing an importance of the sender within an organization with which the plurality of users are associated,
            a content relevance determined responsive to content of the piece of electronic content, and
            one or more actions on the piece of electronic content of the at least one other of the plurality of users that is a recipient of the piece of electronic content and that is cognate to the user; and
    a relevance analysis module configured to determine the relevance score of the piece of electronic content sent from the sender to the user, the relevance score being determined based at least in part on the first determined measure of relevance and on the second determined measure of relevance.

7. A computer-implemented method for determining a relevance score of a piece of electronic content sent from a sender to a user, the relevance score determined with respect to the user, the computer-implemented method comprising:
    tracking actions by a plurality of users associated with an application for managing electronic content;
    identifying at least one other of the plurality of users that is a recipient of the piece of electronic content and that is cognate to the user,
    determining a first measure of relevance of the piece of electronic content based at least in part on one or more actions of the user on the piece of electronic content;

determining a second measure of relevance of the piece of electronic content based at least in part on one or more measures derived from the group consisting of:
- a local importance describing an importance of the sender to the user,
- a global importance describing an importance of the sender within an organization with which the plurality of users are associated,
- a content relevance determined responsive to content of the piece of electronic content, and
- one or more actions on the piece of electronic content of the at least one other of the plurality of users that is a recipient of the piece of electronic content and that is cognate to the user; and determining the relevance score of the piece of electronic content sent from the sender to the user, the relevance score being determined based at least in part on the first determined measure of relevance and on the second determined measure of relevance.

8. The system of claim 1, wherein identifying at least one other of the plurality of users that is cognate to the user comprises analyzing historical actions of the at least one other of the plurality of users with respect to historical actions of the user.

9. The system of claim 8, wherein the at least one other of the plurality of users is cognate to the user, and the user is not cognate to the at least one other of the plurality of users.

10. The system of claim 4, wherein the electronic mail object includes one or more submessages.

11. The system of claim 10, wherein the submessages are represented in the electronic mail object as references to submessage content stored in a data store of the relational mail system.

12. The system of claim 4, wherein the electronic mail object has an associated job code representing a business process with which the electronic mail object is associated.

13. The computer program product of claim 6, further comprising:
a content presentation module configured to present the piece of electronic content to the user in accordance with the determined relevance score and to present to the user a value describing the determined relevance score.

14. The computer program product of claim 6, further comprising:
a search module configured to search the electronic content in accordance with the determined relevance score.

15. The computer program product of claim 6, wherein the electronic content comprises at least one of an email, a document, an instant message, and an SMS message.

16. The computer program product of claim 6, wherein the piece of electronic content comprises an electronic mail object in a relational mail system.

17. The computer program product of claim 16, wherein the electronic mail object includes one or more submessages that are represented in the electronic mail object as references to submessage content stored in a data store of the relational mail system.

18. The method of claim 7, further comprising:
presenting the piece of electronic content to the user in accordance with the determined relevance score and presenting to the user a value describing the determined relevance score.

19. The method of claim 7, further comprising:
searching the electronic content in accordance with the determined relevance score.

20. The method of claim 7, wherein the piece of electronic content comprises an electronic mail object in a relational mail system.

21. The method of claim 20, wherein the electronic mail object includes one or more submessages that are represented in the electronic mail object as references to submessage content stored in a data store of the relational mail system.

22. The method of claim 7, wherein identifying at least one other of the plurality of users that is cognate to the user comprises analyzing historical actions of the one other of the plurality of users with respect to historical actions of the user.

* * * * *

UNITED STATES PATENT AND TRADEMARK OFFICE
CERTIFICATE OF CORRECTION

PATENT NO. : 7,716,217 B2  Page 1 of 1
APPLICATION NO. : 11/623653
DATED : May 11, 2010
INVENTOR(S) : Justin Marston et al.

It is certified that error appears in the above-identified patent and that said Letters Patent is hereby corrected as shown below:

Column 47, line 47, after "content," delete "as".

Signed and Sealed this

Twenty-fourth Day of August, 2010

David J. Kappos
*Director of the United States Patent and Trademark Office*